United States Patent
Singer

(10) Patent No.: US 12,214,649 B2
(45) Date of Patent: Feb. 4, 2025

(54) TELESCOPING TRUCK BED SHELL

(71) Applicant: Nicholas J. Singer, Irvine, CA (US)

(72) Inventor: Nicholas J. Singer, Irvine, CA (US)

(*) Notice: Subject to any disclaimer, the term of this patent is extended or adjusted under 35 U.S.C. 154(b) by 0 days.

(21) Appl. No.: 18/508,905

(22) Filed: Nov. 14, 2023

(65) Prior Publication Data
US 2024/0083225 A1    Mar. 14, 2024

Related U.S. Application Data

(63) Continuation of application No. 17/816,706, filed on Aug. 1, 2022, now Pat. No. 11,850,927, which is a continuation of application No. 17/089,460, filed on Nov. 4, 2020, now Pat. No. 11,446,993, which is a continuation-in-part of application No. 16/536,751, filed on Aug. 9, 2019, now Pat. No. 11,084,360, which is a continuation of application No. 16/174,090, filed on Oct. 29, 2018, now Pat. No. 10,414,258, which is a continuation-in-part of application No. 16/000,570, filed on Jun. 5, 2018, now Pat. No. 10,493,831, which is a continuation of application No. 15/686,006, filed on Aug. 24, 2017, now Pat. No. 10,005,347, which is a continuation-in-part of application No. 15/656,989, filed on Jul. 21, 2017, now Pat. No. 9,783,030, which is a continuation of application No. 15/478,138, filed on Apr. 3, 2017, now Pat. No. 9,744,836.

(60) Provisional application No. 62/930,492, filed on Nov. 4, 2019.

(51) Int. Cl.
| | | |
|---|---|---|
| *B60J 7/14* | (2006.01) | |
| *B60J 7/02* | (2006.01) | |
| *B60J 7/04* | (2006.01) | |
| *B60J 7/08* | (2006.01) | |
| *B60P 3/42* | (2006.01) | |
| *B62D 33/04* | (2006.01) | |
| *B62D 33/08* | (2006.01) | |

(52) U.S. Cl.
CPC ............... *B60J 7/141* (2013.01); *B60J 7/026* (2013.01); *B60J 7/041* (2013.01); *B60J 7/08* (2013.01); *B60P 3/42* (2013.01); *B62D 33/04* (2013.01); *B62D 33/08* (2013.01)

(58) Field of Classification Search
CPC ..... B60J 7/04; B60J 7/041; B60J 7/061; B60J 7/062; B60J 7/08; B60J 7/085; B60J 7/14; B60J 7/141; B60J 7/1607; B62D 33/04
USPC .......................... 296/100.02, 100.03, 100.04
See application file for complete search history.

(56) References Cited

U.S. PATENT DOCUMENTS

| | | |
|---|---|---|
| 3,910,629 A | 10/1975 | Woodard |
| 4,252,363 A | 2/1981 | Rodrigue |
| 4,542,932 A | 9/1985 | Whiteman |

(Continued)

FOREIGN PATENT DOCUMENTS

CA    1107790 A    8/1981

*Primary Examiner* — Jason S Daniels
(74) *Attorney, Agent, or Firm* — DANE IP Law PC

(57) ABSTRACT

A telescoping truck bed shell is disclosed herein. The truck bed shell is capable of being retracted so that the user can have full access to the truck bed and also extended so that the user can have a protected volume at the truck bed in order to store things. The telescoping truck bed has traversable frames and a traversable cover wherein the frames and cover may be traversed between extended and retracted positions depending on whether the truck bed shell is being deployed or stored.

19 Claims, 46 Drawing Sheets

(56) References Cited

U.S. PATENT DOCUMENTS

| | | |
|---|---|---|
| 4,789,196 A | 12/1988 | Fields |
| 5,203,603 A | 4/1993 | Hertzberg |
| 5,443,295 A | 8/1995 | Moberly |
| 6,942,275 B2 | 9/2005 | Corbett |
| 6,997,502 B1 | 2/2006 | Reents |
| 7,410,198 B1 | 8/2008 | Queener |
| 7,429,070 B2 | 9/2008 | Neubrand |
| 8,540,302 B2 | 9/2013 | Lenz, Jr. |
| 9,744,836 B1 | 8/2017 | Singer |
| 9,783,030 B1 | 10/2017 | Singer |
| 11,446,993 B2 * | 9/2022 | Singer .................... B62D 33/08 |
| 2004/0090092 A1 | 5/2004 | De Gaillard |
| 2005/0017548 A1 | 1/2005 | Rudolph |
| 2006/0022493 A1 | 2/2006 | Miller |
| 2010/0026037 A1 | 2/2010 | Opie |
| 2012/0235439 A1 | 9/2012 | Mazur |
| 2016/0280051 A1 | 9/2016 | Singer |
| 2019/0061496 A1 | 2/2019 | Singer |
| 2019/0184800 A1 | 6/2019 | Nania |

\* cited by examiner

TELESCOPING TRUCK BED SHELL

CROSS-REFERENCE TO RELATED APPLICATIONS

This application is a continuation application of Ser. No. 17/816,706, filed 2022, Aug. 1, which is a continuation application of Ser. No. 17/089,460, filed on 2020, Nov. 4, now U.S. Pat. No. 11,446,993, which claims the benefits of Prov. Pat. App. Ser. No. 62/930,492, filed on 2019, Nov. 4 and is a continuation in part application of Ser. No. 16/536,751, filed on 2019, Aug. 9, now U.S. Pat. No. 11,084,360, which is a continuation of U.S. patent application Ser. No. 16/174,090, filed on 2018, Oct. 29, now U.S. Pat. No. 10,414,258, which is a continuation in part application of U.S. patent application Ser. No. 16/000,570, filed on 2018, Jun. 5, now U.S. Pat. No. 10,493,831, which is a continuation of U.S. patent application Ser. No. 15/686,006, filed on 2017, Aug. 24, now U.S. Pat. No. 10,005,347, which is a continuation in part application of U.S. patent application Ser. No. 15/656,989, filed on 2017, Jul. 21, now U.S. Pat. No. 9,783,030, which is a continuation application of U.S. patent application Ser. No. 15/478,138, filed on 2017, Apr. 3, now U.S. Pat. No. 9,744,836, the entire content of all of which are expressly incorporated herein by reference.

STATEMENT RE: FEDERALLY SPONSORED RESEARCH/DEVELOPMENT

Not Applicable

BACKGROUND

The various aspects and embodiments described herein relate to a truck bed shell.

Trucks are one of the most popular types of vehicles being sold in the United States and abroad. Users will accessorize the truck with a variety of functional components in order to fit their lifestyle and needs. However, in doing so, they may add certain functionality but also disable other functional aspects of the truck.

Accordingly, there is a need in the art for improvement in accessorizing trucks.

BRIEF SUMMARY

The various aspects and embodiments described herein address the deficiencies discussed above, discussed below and those that are known in the art.

A truck bed shell is disclosed herein which has two different configurations. A collapsed configuration wherein the user may have full access to the truck bed and a deployed configuration wherein the user may have a protective covering over the truck bed in order to provide for an enclosed protected volume to store things. The truck bed shell may have a plurality of frames that are traversable between retracted and extended positions that provide protection to sides of the truck bed when the frames are in the extended position. The truck bed shell may also have a cover that is traversable between retracted and extended positions that provide protection to a top side of the truck bed when the cover is in the extended position.

More particularly, a truck with a collapsible shell is disclosed. The truck may have a cab defining a roof and a truck bed defining first and second side walls and a tailgate. The collapsible shell may have a plurality of first frames and a plurality of second frames and the cover. The plurality of first frames may be stackable adjacent to each other. The plurality of first frames may be mounted to the first side wall. The plurality of first frames may be traversable between a stored position wherein the plurality of first frames are stackable adjacent to each other and an extended position wherein the plurality of second frames are disposed end to end with each other. The plurality of second frames may be stackable adjacent to each other. The plurality of second frames may be mounted to the second side wall. The plurality of second frames may be traversable between a stored position wherein the plurality of second frames are stackable adjacent to each other and an extended position wherein the plurality of second frames are disposed end to end with each other. The cover may be traversable between a stored position and an extended position wherein in the stored position, the cover is disposed above the roof of the cab and in the extended position, the cover is engaged to the plurality of first and second frames to form an enclosed space at the bed of the truck.

When the cover is in the stored position and the plurality of first and second frames are in the stored position, a full length of the truck bed is usable. When the cover is in the extended position and the plurality of first and second frames are in the extended position, the shell forms a covered interior volume over the truck bed.

The truck may further comprise a plurality of panels. Each of the panels may be attachable to the first and second frame to provide a barrier.

The truck may further comprise first and second tracks mounted to the first and second side walls and a plurality of first and second sliders mounted to the plurality of first and second frames. The plurality of first and second sliders may be slidably engaged to the first and second tracks.

The truck may further comprise a shield disposed over the cover when the cover is in the stored position over the roof of the cab. The shield may be traversable between an open position and a closed position wherein when the shield is in the open position, the cover may be traversable from the stored position to the extended position. The shield may provide an aerodynamic surface over the cover when the shield is in the closed position. The shield may be rotatably attached to the roof of the cab.

The plurality of first and second frames may be panels.

In another aspect, a collapsible shell may be attachable to a truck. The collapsible shell may comprise a plurality of first frames, a plurality of second frames and the cover. The plurality of first frames may be stackable adjacent to each other. The plurality of first frames may be mountable to a first side wall of a bed of the truck. The plurality of first frames may be traversable between a stored position wherein the plurality of first frames are stackable adjacent to each other and an extended position wherein the plurality of second frames are disposed end to end with each other. The plurality of second frames may be stackable adjacent to each other. The plurality of second frames may be mountable to a second side wall of the bed of the truck. The plurality of second frames may be traversable between a stored position wherein the plurality of second frames are stackable adjacent to each other and an extended position wherein the plurality of second frames are disposed end to end with each other. The cover may be traversable between a stored position and an extended position wherein in the stored position and during use, the cover is disposed above a roof of the cab and in the extended position. The cover may be engagable to the plurality of first and second frames to form an enclosed space at the bed of the truck.

When the cover is in the stored position and the plurality of first and second frames are in the stored position during use, a full length of the truck bed is accessible, and when the cover is in the extended position and the plurality of first and second frames are in the extended position during use, the shell forms a covered interior volume over the truck bed.

The collapsible shell may further comprising a plurality of panels. Each panel may be attachable to the first and second frame to provide a barrier.

The collapsible shell may comprise first and second tracks mountable to the first and second side walls and a plurality of first and second sliders mounted to the plurality of first and second frames. The plurality of first and second sliders may be slidably engaged to the first and second tracks during use.

The collapsible shell may further comprise a shield attachable to the cab and disposable over the cover when the cover is in the stored position over the roof of the cab during use.

The shield may be traversable between an open position and a closed position. The cover may be traversable from the stored position to the extended position, and also from the extended position back to the stored position when the shield is on the open position. The shield may provide an aerodynamic shield over the cover when the cover is in the stored position.

The shield may be rotatably attached to the roof of the cab during use of the collapsible shell.

The plurality of first and second frames may be panels.

According to another embodiment, there is provided a truck with a collapsible shell. The truck includes a cab defining a roof and a truck bed defining first and second side walls. A first rigid member is mounted to the first and second side walls. A second rigid member is slidably mounted to the first and second side walls, with the second rigid member being transitional between a deployed position and a collapsed position along a slide axis. The second rigid member moves toward the first rigid member as the second rigid member transitions from the deployed position toward the collapsed position. The second rigid member moves away from the first rigid member as the second rigid member transitions from the collapsed position toward the deployed position. The truck additionally includes a plurality of telescoping support structures, with each telescoping support structure being connected to the first rigid member and the second rigid member and extending in a direction parallel to the slide axis. The plurality of telescoping support structures collapse as the second rigid member transitions from the deployed position toward the collapsed position. The plurality of telescoping support structures expand as the second rigid member transitions from the collapsed position toward the deployed position. A window is detachably engageable with the second rigid member.

The second rigid member and the truck bed may define a window opening when the second rigid member is in the deployed position, The window may be sized to be complimentary in shape to the window opening so as to extend between the second rigid member and the truck bed when the second rigid member is in the deployed position. The truck bed may include a tailgate, with the tailgate defining a portion of the window opening such that the window may extend to the tailgate when the second rigid member is in the deployed position and the window is engaged with the second rigid member.

The first rigid member may be mounted solely to the truck bed.

The first rigid member may not be directly attached to the cab when the first rigid member is mounted to the truck bed.

The truck may additionally include a shell extending between the first and second rigid members. The truck may further comprise a pair of attachment members connected to respective ones of the first and second side walls, and the pair of attachment members may be selectively engageable with the shell to couple the shell to the first and second side walls. The shell and the pair of attachment members may include cooperatively engageable snaps to effectuate engagement of the shell to the pair of attachment members. The shell and the pair of attachment members may include cooperatively engageable zipper portions to effectuate engagement of the shell to the pair of attachment members.

According to another embodiment, there is provided a truck with a collapsible shell. The truck comprises a cab defining a roof and a truck bed defining first and second side walls. A first rigid member is mounted solely to the first and second side walls. A second rigid member is slidably mounted to the first and second side walls. The second rigid member is transitional between a deployed position and a collapsed position along a slide axis. The second rigid member moves toward the first rigid member as the second rigid member transitions from the deployed position toward the collapsed position, and the second rigid member moves away from the first rigid member as the second rigid member transitions from the collapsed position toward the deployed position. A shell extends between the first and second rigid members. A plurality of support structures interface with the shell to provide support to the shell. A window is engageable with the second rigid member.

According to a further implementation, there is provided a cover for use with a truck having a cab and a truck bed including a pair of side walls, with the cover comprising a first rigid member mountable to the first and second side walls. A second rigid member is slidably mountable to the first and second side walls, with the second rigid member being transitional between a deployed position and a collapsed position along a slide axis. The second rigid member moves toward the first rigid member as the second rigid member transitions from the deployed position toward the collapsed position, and the second rigid member moves away from the first rigid member as the second rigid member transitions from the collapsed position toward the deployed position. The cover additionally includes a plurality of telescoping support structures. Each telescoping support structure is connected to the first rigid member and the second rigid member and extends in a direction parallel to the slide axis. The plurality of telescoping support structures collapse as the second rigid member transitions from the deployed position toward the collapsed position, and the plurality of telescoping support structures expand as the second rigid member transitions from the collapsed position toward the deployed position. A window is detachbly engageable with the second rigid member.

The truck may include a collapsible shell having a tapered configuration at its rear end to provide a sleek, compact, aerodynamic look, similar to a hatchback. The collapsible shell may include a plurality of first frames moveable with respect to each other. The plurality of first frames may be mounted to the first sidewall and may be traversable between a stored position, wherein the plurality of first frames are retracted with respect to each other, and a deployed position wherein the plurality of second frames are extended out with respect to each other. Each of the plurality of first frames may extending from the first sidewall to define a first frame height. The first frame height of the plurality of first frames may be non-uniform. The collapsible shell may additionally include plurality of second frames moveable with respect to each other. The plurality of second frames may be mounted to the second sidewall, and may be traversable between a stored position, wherein the plurality of second frames are retracted to each other, and a deployed position wherein the plurality of second frames are extended out with each other. Each of the plurality of second frames may extend from the second sidewall to define a second frame height. The second frame height of the plurality of second frames may be non-uniform. The collapsible shell may additionally include a cover traversable between a stored position and an extended position. The cover may extend over the plurality of first and second frames as the cover transitions from the stored position toward the extended position. When the cover is in the stored position and the plurality of first and second frames are in the stored position, a full length of the truck bed may be usable, and when the cover is in the extended position and the plurality of first and second frames are in the extended position, the collapsible shell may form a covered interior volume over the truck bed.

The first frame height may decrease in a direction from the cab toward the tailgate. The first frame height may linearly decrease. The second frame height may decrease in a direction from the cab toward the tailgate. The second frame height may linearly decrease.

The may include a weather strip positionable between the collapsible shell and the cab to form a water tight seal between the collapsible shell and the cab.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
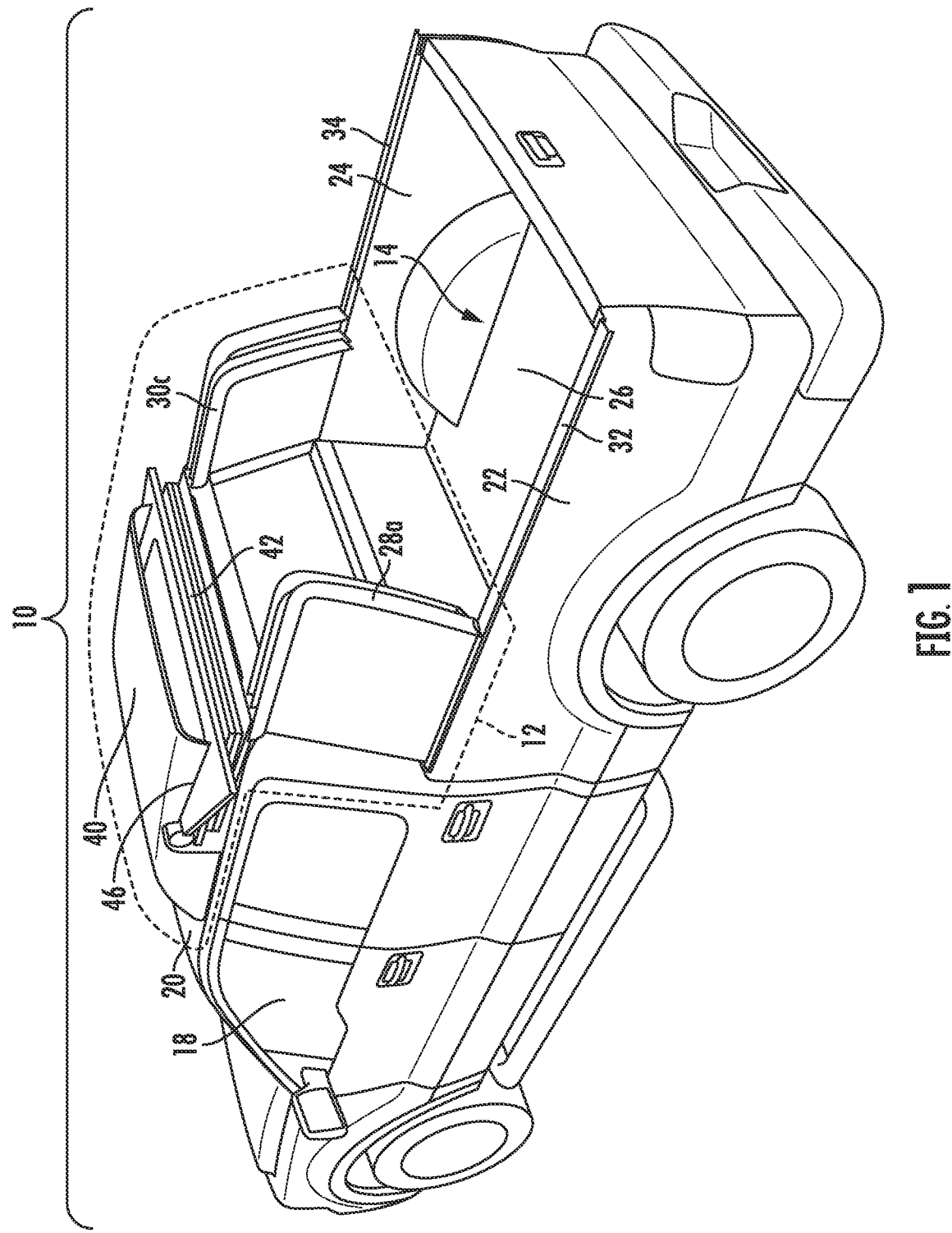
FIG. 1 is a perspective view of a truck and a first embodiment of a telescoping truck bed shell.
Figure 2:
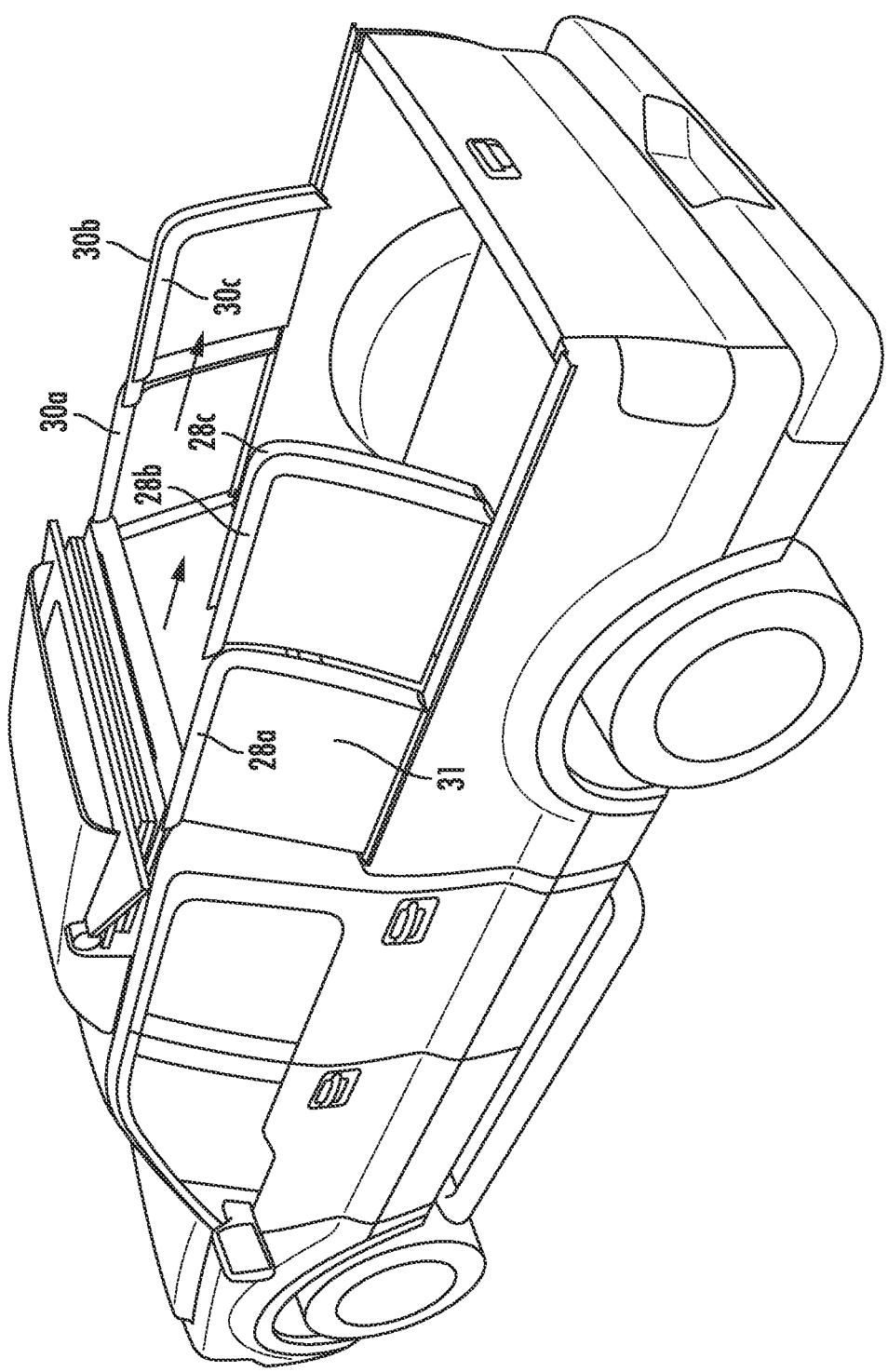
FIG. 2 illustrates the telescoping truck bed shell shown in FIG. 1 as frames are being deployed.
Figure 6:
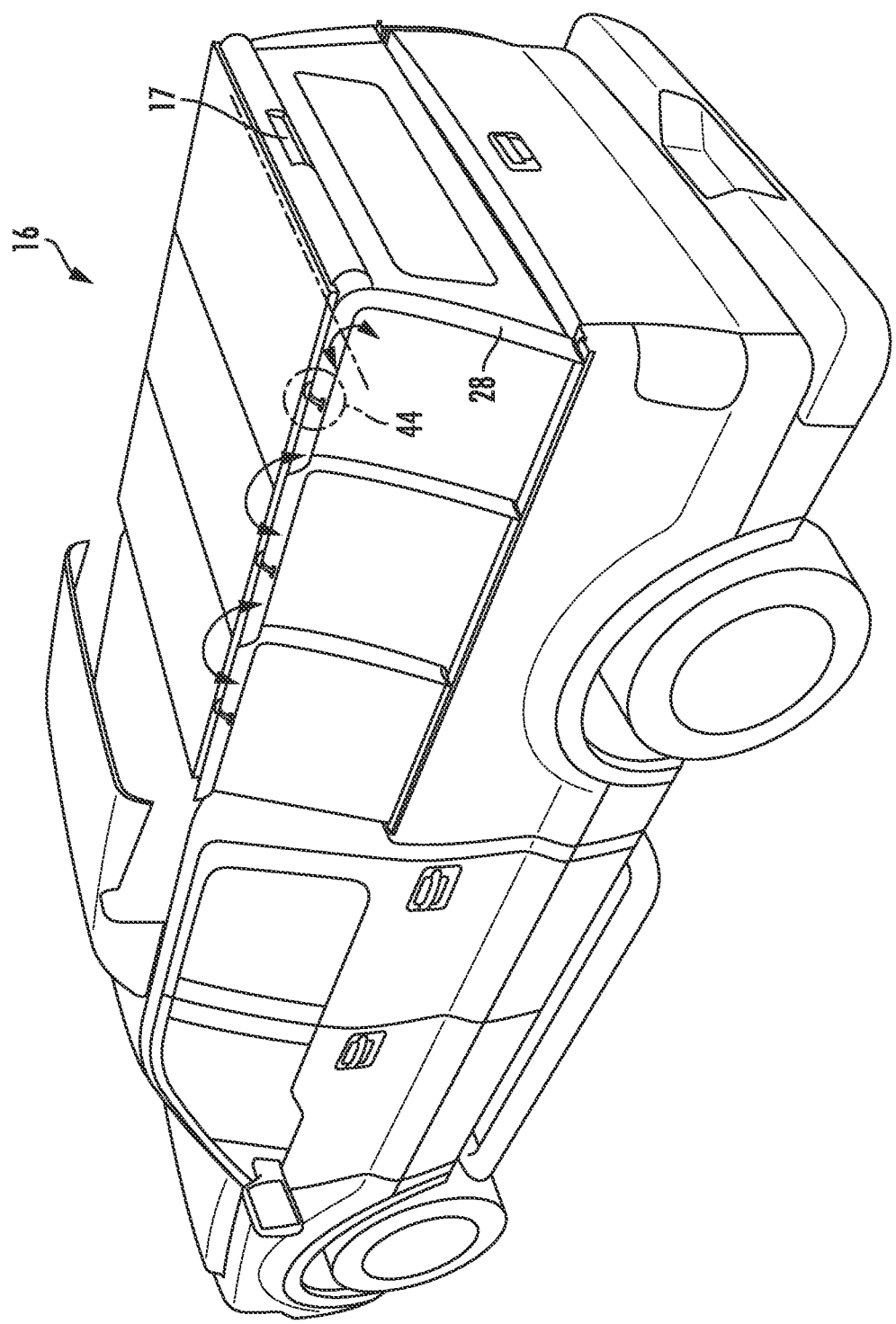
FIG. 6 illustrates the cover when fully deployed.
Figure 7:
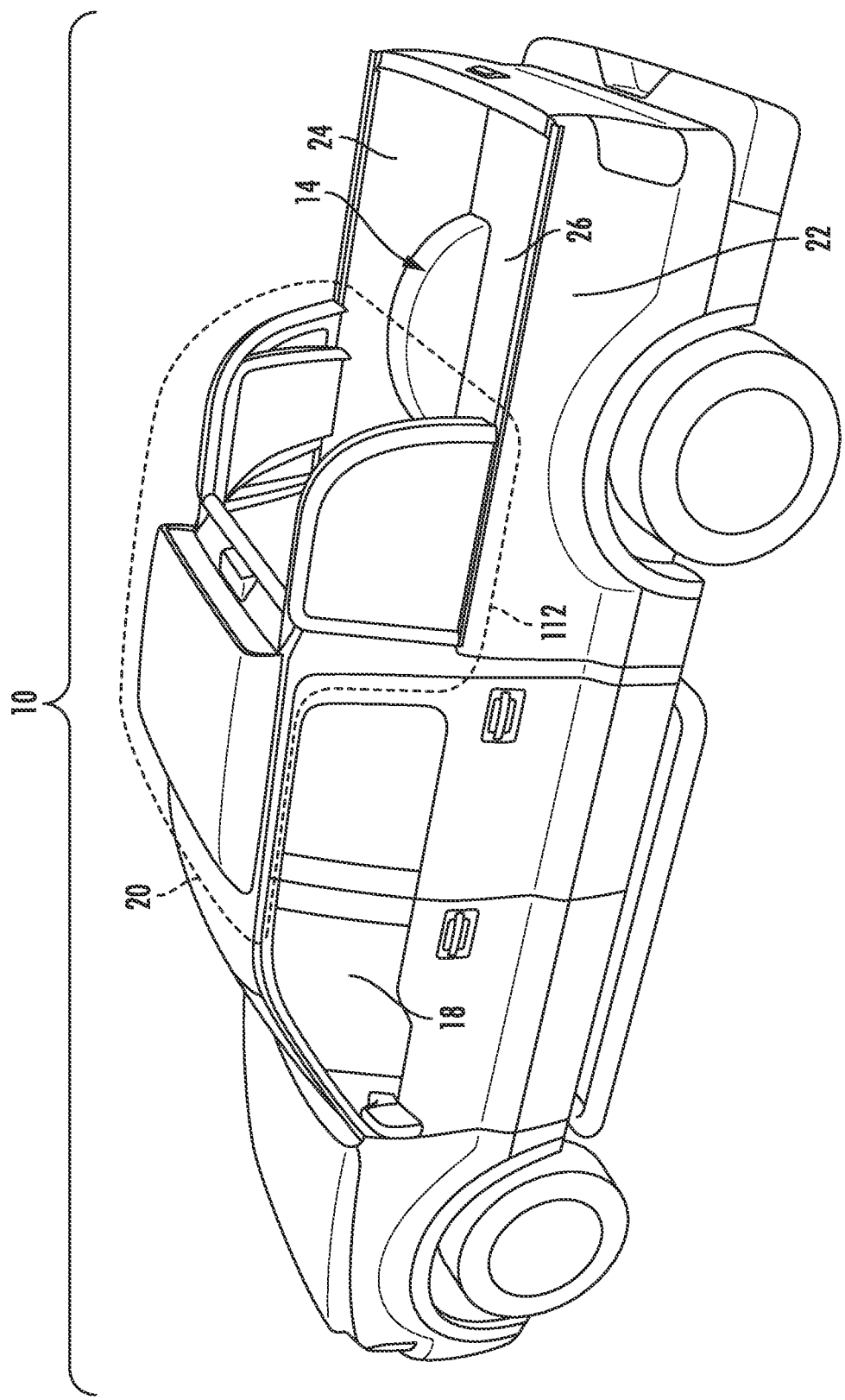
FIG. 7 is a perspective view of the truck and the second embodiment of the telescoping truck bed shell.
Figure 8:
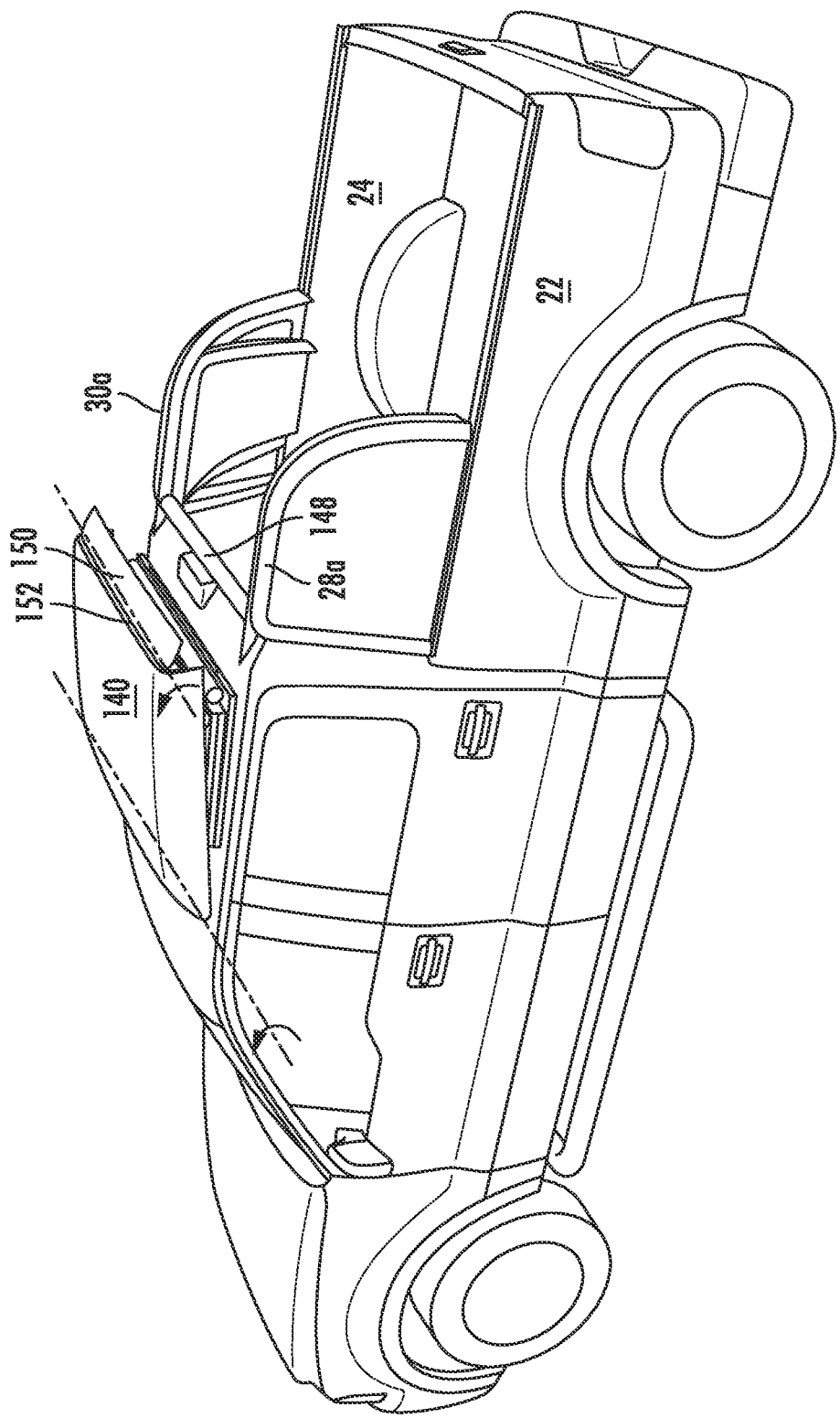
FIG. 8 illustrates the shield rotated upward to access crossmembers attachable to frames of the telescoping truck bed shell shown in FIG. 7.
Figure 9:
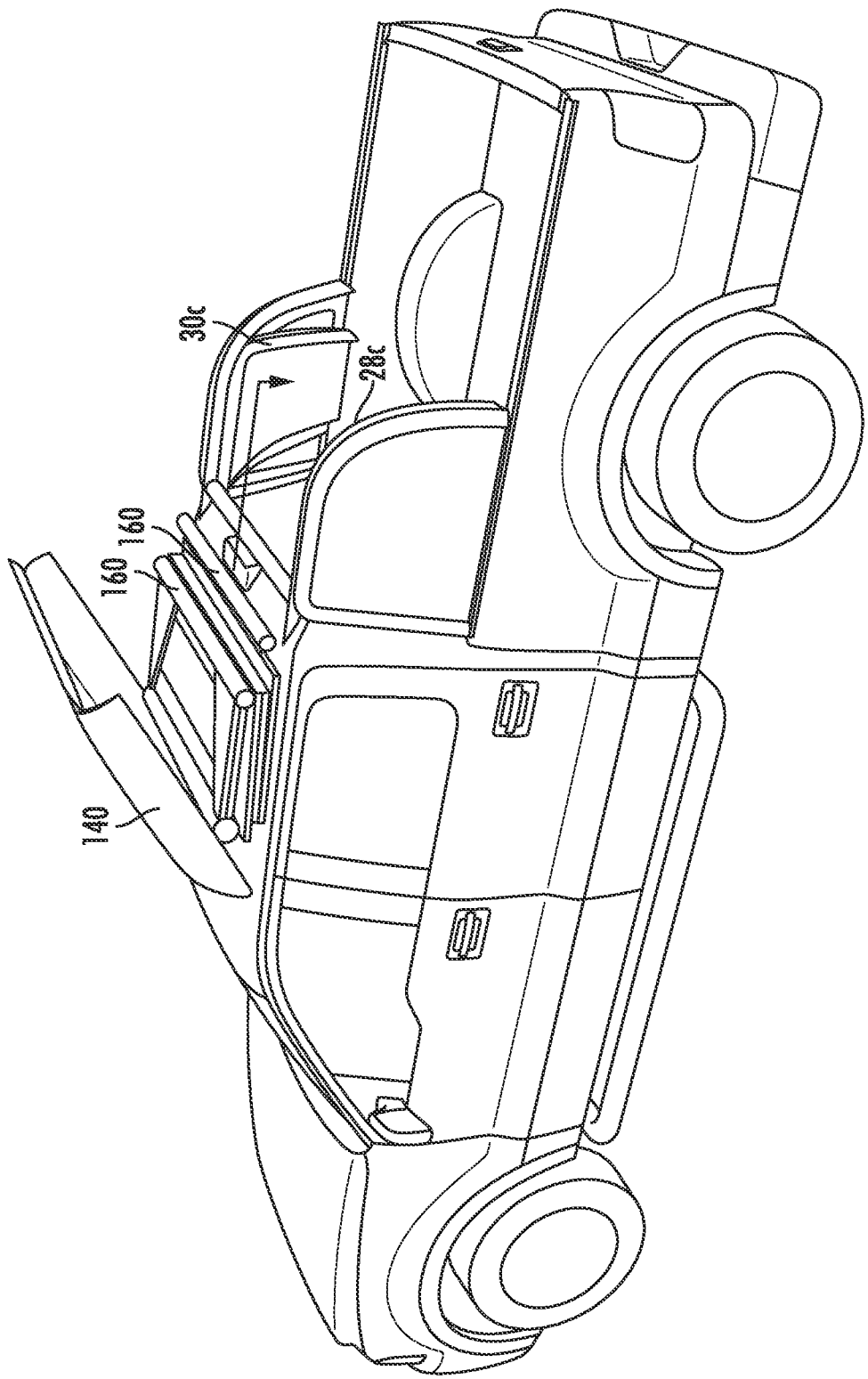
FIG. 9 illustrates the shield rotated fully upward.
Figure 10:
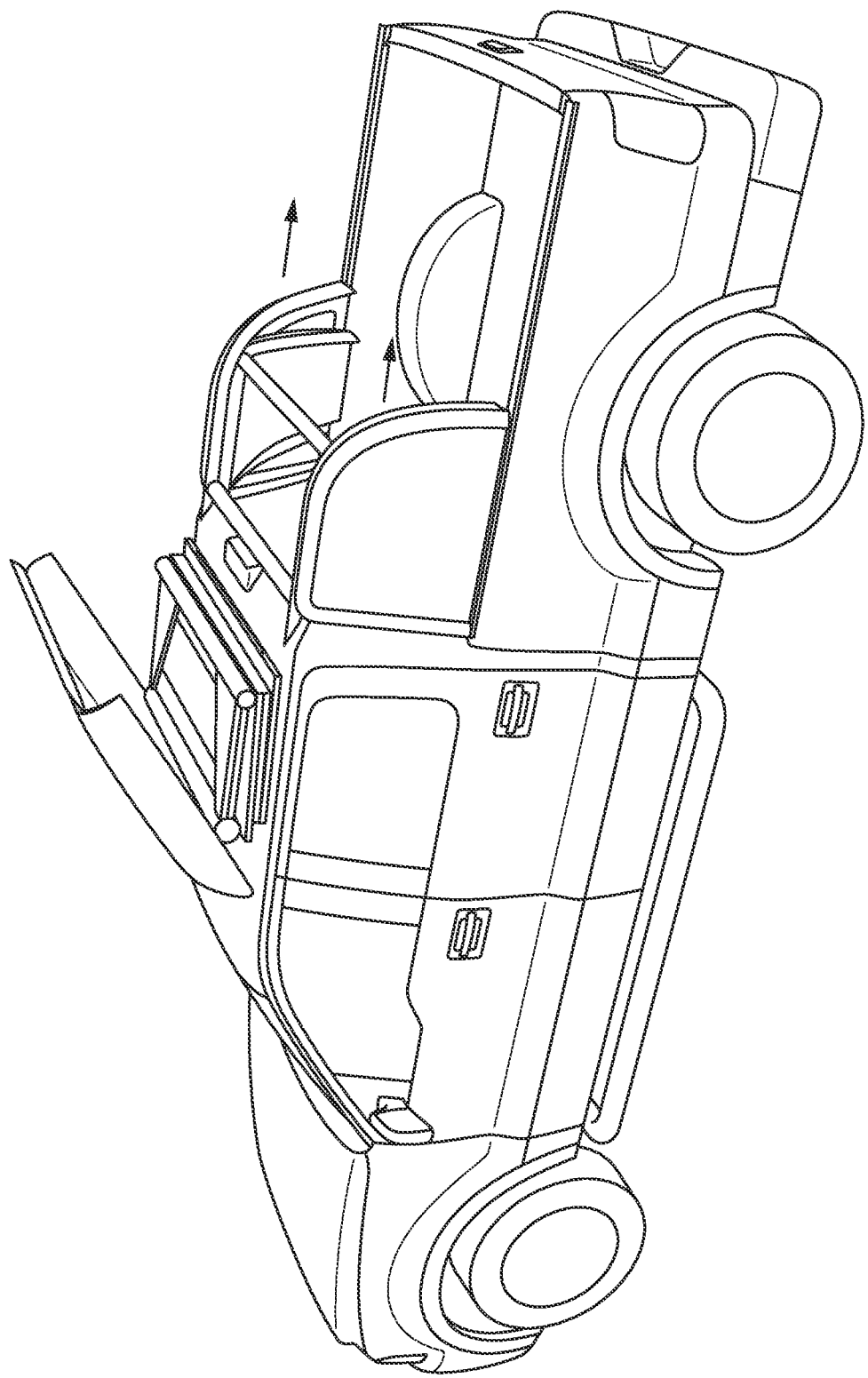
FIG. 10 illustrates the crossmember attached to the frame of the telescoping truck bed shell shown in FIG. 7.
Figure 11:
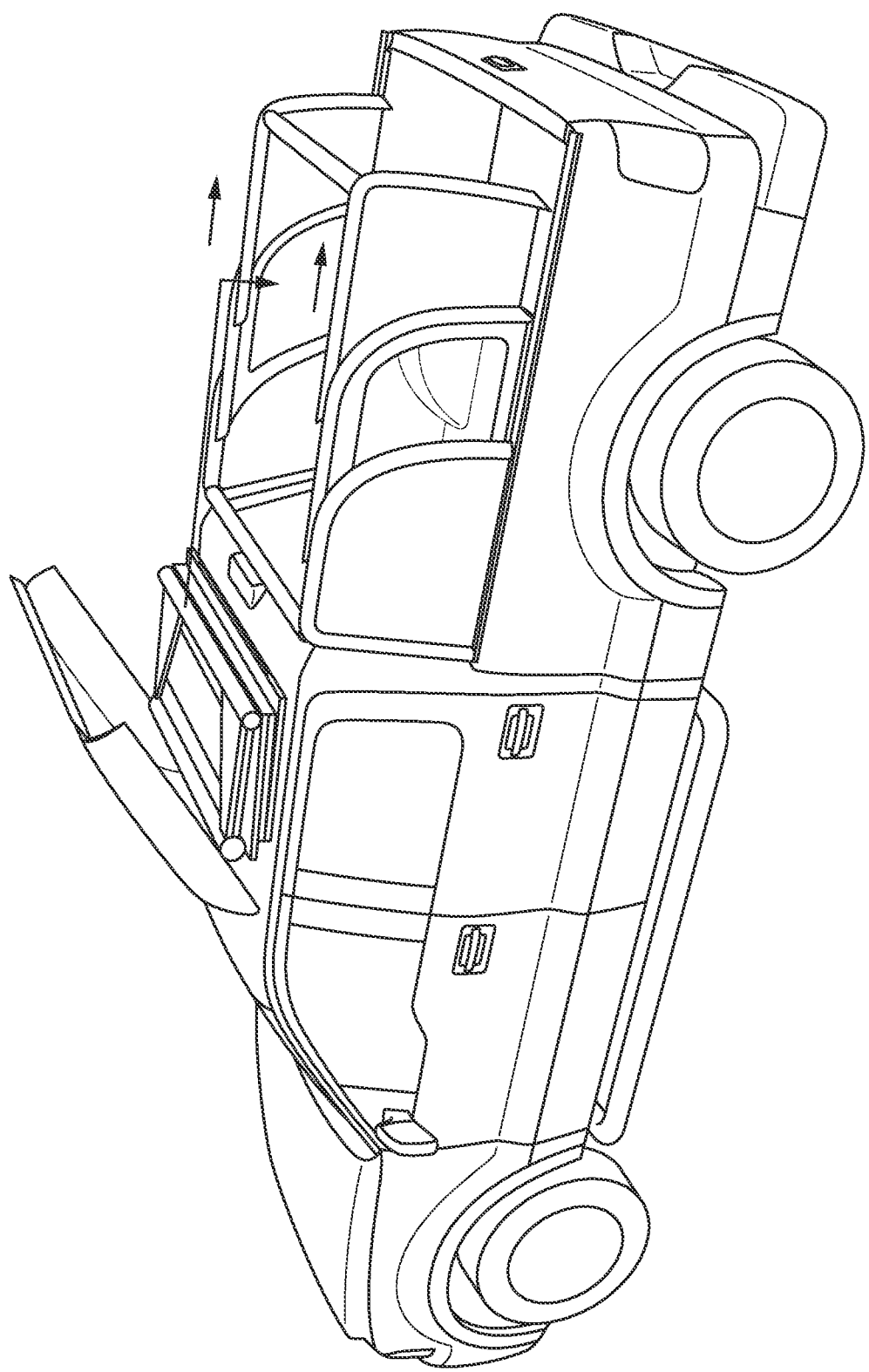
FIG. 11 illustrates deployment of the frames of the telescoping truck bed shell shown in FIG. 7.
Figure 14:
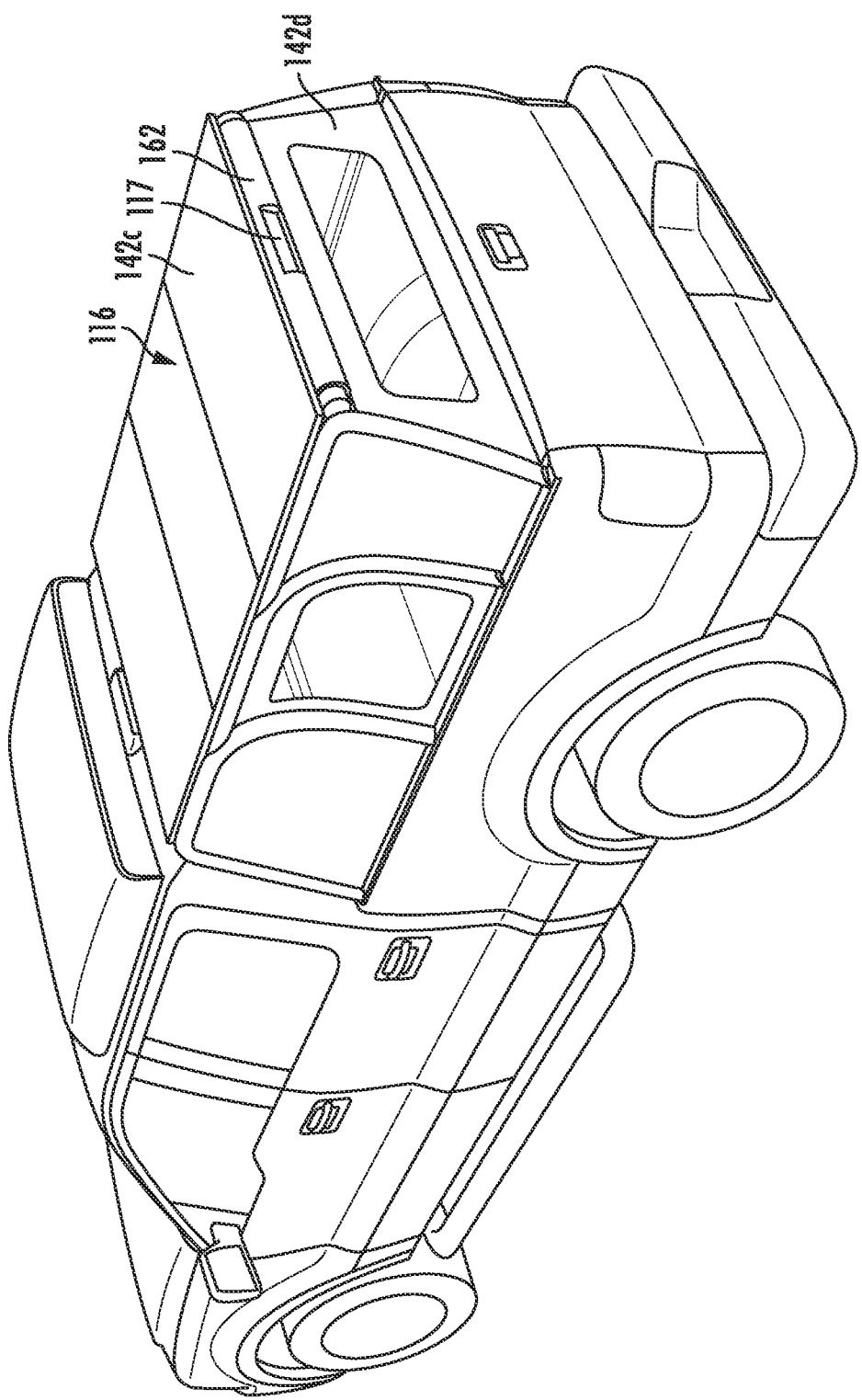
FIG. 14 illustrates the cover when fully deployed and the shield when rotated back downward.

Referring now to the drawings, a truck 10 having a collapsible shell 12, 112 is shown. The collapsible shell 12, 112 may be traversed to a stored position, as shown in FIGS. 1 and 7 which allows the user to have full access to a bed 14 of the truck. The collapsible shell 12, 112 may also be traversed to an extended position, as shown in FIGS. 6 and 14 which provides for a protected interior volume under a cover 16, 116 at the truck bed 14. In this manner, the collapsible shell 12, 112 provides for either full access to the truck bed when the collapsible shell 12, 112 is in the collapsed or stored position or when needed an interior protected volume at the truck bed 14 so that utility of the truck bed 14 is not diminished when the collapsible shell 12, 112 is mounted to the truck 10. The user can load a full-sized motorcycle on top of the truck bed 14 when the collapsible shell 12, 112 is in the collapsed or stored position. When needed, the user can also traverse the collapsible shell 12, 112 to the extended or erected position when needed in order to create the interior protected volume at the truck bed 14 to store things.

The collapsible shell 12, 112 is discussed herein in relation to the truck 10 having the truck bed 14. However, it is also contemplated that the collapsible shell 12, 112 may also be mounted to any type of vehicle having a cargo area with an open top area. By way of example and not limitation, the collapsible shell 12, 112 may also be mounted to a golf cart having an open cargo area or container behind the passenger area. Additionally, the collapsible shell 12, 112 may be mounted to a container having an open top.

The truck 10 may define a cab 18 having a roof 20. The truck bed 14 may define first and second side walls 22, 24 which are positioned on opposite sides of a floor 26 of the truck bed 14. As discussed above, the collapsible shell 12, 112 may be mounted to other types of vehicle as well as to a container. In this regard, opposed walls of the container would be the functional equivalent of the first and second side walls 22, 24 of the truck bed 14.

Referring now to FIGS. 1-6, a first embodiment of the collapsible shell 12 is shown. The second embodiment of the collapsible shell 112 shown in FIGS. 7-14 is identical to the first embodiment of the collapsible shell 12 shown in FIGS. 1-6 except as described further below. The collapsible shell 12 may have a plurality of first frames 28a-n and a plurality of second frames 30a-n. The first and second frames 28a-c, 30a-c may be slidably mounted to the first and second side walls 22, 24 of the truck bed 14. The plurality of first frames 28a-c may be slidably mounted to the first side wall 22 by installing a sliding track 32 on an upper edge or surface of the first side wall 22. Similarly, the plurality of second frames 30a-c may be slidably mounted to the second side wall 24 by installing a sliding track 34 on an upper edge or surface of the second side wall 24. Followers may be mounted to a bottom side of the frames 28, 30 wherein the followers slidably engaged the first and second sliding tracks 32, 34. The followers and sliding tracks 32, 34 allow the first and second frames 28, 30 to slide between a collapsed position and an extended position.

Figure 3:
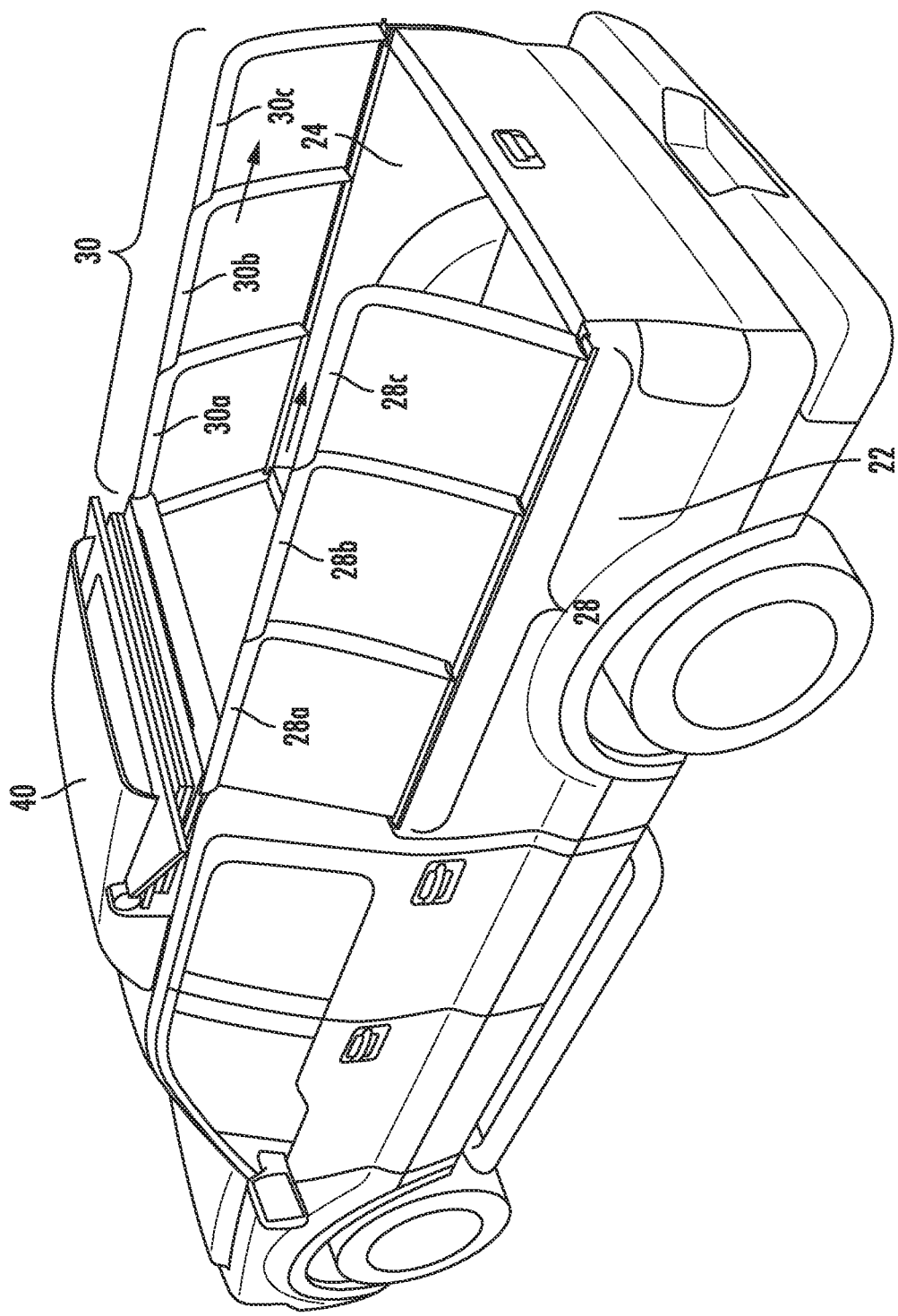
FIG. 3 illustrates the telescoping truck bed shell shown in FIG. 1 when the frames are fully deployed.
Figure 4:
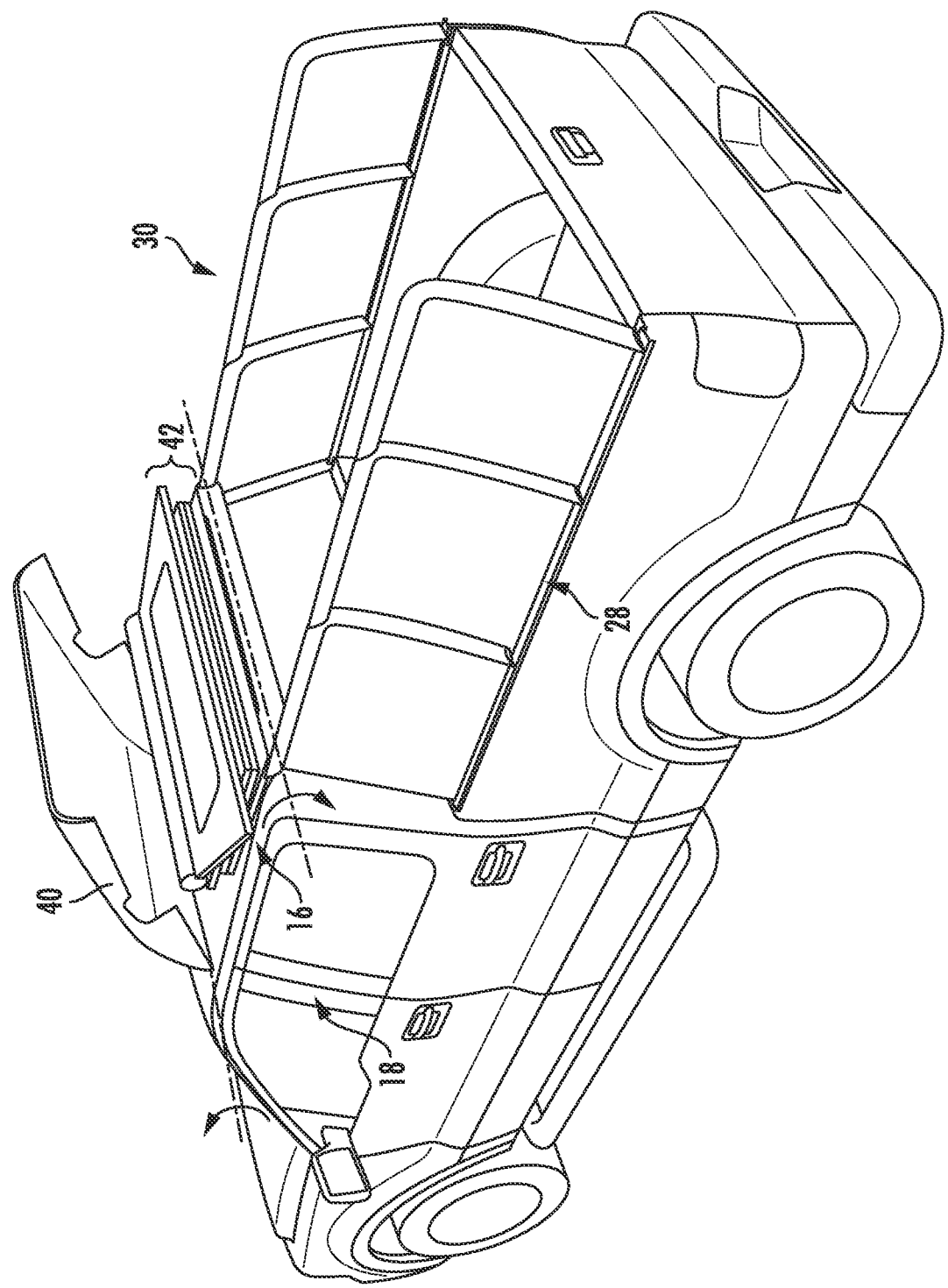
FIG. 4 illustrates a shield rotated upward to prepare for deployment of a cover of the telescoping truck bed shell.

FIG. 3 illustrates the plurality of first and second frames 28, 30 when the frames 28, 30 are in the fully extended position. The first frames 28b, 28c may be slidably mounted to the first side wall 22 while the first frame 28a may be rigidly secured to the first side wall 22 or sliding track 32. Similarly, the second frames 30b, 30c may be slidably mounted to the second side wall 24 while the second frame 30a may be rigidly secured to the second side wall 24 or sliding track 34. Front portions 36, 38 of the frames 28a, 30a may be attached to the cab 18 in a manner that allows for some flex. As the truck 10 moves over uneven terrain, the cab 18 may move independent from the truck bed 14. By attaching the frames 28a, 30a to the cab 18 to allow for some flex, movement of the cab 18 does not transfer any undue force to the truck bed 14 and movement of the truck bed 14 does not transfer any undue force to the cab 18 so that usage of the collapsible shell 12 does not compromise the structural integrity of the truck bed 14, the cab 18 and the shell 12.

The sliding track 32, 34 may each have two races. The first race of the sliding track 32 may receive the follower attached to the first frame 28b. The second race of the sliding track 32 may receive the follower attached to the first frame 28c. The first race of the sliding track 34 may receive the follower attached to the second frame 30b. The second race of the sliding track 34 may receive the follower attached to the second frame 30c. The frames 28a and 30a may be fixedly secured to the first and second side wall 22, 24. The follower may be a tongue and the first and second races of the first sliding track 32 may be grooves that receive the follower. Alternatively, the follower and the first and second races may have a ball bearing engagement between the two so that the weight of the frames 28b, c, 30b, c does not hinder sliding movement of the frames 28b, c, 30b, c along the first and second sliding tracks 32, 34. Optionally, the first and second frames 28a, 30a may be slidably attached to the first and second side walls 22, 24 by providing for an additional race in the first and second sliding tracks 32, 34 that receive followers that are attached to the first and second frames 28a, 30a. The followers may be secured to the bottom side of the frames 28, 30. The races may be parallel to each other.

Alternatively, the first frames 28b, 28c may be slidably attached to the first frames 28a, 28b. Similarly, the second frames 30b, c may be slidably attached to the second frames 30a, b. The slidable attachment between the respective first and second frames 28a, b, c and 30a, b, c may be achieved through a tongue and groove connection between the first frames 28b to 28a and 28c to 28b as well as between the second frames 30b to 30a and 30c to 30b. When the first and second frames 28, 30 are in the extended position, as shown in FIG. 3, the first and second frames 28, 30 may be locked to the extended position.

The frames 28, 30 may each be fabricated from a rigid tubular material. In the drawings, the rigid tubular material has an L-shape. However, it is also contemplated the rigid tubular material may be rectangularly shaped. The L-shaped tubular material may also have a generally rigid panel 31 which may be opaque, transparent or translucent. The followers may be attached to the bottom sides of the rigid panel for mounting to the sliding tracks 32, 34. If the frames 28, 30 are rectangularly shaped tubular material, then the followers may be attached to the bottom sides of the rigid tubular material of the bottom side thereof.

Other materials for the frame 28, 30 may also be utilized including but not limited to fiberglass, carbon fiber, aluminum or solid bar. The frame 28, 30 may be fabricated from a material that can withstand wind and driving forces due to the truck 10 driving on the freeway at speeds of up to 65-90 mph and cornering.

The frames 28, 30 may collapse and extend along the side walls 22, 24 of the truck bed 14. However, the frames 28, 30 may not provide any protection on the top of the shell 12, 112. Rather, the frames 28, 30 only protect the sides of the collapsible shell 12, 112. To this end, the collapsible shell 12, 112 may further have a cover 16 that can be secured to the frames 28, 30 when the frames 28, 30 are telescoped out to the extended position (see FIG. 4). The cover 16 may start from a stored position collapsed over the cab 18 of the truck 10. When the cover 16 is in the stored position, a fairing 40 may shield the cover 16 so that as the truck 10 moves forward, oncoming wind flows over the cover 16 and the cover 16 does not add to the wind resistance of the truck 10. Moreover, the fairing 40 mitigates the possibility that wind will pick the cover 16 up inadvertently when the cover 16 stored position and rip the cover 16 off of the roof of the cab.

Although the frames 28, 30 are shown as having an open top when the frames 28, 30 are in the extended position it is also contemplated that the frames 28, 30 may extended inward or medially at the top so as to provide protection to the top side of the shell 12, 112. The medial sides of the extended portions of the frames 28, 30 may join together and provide for a watertight seal.

Figure 5:
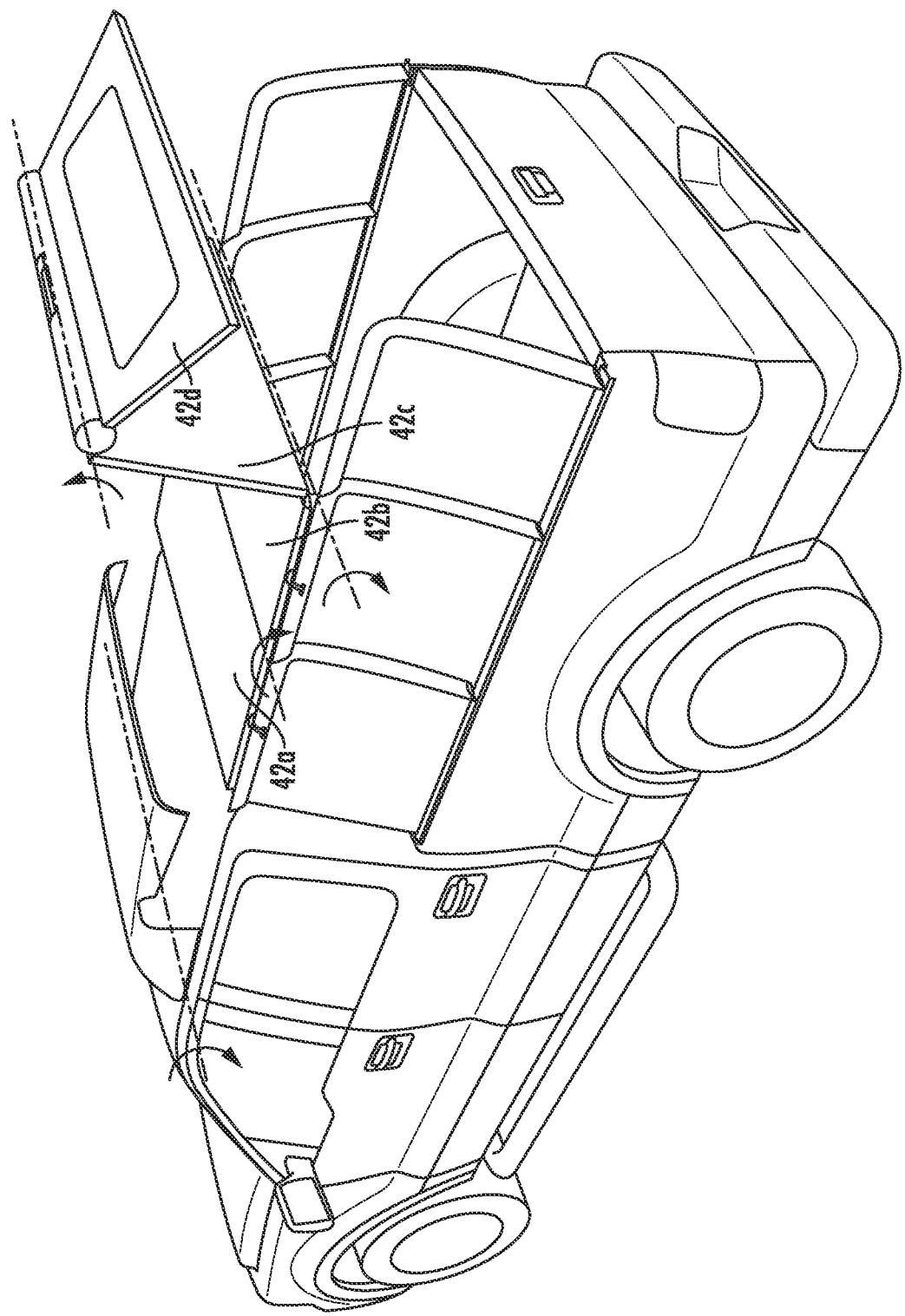
FIG. 5 illustrates the shield rotated back downward and the cover being deployed.

The cover 16 may comprise a plurality of panels that can be stacked upon each other in an accordion fashion. This is shown in FIGS. 5 and 6. Four panels 42a-d may make up the cover 16. Although only four panels 42a-d is shown as making up the cover 16, it is also contemplated that the cover may be fabricated from one or more panels 42. If it is only a single panel, then the panel 42 would cover only the topside of the shell 12 but not the backside of the collapsible shell 12, 112. Moreover, the cover 16 is shown as being a plurality of rigid panels that are stacked in an accordion fashion. However it is also contemplated that the cover 16 may be fabricated from a flexible material that can be rolled up and disposed under the fairing 40 then unrolled in order to protect or form an enclosure over the truck bed 14 in conjunction with the frames 28, 30. The flex cover 16 would also be capable of being unrolled to cover the back side of the shell 12.

The cover 16 may be sufficiently wide in order to engage the topsides of the frames 28, 30. More particularly, the cover 16 may form a seal along the topsides of the frames 28, 30 wherein the seal may be watertight to provide a dry interior volume over the truck bed 14. The cover 16 may have a rubber seal along the outer peripheral edges that engage the frames 28, 30 to form that watertight seal. The cover 16 may be secured to the frames 28, 30 with latches including but not limited to rubber latches or mechanically operated latches.

To deploy the cover, the fairing 40 which may be pivotally attached to the roof 20 of the cab 18 may be pivoted upward as shown in FIG. 3. The fairing 40 may be held in the upward position by a spring. The fairing 40 may also be held in the down position or stored position with the latch to resist the upward spring motion. The latch may be attachable to the shield and the roof of the cab and be detachable in order to traverse the fairing 40 to the upward position. By pivoting the fairing 40 upward, this provides room or allows the cover 16 to be unfolded over the truck bed as shown in FIGS. 5 and 6. The fairing 40 may be placed back to the down position, as shown in FIGS. 5 and 6 and locked into place with a lock. The cover 16 may also be secured to the frames 28, 30 with a locking mechanism 44. A plurality of locking mechanism 44 may be disposed along the length of the frames 28, 30 so as to engage the frames 28, 30 and the cover 16 to each other.

The frames 28, 30 are shown as being stacked upon each other as shown in FIG. 1. When the frames 28, 30 are deployed, the frames 28b, c and 30b, c may slide outward and also pivot into alignment with the frame 28a, 30a so that the frames 28a, b, c are in the same plane and the frames 30a, b, c are in the same plane. The frames 28b, c and 30b, c are shown as being offset from the frame 28a, 30a in FIG. 2. This shows the frames 28b,c, and 30b,c before they are pivoted into alignment with the frames 28a, 30a.

The fairing 40 may also have a cutout to allow for the panels 42 which may be too wide for the fairings 40, as shown in FIG. 1. The cutout 46 allows the panels 42 to extend beyond the width of the fairing 40.

Referring now to FIGS. 7-14, the collapsible shell 112 will be discussed. The collapsible shell 112 is identical to the collapsible shell 12 discussed in relation FIGS. 1-6. However, certain differences do exist which are described below. The frames 28a, 30a may be fixedly attached to the side walls 22, 24. Additionally, a crossbar 148 may be attached to the frames 28, 30.

Figure 12:
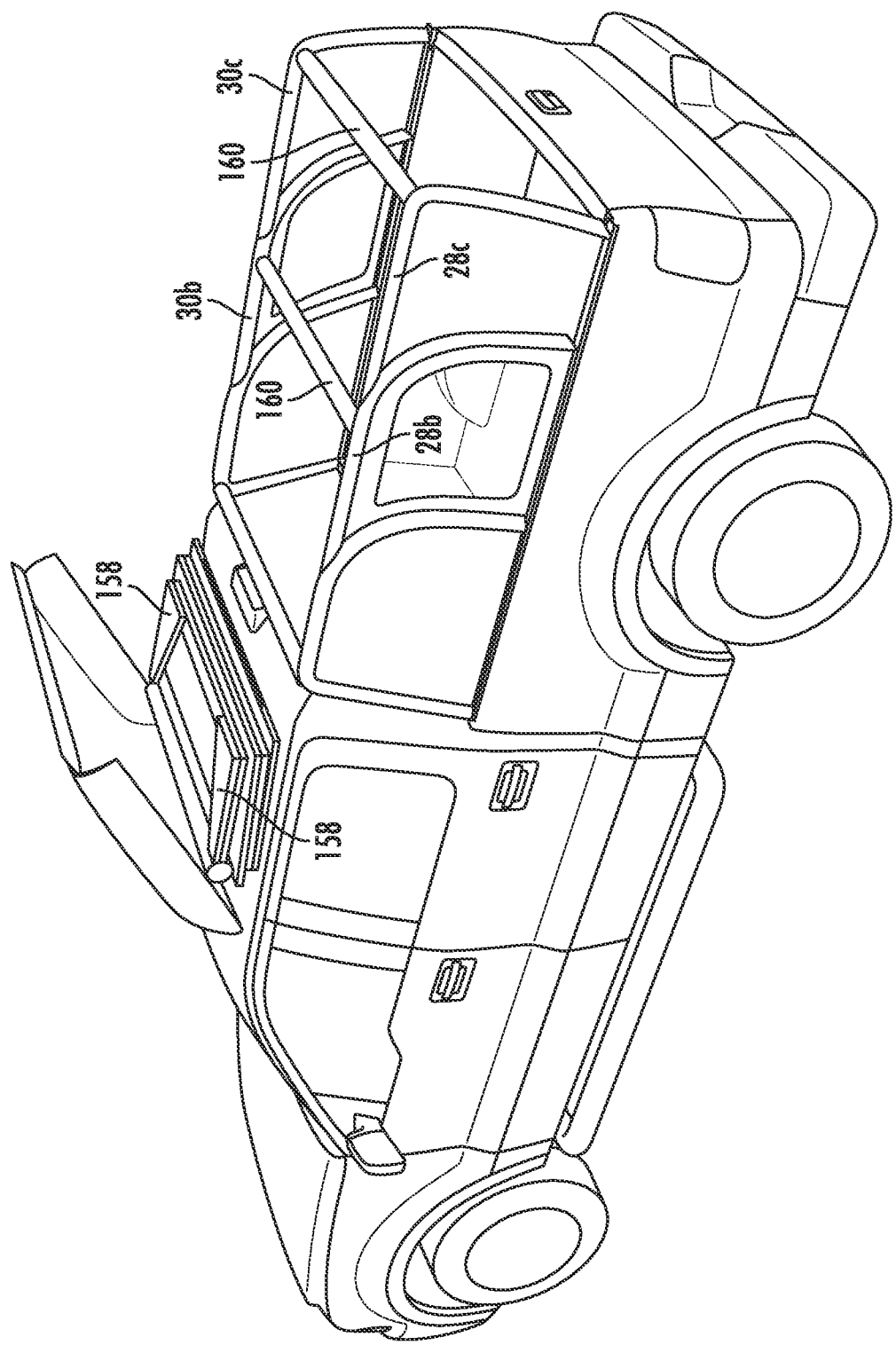
FIG. 12 illustrates full deployment of the frames and the cross members attached to the frames.
Figure 13:
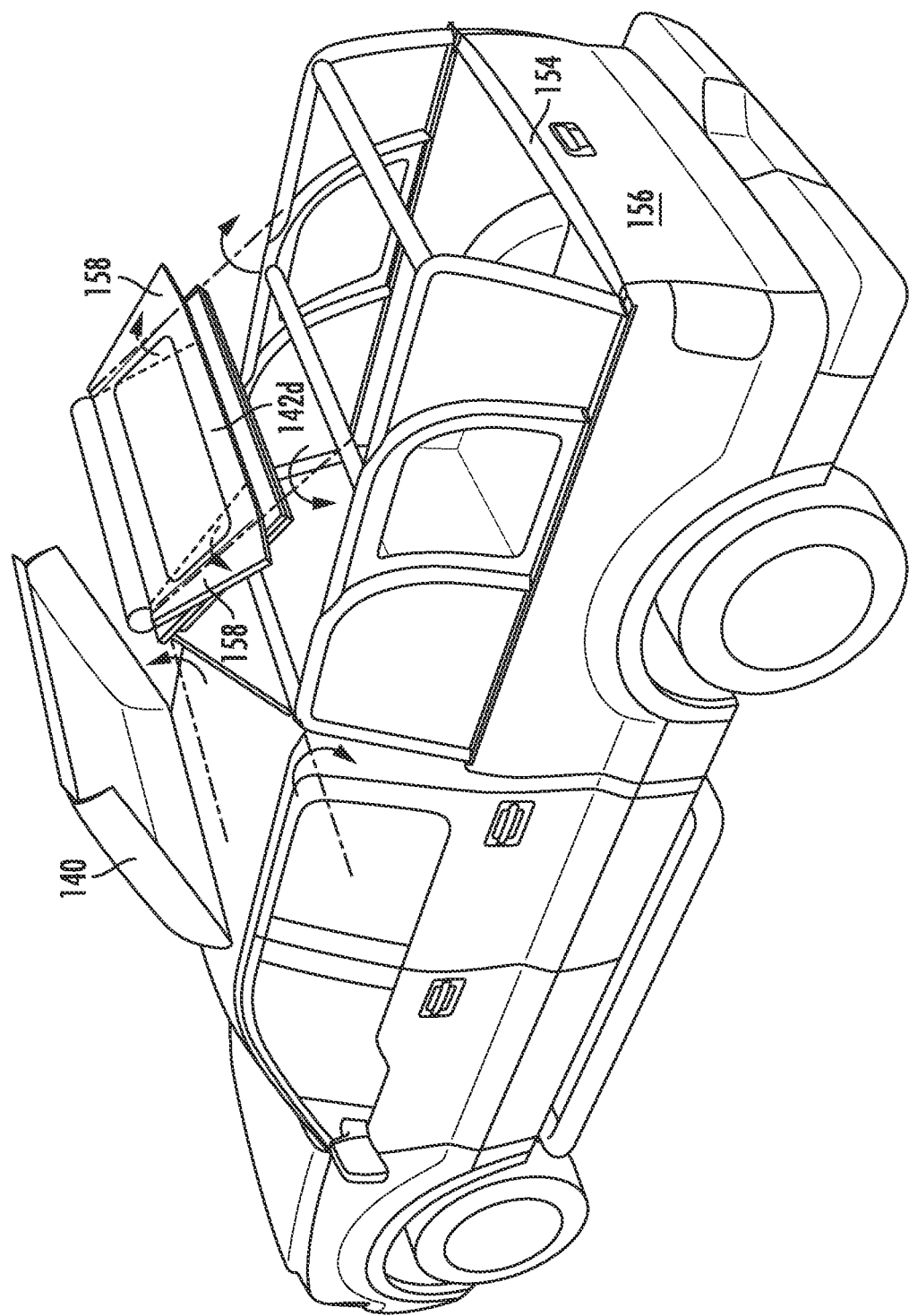
FIG. 13 illustrates the cover being deployed over the frames.

Moreover, the fairing 140 may additionally have a rear flap 150 that is flexible and pivotable about a rear edge 152 of the fairing 140. The fairing 140 may optionally not have the cutout 46 because the panels 142 of the cover 116 may be modified so as to be narrower than a width of the fairing 140. In particular, the panels 142 of the cover 116 is only wider than the fairing 140 because the panel 142d extends outward at the bottom so that the panel 142d can form an enclosure about the entire width of the upper edge 154 of the tailgate 156 of the truck 10. The panel 142d may have pivoting side flaps 158 which are folded inward as shown in FIG. 12 so that the panels 142 are narrower than the fairing 140 and can fit entirely within the fairing 140. For this reason, the cutout 46 placed in the fairing 40 is not required in the fairing 140. The fairing 140 may be traversable between the upper position and the down position in the same manner as that of fairing 40 with or without a spring to traverse the fairing 40 to the upward position and with or without a latch to hold the fairing 140 in the downward position. The same is true for fairing 40.

Additionally, the panel 142 are deployed in the same manner in relation to the panels 42 discussed in relation to FIGS. 1-6 except that in the embodiment shown in FIGS. 7-14, there is an extra step of unfolding the side flaps 158 outward for engaging the panel 142 to the closed position, as shown in FIG. 14.

Moreover, the collapsible shell 112 may have supporting cross members 160 that may be attached to the frames 28b, c and 30b, c, shown in FIG. 12. The supporting cross members 160 provide additional rigidity to the collapsible shell 112. Moreover, the cover 116 may have a pivoting joint 162 that allows the panels 142c and 142d to pivot about each other. The pivoting joint 162 may also be secured to the supporting crossmember 160 attached to the frames 28c, 30c. The cover 16 may be secured to the frames 28, 30 with latches including but not limited to rubber latches or mechanically operated latches.

The supporting crossmembers 160 may be stored under the fairing 141 the collapsible shell 112 is in the collapsed position. The supporting crossmembers 160 may be attached to the frames 28b, c and 30b, c with quick attach mechanisms known in the art or developed in the future. The crossmembers 160 and the frames 28, 30 may have quick detach mechanisms so that the supporting crossmembers 160 may be removably attached to the frames 28, 30 so that the supporting crossmember 160 may be stored in the fairing 140 when the collapsible shell 112 is in the collapsed position. Also, when needed, the supporting crossmember 160 may be removed from fairing 140 and attached to the frames 28b, c and 30b, c to attach to the frames 28, 30. The crossmembers 160 may be used to assist in deploying and storing the shell 12, 112.

The collapsible shell 12, 112 may be traversed from the stored or collapsed position to the extended position either manually or under the power of a motor. When done manually, the user will grasp the frame 28c and begin to pull the frame 28c toward the tailgate. Additionally, the user will grasp 30c and begin to pull the frame 30c toward the tailgate. By doing so, the frames 28b, c and 30b, c are traversed to the extended position. Alternatively, for the collapsible shell 112, the user may secure the supporting crossmember 160 to the frame 28c and 30c first and then grip the supporting crossmember 160 and traverse the supporting crossmember 160 toward the tailgate. By doing so, this also traverses the frames 28b, c and 30b, c toward the extended position simultaneously. It is also contemplated that the frames 28b, c and 30b, c may be traversed to the extended position under the power of a motor. The motor may drive a rack and pinion configuration attached to the frames 28b, c to either the frame 28a or side wall 22. The same or different motor may also drive the rack and pinion configuration attached to the frames 30b, c attached to either the frame 38 or side wall 24. The motor(s) may be actuated by a controller to either traverse the frames 28b, c, 30b, c to the extended position and/or back to the collapsed position.

The fairing 40, 140 are shown as being rotatably attached to the cab of the truck. However, the fairing 40, 140 may also be removable from the cab of the truck so that the user can remove the shell from the truck if desired. For example, truck cabs may have integrated rails on the driver side and passenger side of the cab of the truck. The fairing 40, 140 may be removably attached to the left and right rails on the top of the cab. The fairing 40, 140 may also be integrated into the cab of the truck in that it is not removable without significant time and effort.

The cover 16, 116 may have an integrated third brake light 17, 117. The third brake light 17, 117 may be in electrical communication with the electrical system of the truck so that the third brake light 17, 117 is illuminated when brakes of the truck are actuated. The third brake light 17, 117 may be disposed between panels 42c and 42d for the embodiment shown in FIGS. 1-6 and between panels 142c and 142d for the embodiment shown in FIG. 7-14.

The cover 16, 116 and the frames 28, 30, 128, 130 when in the deployed state shown in FIGS. 6 and 14 may be waterproof so that rain water does not and cannot enter the truck bed area. To this end, the cover 16, 116 and the frames 28, 30, 128, 130 may have rubber seals and other sealing mechanisms for keep the water out of the truck bed area.

Figure 15:
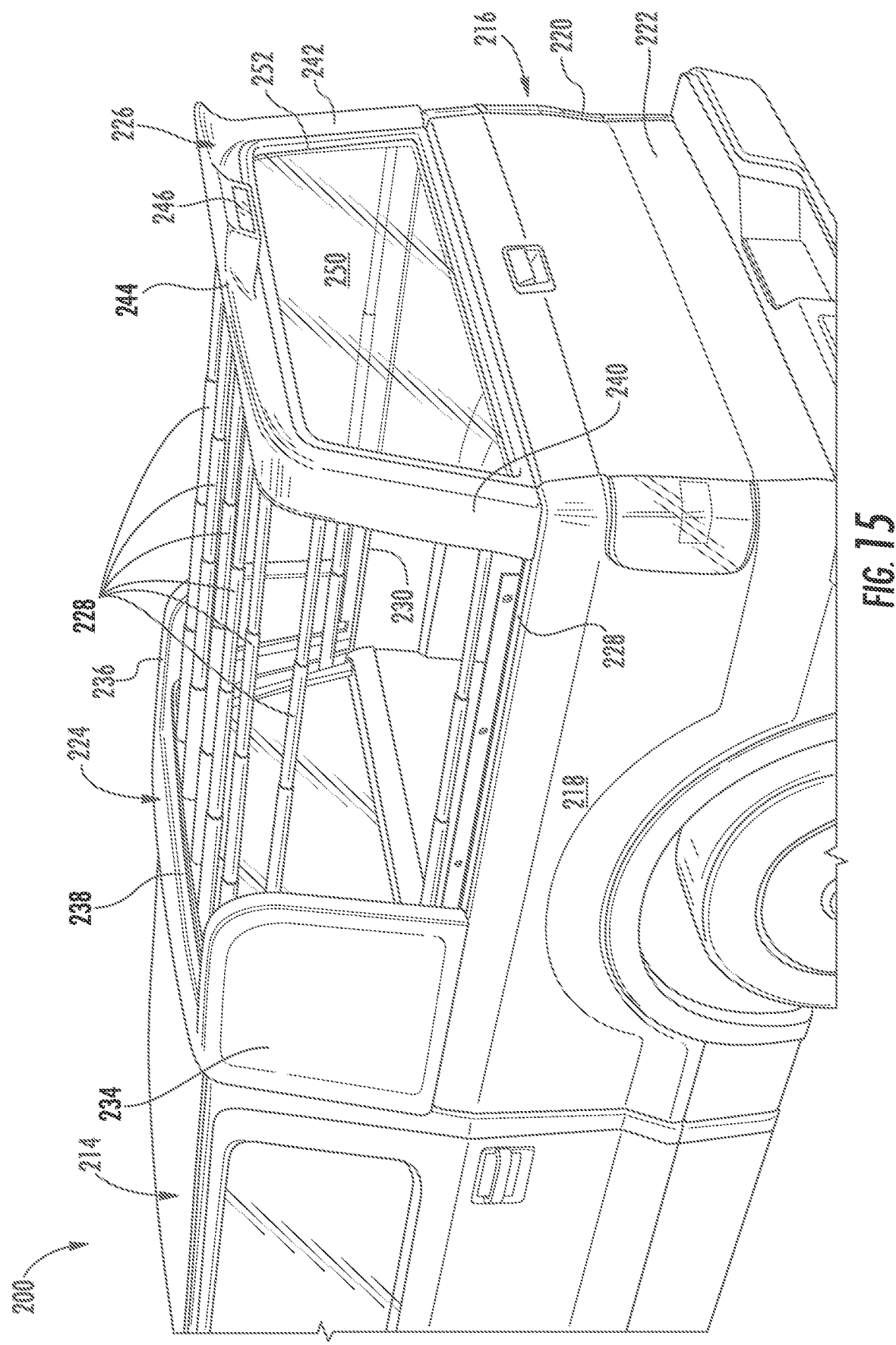
FIG. 15 is a perspective view of a side wall mounted truck bed cover.

Referring now to FIG. 15, there is depicted a truck 200 having another embodiment of a telescopically collapsible shell 212. The shell 212 may be truck bed mounted (i.e., not mounted directly to the cab) and include a detachable window so as to facilitate storage of larger items, such as a motorcycle, in the bed of the truck 200 when the shell 212 is in a collapsed position.

The truck 200 generally includes a cab 214, and a truck bed 216 having side walls 218, 220, and tailgate 222 pivotable relative to the side walls 218, 220 between a raised position and a lowered position.

The shell 212 may be sized to be extendable over the truck bed 216 to define an enclosure. The shell 212 generally includes a first rigid member 224 positionable adjacent the cab 214, a second rigid member 226 moveable relative to the first rigid member 224, and a plurality of telescoping support structures 228 extending between the first rigid member 224 and the second rigid member 226. Along these lines, the shell 212 may incorporates rails 228, 230 on the first and second side walls 218, 220 of the truck bed 216 that allow at least the second rigid member 226 to slidably traverse relative to the first and second side walls 218, 220 between a deployed position and a collapsed position.

The first rigid member 224 includes a first side portion 234, a second side portion 236, and an upper portion 238 extending between the first side portion 234 and the second side portion 236. The first and second side portions 234, 236 may include panels extending rearwardly toward the second rigid member 226, beyond the upper portion 238. The first and second side portions 234, 236 may be mounted to the first and second side walls 218, 220 of the truck bed 216, respectively. In this regard, it is contemplated that intervening structures, such as gaskets, washers, rails 228, 230, etc., may be positioned between the first and second side portions 234, 236 and the first and second side walls 218, 220; however, the first and second side portions 234, 236 provide the foundational structure of the truck 200 which most directly supports the first and second side portions 234, 236. In other words, the first rigid member 224 may not be directly attached to the cab 214 when it is mounted to the truck bed 216 (i.e., the first rigid member 224 may be mounted solely to the truck bed 216). Such separation of the first rigid member 224 from the cab 214 may result in a gap existing between the cab 214 and the first rigid member 224, and may also allow for pivoting of the shell 212 relative to the cab 214 so that as the truck 200 moves over uneven terrain and the body of the truck 200 twists and turns, the first rigid member 224 moves with the bed 216 of the truck 200 and not with the cab 214. This allows the shell 212 to move independent of the cab 214 so that the twisting and turning of the cab 214 when the truck 200 travels over uneven terrain does not transfer all of the energy from the twisting and turning cab 214 to the first rigid member 224.

The first rigid member 224 may be mounted so as to remain stationary relative to the first and second side walls 218, 220, or alternatively, the mounting of the first rigid member 224 to first and second side walls 220 may allow the first rigid member 224 to translate relative to the first and second side walls 218, 220. As such, the first rigid member 224 may be mounted directly to the first and second side walls 218, 220 or to the rails 228, 230.

The second rigid member 226 may include a first side portion 240, a second side portion 242, and an upper portion 244 extending between the first side portion 240 and the second side portion 242. The upper portion 244 may include a light 246, such as a tail light integrated therein. In this regard, the second rigid member 226 may include an internal power source for powering the light 246, or may be connectable to a power source on the truck 200. The first and second side portions 240, 242 may be mounted to the first and second side walls 218, 220 of the truck bed 216, respectively, via the rails 228, 230 on the first and second side walls 218, 220 to allow the second rigid member 226 to slide over the first and second side walls 218, 220 along a slide axis 248 (see FIG. 22) between a deployed position and a collapsed position. The second rigid member 226 may move toward the first rigid member 224 as the second rigid member 226 transitions from the deployed position toward the collapsed position. Conversely, the second rigid member 226 may move away from the first rigid member 224 as the second rigid member 226 transitions from the collapsed position toward the deployed position.

According to one embodiment, a window 250 is detachably engageable with the second rigid member 226. The second rigid member 226 and the truck bed 216 may define a window opening 252 when the second rigid member 226 is in the deployed position. The window 250 may be sized to be complimentary in shape to the window opening 252 so as to extend between the second rigid member 226 and the truck bed 216 when the second rigid member 226 is in the deployed position. In particular, the tailgate 222 may define a portion of the window opening 252 such that the window 250 extends to the tailgate 222 when the second rigid member 226 is in the deployed position and the window 250 is engaged with the second rigid member 226.

As noted above, a plurality of telescoping support structures 228 may extend between the first rigid member 224 and the second rigid member 226. The telescoping support structures 228 may be straight and extend or contract solely in the longitudinal direction, i.e., in a direction parallel to the slide axis 248. The telescoping support structures 228 may be oriented horizontally generally parallel to the truck bed 216. Each telescoping support structure 228 may be connected to the first rigid member 224 and the second rigid member 226 in a direction parallel to the slide axis 248. The plurality of telescoping support structures 228 may collapse as the second rigid member 226 transitions from the deployed position toward the collapsed position. Each telescoping support structure 228 may define a length as that distance along the telescoping support structure 228 between the first rigid member 224 and the second rigid member 226. Thus, as the second rigid member 226 moves relative to the first rigid member 224, the lengths of the telescoping support structures 228 may vary. Each telescoping support structure 228 may expand as the second rigid member 226 transitions from the collapsed position toward the deployed position. In this regard, each telescoping support structure 228 may be formed from a plurality of segments, such that as the telescoping support structure 228 collapses, the degree by which at least two adjacent segments overlap increases, which results in a decrease of the overall length of the telescoping support structure 228. Conversely, as the telescoping support structure 228 expands, the degree by which at least two adjacent segments overlap decreases, which results in an increase of the overall length of the telescoping support structure 228.

According to one embodiment, the shell 212 includes two telescoping support structures 228 on each side portion of the shell 212 and five telescoping support structures 228 along a top portion of the shell 212 for a total of nine support structures 228. However, it is understood that the scope of the present disclosure is not limited thereto, and that other embodiments may have fewer than nine support structures 228 or greater than nine support structures 228.

Figure 16:
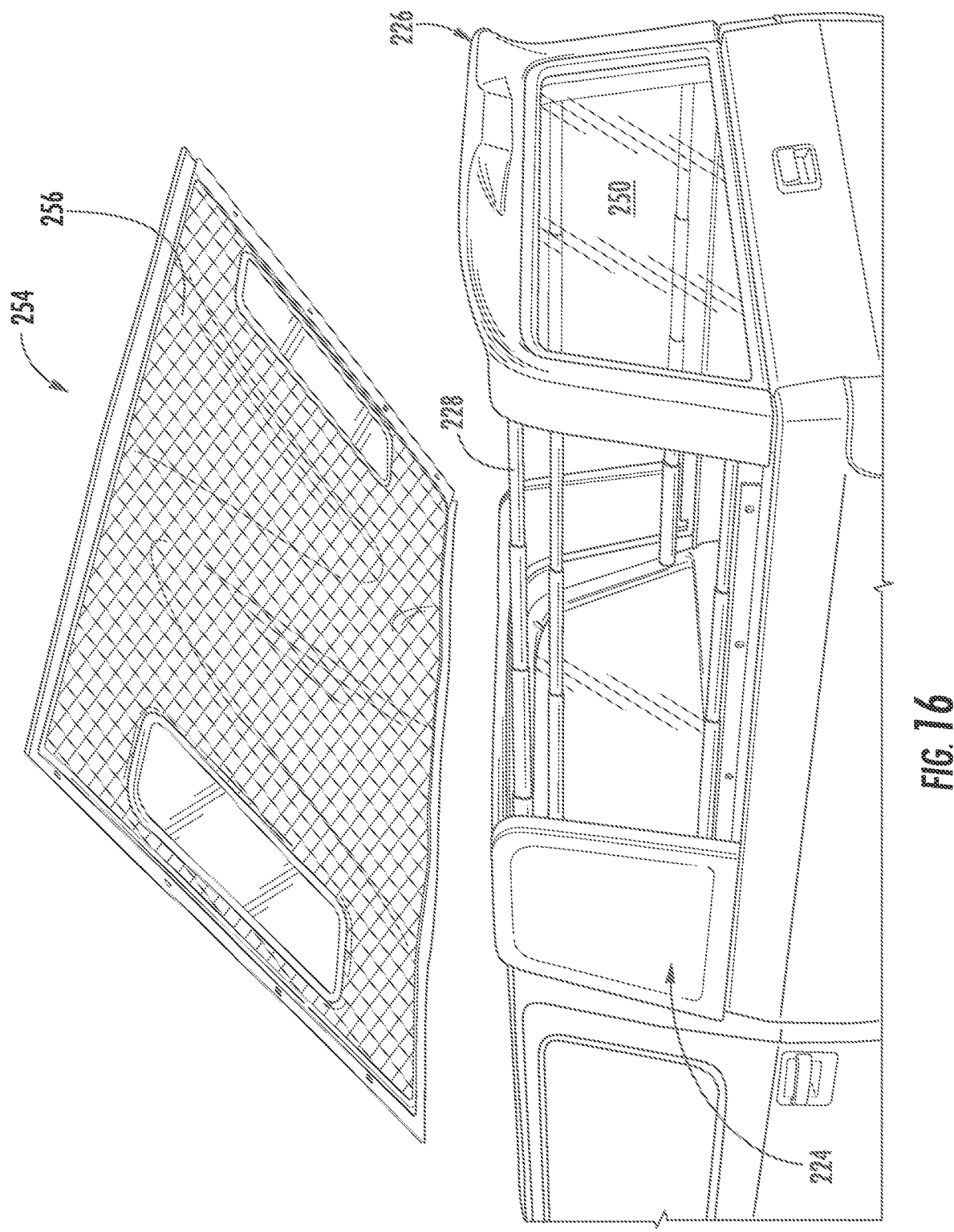
FIG. 16 is a perspective view of the side wall mounted truck bed cover with a shell disposed above a plurality of telescoping support structures.
Figure 17:
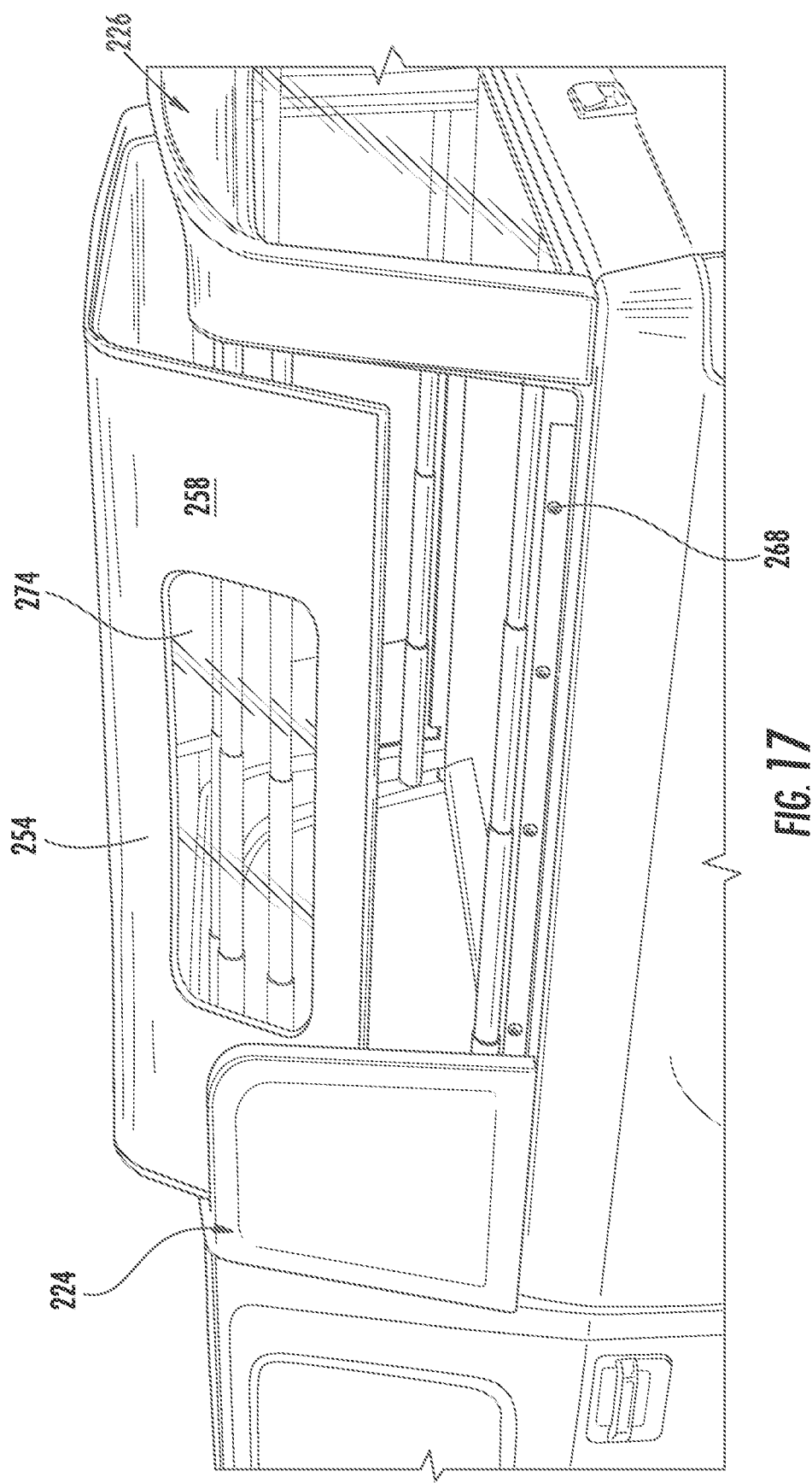
FIG. 17 is a perspective view of the cab mounted truck bed cover and the shell with the shell being positioned over the telescoping support structures.
Figure 18:
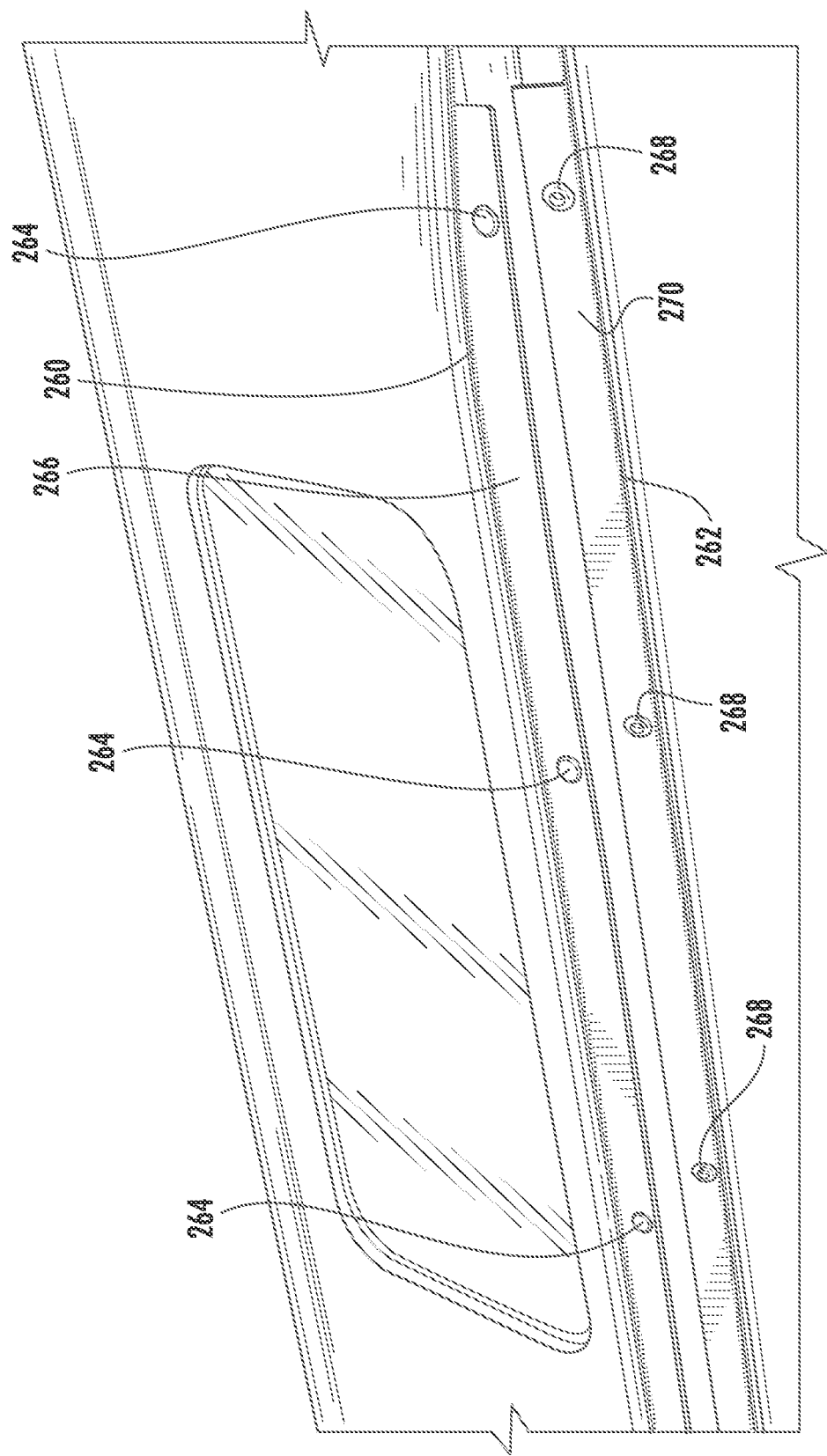
FIG. 18 illustrates snaps of the shell being attached to snaps attached to the truck bed.

Referring now to FIGS. 16 and 17, a cover panel 254 is shown. The cover panel 254 may have an outer layer 258 that may preferably be water impermeable, but is also contemplated to be non-water impermeable. The outer layer 258 may be attached to an elastic netting 256, which may be disposed on the bottom side of the outer layer 258. The elastic netting 256 may define an outer periphery which is attached to the outer periphery of the outer layer 258. Preferably, the outer periphery of the elastic netting 256 is smaller than the outer periphery of the outer layer 258 so that when the cover panel 254 is attached to the first and second rigid members 224, 226, and when the shell 212 is in the deployed position, the elastic netting 256 may cause the cover panel 254 to be taut. The elastic netting 256 may be selectively secured to the outer layer 258 at various points interior to the outer periphery of the outer layer 258.

The outer perimeter of the cover panel 254 may have a first half of a zipper 260. Additionally, a second half of the zipper 262 may also be lined along a length of the first and second side walls 218, 220 of the truck bed, 216. The second half of the zipper 262 may be secured to the rails 228, 230 and more particularly be disposed on an outer side of the rails 228, 230 to allow rainwater to cascade away from the interior of the truck bed 216 and onto the exterior side of the first and second side walls 218, 220 of the truck bed 216. The second rigid member 228 may also have a second half of the zipper 558 attached to the frontal perimeter of the second rigid member 228. The second half of the zipper 558 attached to the second rigid member 228 may be tucked under the left and right side walls 258, 260 and the roof 262. Moreover, the first and second halves of the zipper 260, 262 may have a water-resistant covering to further mitigate passage of rainwater through the zipper 260, 262.

Figure 19:
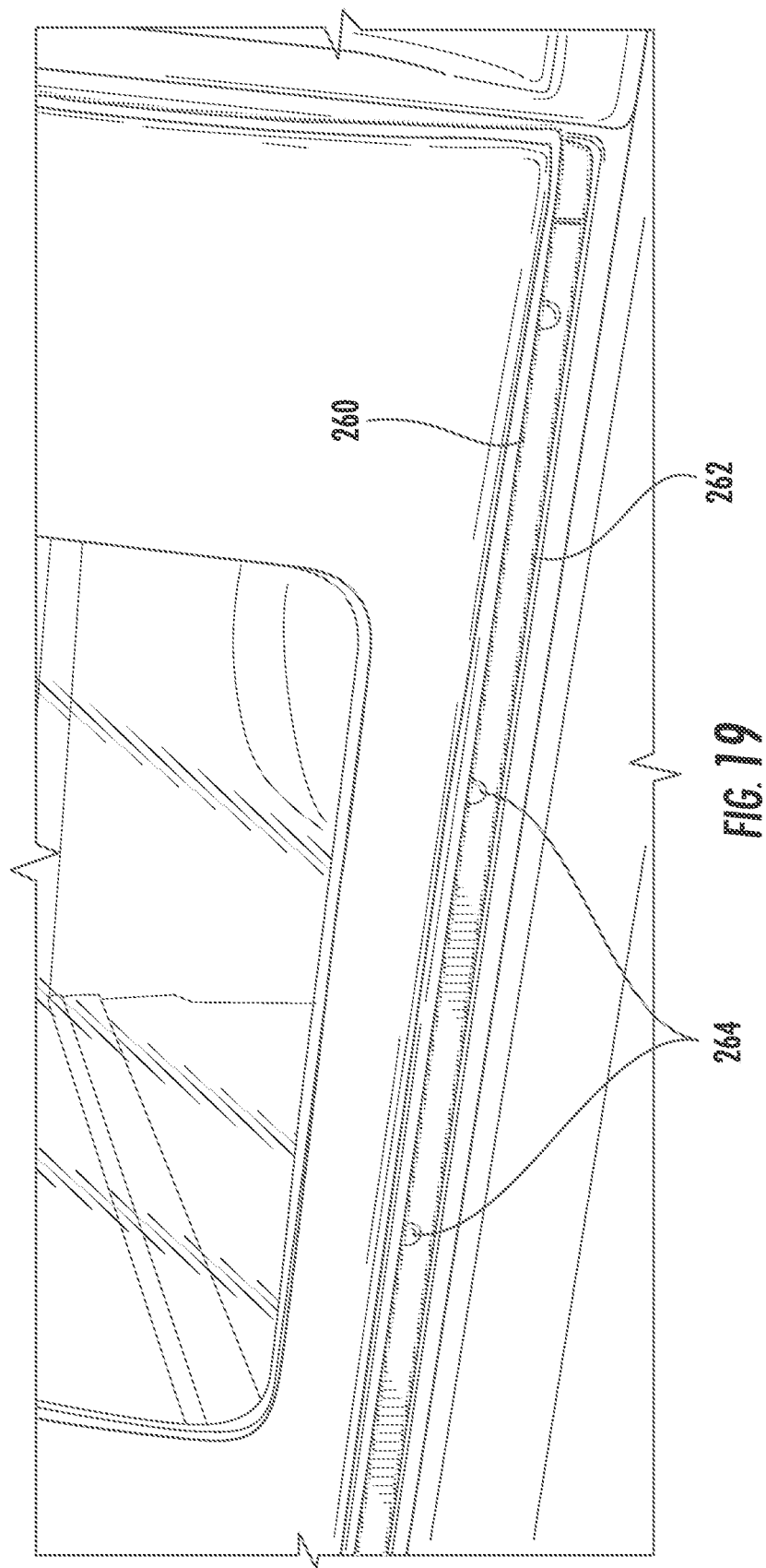
FIG. 19 illustrates the snaps of the shell connected to the snaps attached to the truck bed.
Figure 20:
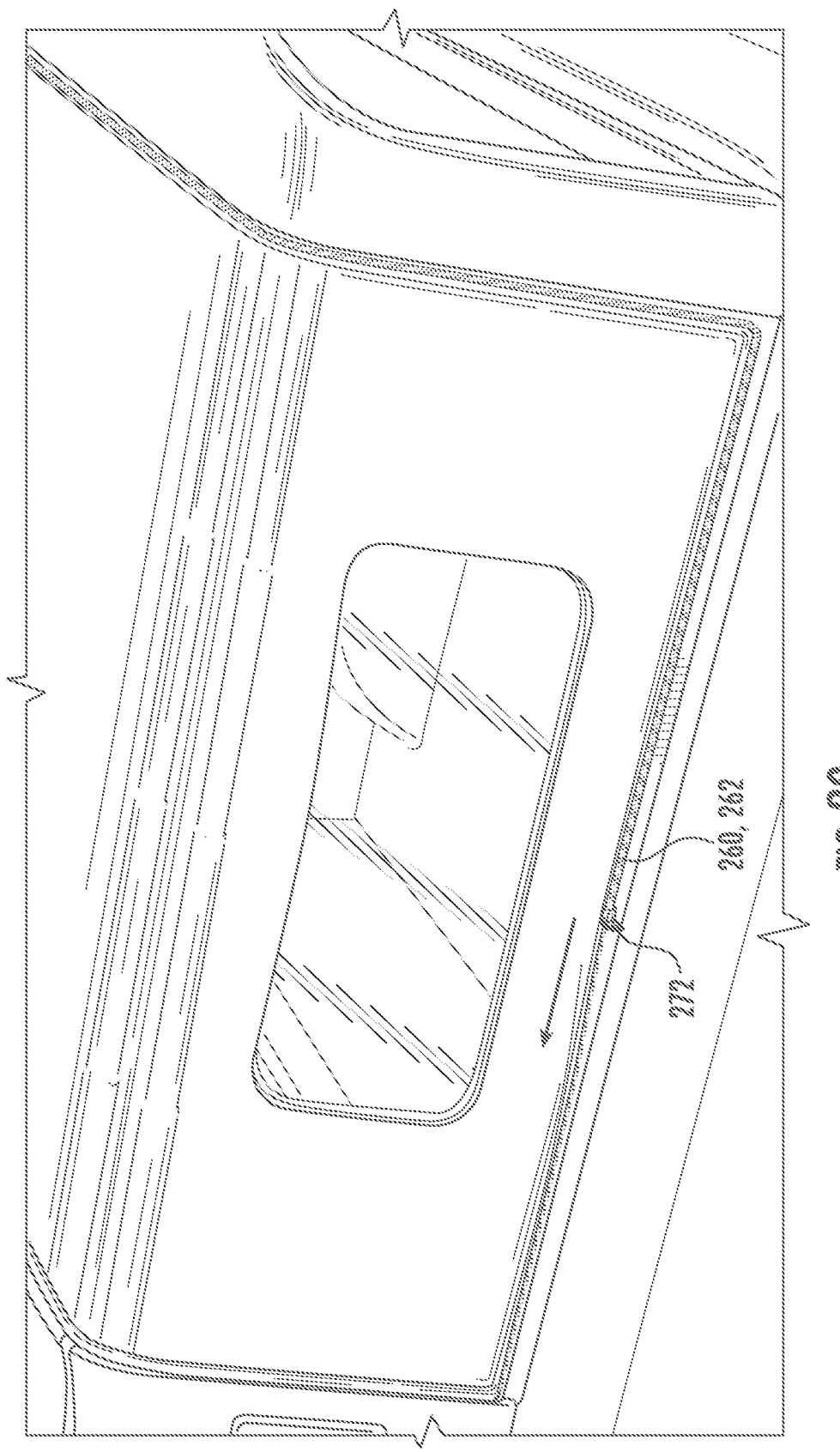
FIG. 20 illustrates a first half of a zipper attached to the shell being engaged a second half of the zipper attached to side walls of the truck bed and a rigid member.

Referring now to FIG. 17, the cover panel 254 may be aligned to the first and second side walls 218, 220 of the truck bed 216 and the first and second rigid members 224, 226. To attach the cover panel 254 to the truck bed 216 and the first and second rigid members 224, 226, the cover panel 254 may have a plurality of snaps 264 along an edge that is connected to the first and second side walls 218, 220 of the truck bed 216. The snaps 264 may be secured to a hem 266 that extends under the outer layer 258. The snaps 264 may be secured to the corresponding snaps 268 that are disposed interior to the zippers 260, 262. The snaps 264, 268 are secured to each other first on both sides (i.e., passenger and driver sides) of the cover panel 254. The elastic netting 256 draws the outer layer 258 tight when the snaps 264, 268 are engaged to each other on both sides at the first and second side walls of the truck bed. The hem 266 is layered over the hem 270 so that water that falls on the outer layer 258 cascades down the side of the side walls 218, 220. Moreover, the zippers 260, 262 are attached over the overlapping hems 266, 270 to further prevent or mitigate water from entering the truck bed area. Referring now to FIG. 19, the snaps 264, 268 are engaged to each other. Referring now to FIG. 20, first and second halves of the zipper 260, 262 are secured to each other by the slider 272.

Although the exemplary embodiment depicts the cover panel 254 as including zipper 260, 262 for securing an edge of the cover panel to the side walls 218, 220 of the truck bed 216, it is contemplated that in other embodiments, the lower edge of the cover panel 254 may not include a zipper, and thus, may freely extend over the size walls 218, 220.

According to one embodiment, the telescoping support structures 228 may be spaced from an outer periphery or edge of the first and second rigid members 224, 226, so as to create a gap between the telescoping support structures 228 and the outer periphery. As the shell 212 is transitioned from the deployed position toward the collapsed position, the cover panel 254 may be capable of folding, like an accordion, and fitting within the gap between the telescoping support structures 228 and the outer periphery of the respective first and second rigid members 224, 226.

The cover panel 254 may have a window 274 on one or both sides. Moreover, the outer layer 258 of the shell may be fabricated from a flexible material.

Figure 21:
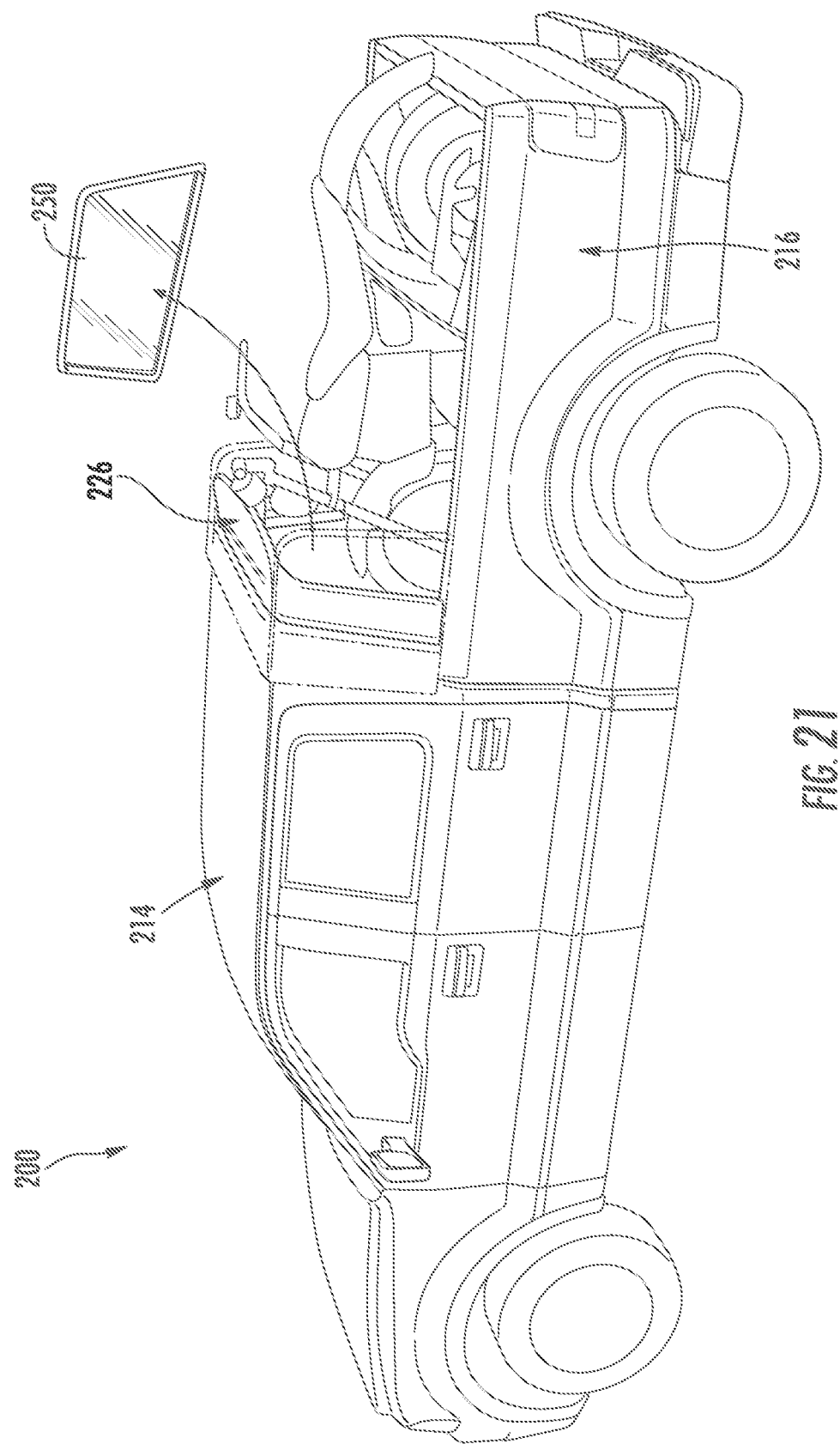
FIG. 21 is an upper perspective view of the side wall mounted truck bed cover in a collapsed configuration with a window detached therefrom and a motorcycle positioned within the truck bed.
Figure 22:
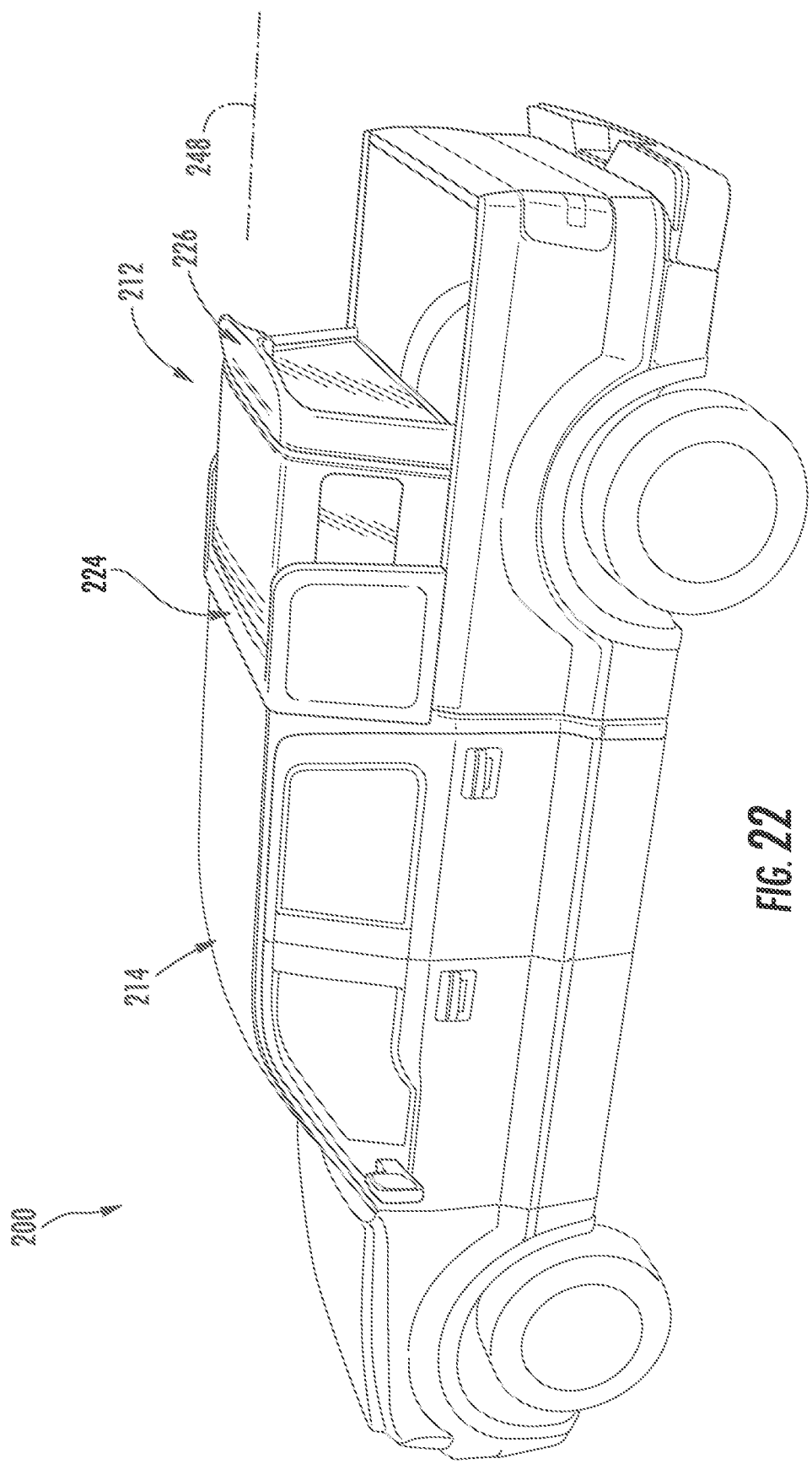
FIG. 22 is an upper perspective view of the side wall mounted truck bed cover in a partially collapsed configuration.

Referring now to FIGS. 21 and 22, it is contemplated that the shell 212 may be selectively transitioned between the deployed position and the collapsed position as needed. FIG. 21 shows the shell 212 in the collapsed position, while FIG. 22 shows the shell 212 transitioning between the collapsed position and the deployed position. As shown in FIG. 21, the window 250 may be detached from the second rigid member 226. By detaching the window 250 from the second rigid member 226, larger items may be stored in the truck bed 216. If the second rigid member 226 is moved to the deployed position (i.e. adjacent the first rigid member 224), with the window 250 remaining attached to the second rigid member 226, the presence of the window 250 may limit the overall amount of storage space that is available in the truck bed 216. In particular, the space between the window 250 and the end the truck bed 216 adjacent the cab 214 may effectively be rendered useless if the window 250 remains engaged with the second rigid member 226. Thus, by removing the window 250 from the second rigid member 226, that space becomes useable, and as shown in FIG. 21, a motorcycle or other large items may be stored in the truck bed 216.

Figure 23:
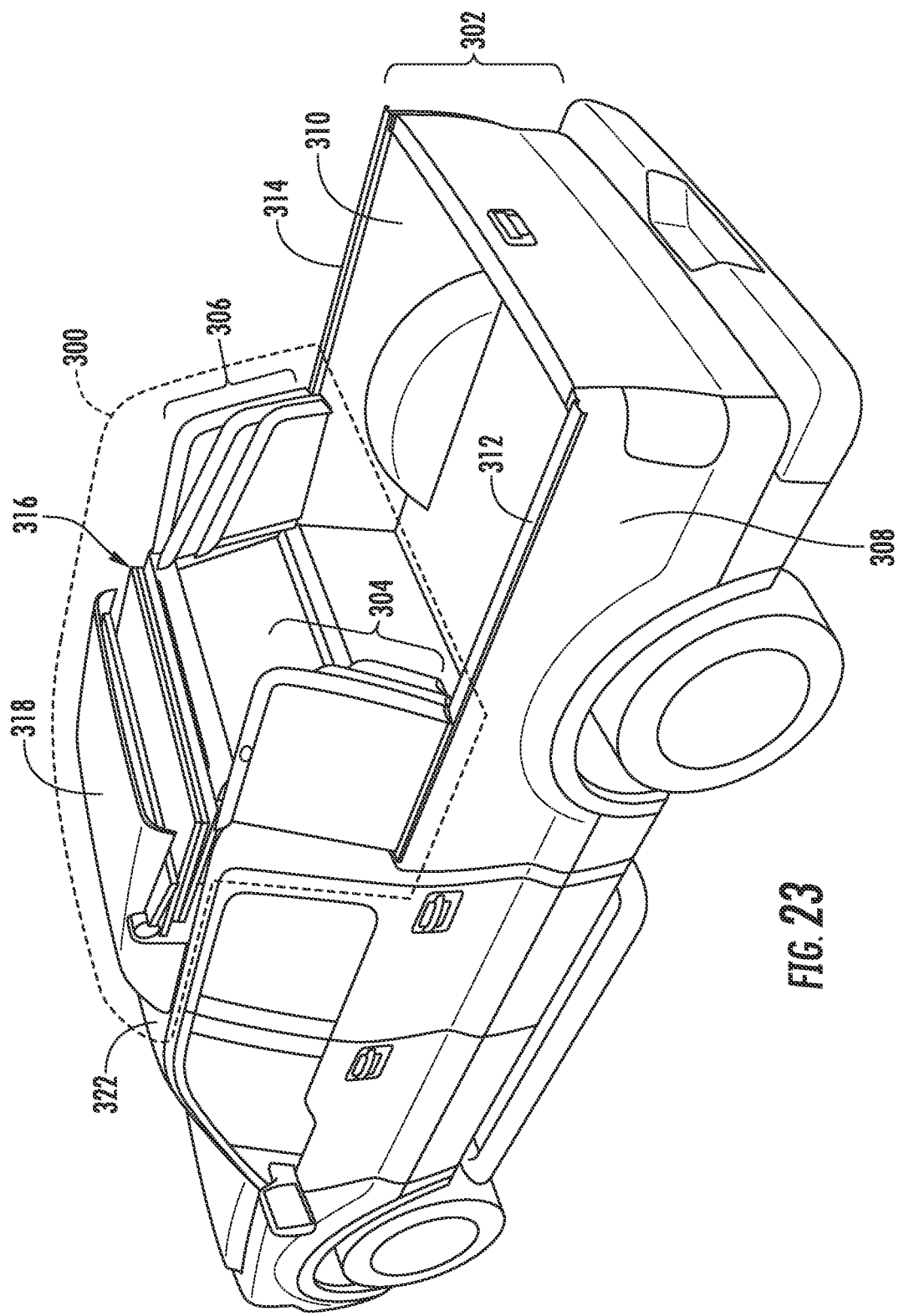
FIG. 23 is a perspective view of a truck having a collapsible shell in a stored position.
Figure 26:
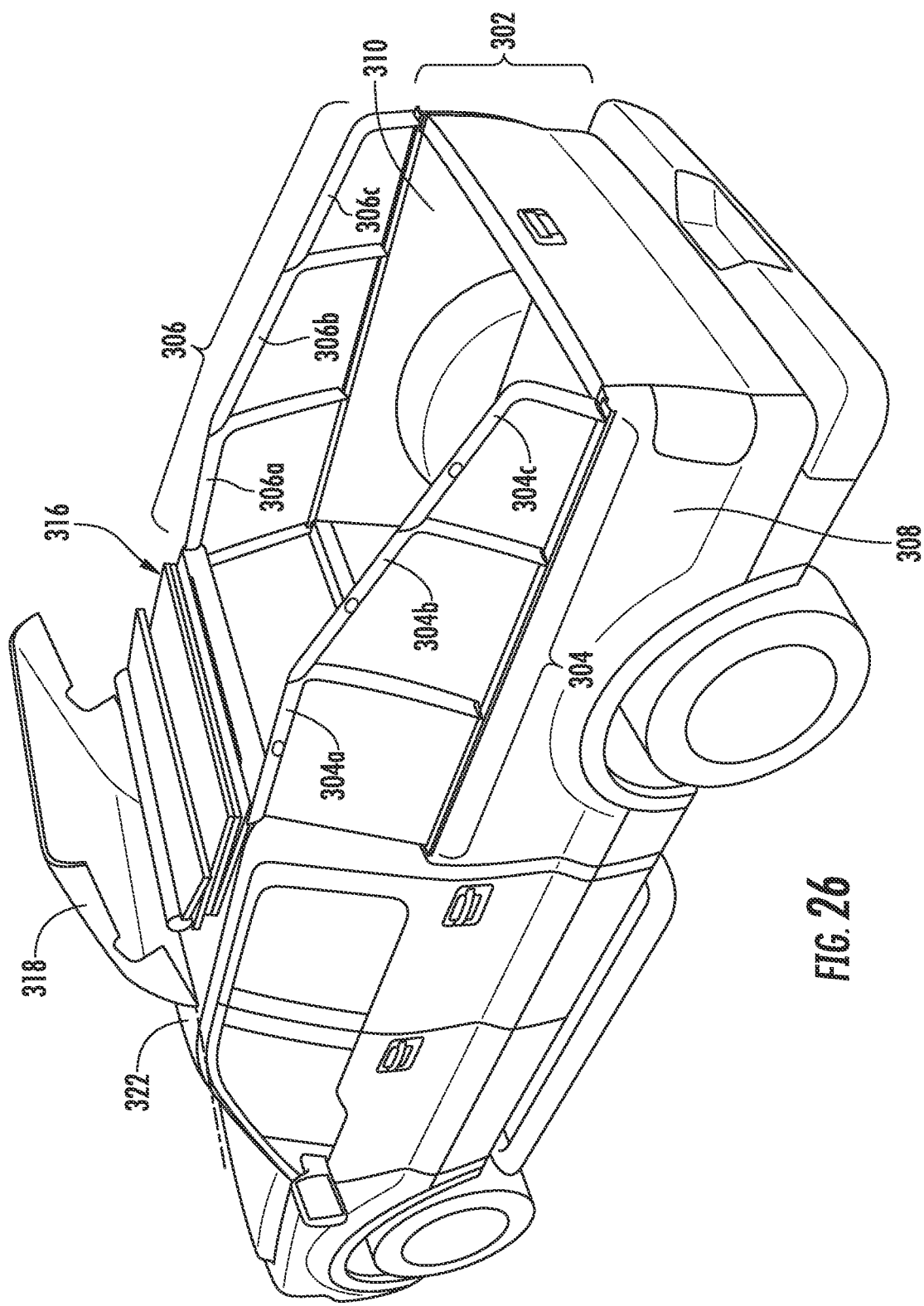
FIG. 26 illustrates a shield rotated upward to prepare for deployment of a cover over the collapsible shell.
Figure 27:
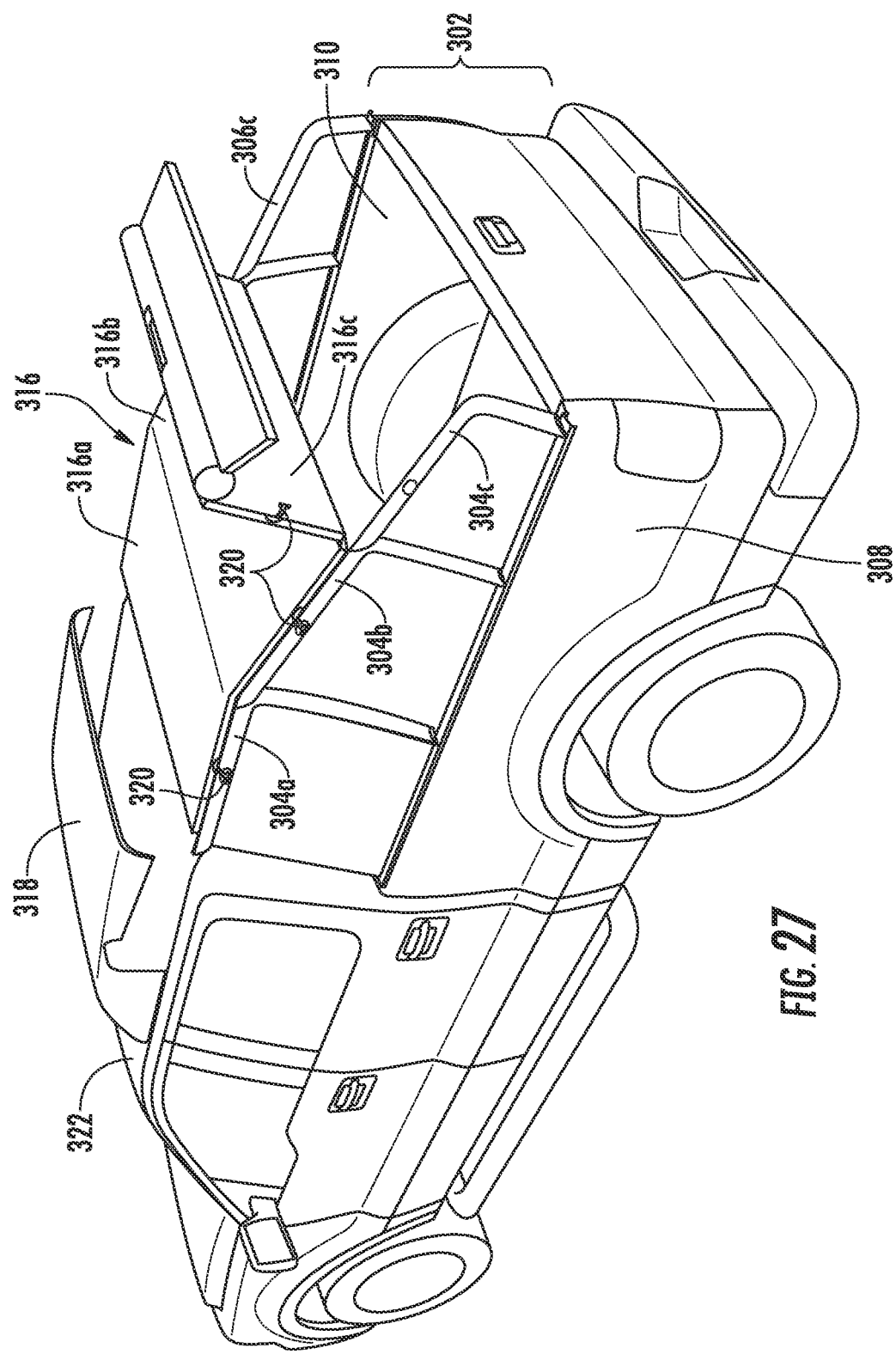
FIG. 27 illustrates the shield rotated back downward and the cover being deployed.
Figure 28:
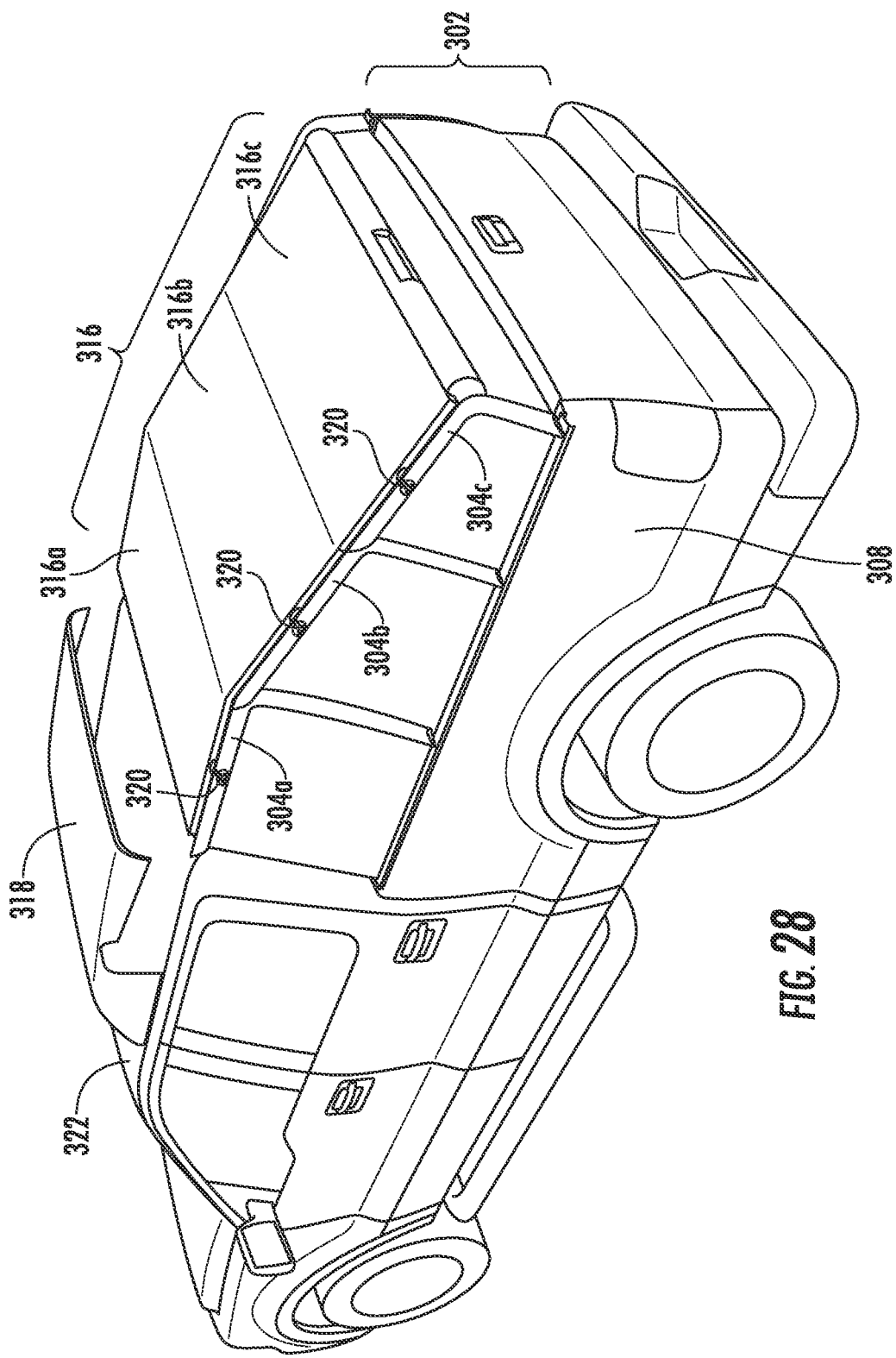
FIG. 28 illustrates the cover when fully deployed.

Referring now to FIGS. 23-30, a collapsible shell 300 is shown attached to a truck bed 302. FIG. 23 shows the collapsible shell 300 in a stored position, while FIG. 28 shows the collapsible shell 30 in an extended position. The collapsible shell 300 may include a cover 316 engageable with first and second frames 304, 306. When in the extended position, the collapsible shell 300 may have a tapered shape at its rear end to provide a sleek, compact, aerodynamic look. As such, the collapsible shell 300 may function similar to a hatchback with a selectively accessible trunk.

The first and second frames 304, 306 may be expandable or capable of telescoping between stored and expanded positions. At least some of first and second frames 304, 306 may be slidably mounted to the first and second side walls 308, 310 of the truck bed 302 via sliding tracks 312, 314 as discussed in more detail above. Each of the first frames 304 may extend upwardly away from the first side wall 308 of the truck bed 302 to define a first frame height $H_1$ (see FIG. 25). Similarly, each of the second frames 306 may extend upwardly away from the second side wall 310 of the truck bed 302 to define a second frame height $H_2$. The first and second frames 304, 306 may be configured such that the first frame height $H_1$ and the second frame height $H_2$ decreases toward the rear end of the collapsible shell 300.

More specifically, the first frames 304 may include a forward body 304a, an intermediate body 304b, and a rearward body 304c. The forward body 304a may define a generally uniform first frame height $H_1$, while the intermediate body 304b and the rearward body 304c may define a non-uniform first frame height $H_1$. The first frame height $H_1$ of the end of the intermediate body 304b adjacent the forward body 304a may be equal to a first value, while the first frame height $H_1$ of the opposite end intermediate body 304b adjacent the rearward body 304c may be equal to a second value less than the first value. In other words, the first frame height $H_1$ of the intermediate body 304b may decrease as the intermediate body 304b extends away from the forward body 304a. Similarly, the first frame height $H_1$ of the end rearward body 304c adjacent the intermediate body 304b may be equal to a third value, which may be less than or equal to the second value. Furthermore, the first frame height $H_1$ of the rearward end of the rearward body 304c may be equal to a fourth value less than the third value. As such, the first frame height Hi may include a generally uniform segment, as defined by the forward body 304a, and a variable, non-uniform segment, as defined by the intermediate body 304b and the rearward body 304c. The variable, non-uniform segment may vary in a linear fashion, which may facilitate engagement with a planar structure, such as the cover 502.

The second frame 306 may be a mirror image of the first frame 304, with the second frame 306 including forward body 306a that is of uniform height, and intermediate and rearward bodies 306b, c that are of non-uniform height.

While the foregoing describes the first and second frames 304, 306 as having a single intermediate body 304b, 306b, it is contemplated that other implementations of the first and second frames 304, 306 may include a plurality of intermediate bodies.

The slidable engagement of the first and second frames 304, 306 relative to their respective sliding tracks 312, 314 may allow the first and second frames 304, 306 to transition between a stored position and an extended position. FIG. 23 shows the first and second frames 304, 306 in their stored positions. In the stored positions, the intermediate bodies 304b, 306b, and rearward bodies 304c, 306c, may substantially overlap with the forward bodies 304a, 306a. In this regard, the forward body 304a may be the outermost body, while the rearward body 304c, 306c may be the innermost body, with the intermediate body 304b, 306b being between the forward and rearward bodies 304a, 306a, 304c, 306c. When the first and second frames 304, 306 are in their stored positions, most of the respective sliding tracks 312, 314 may be uncovered.

Figure 24:
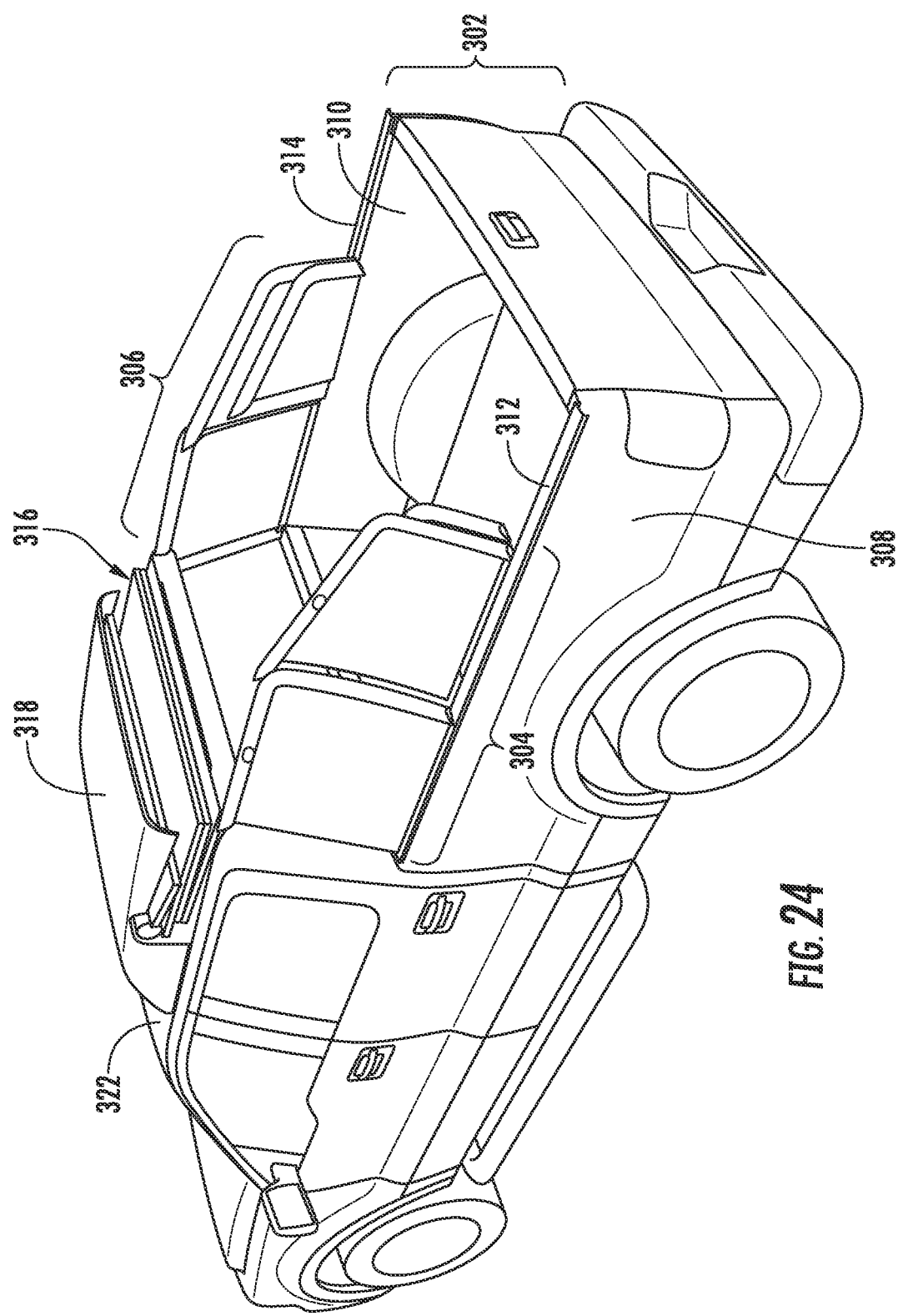
FIG. 24 illustrates the collapsible truck bed shell shown in FIG. 23 as frames of the collapsible shell are being extended.

FIG. 24 shows the first and second frames 304, 306 in an intermediate position, between the stored and extended positions. In the intermediate position, the intermediate body 304b, 306b is extended from the forward body 304a, 306a, such that very little, if any, overlap exists between the intermediate body 304b, 306b and the forward body 304a, 306a. The tapered height of the intermediate body 304b, 306b results in the upper edge of the intermediate body 304b, 306b being angled downwardly toward the truck bed 302 from the upper edge of the forward body 304a. When the first and second frames 304, 306 are in the intermediate position, the rearward body 304c, 306c may be concealed behind the forward and/or intermediate bodies 304a, 306a, 304b, 306b.

Figure 25:
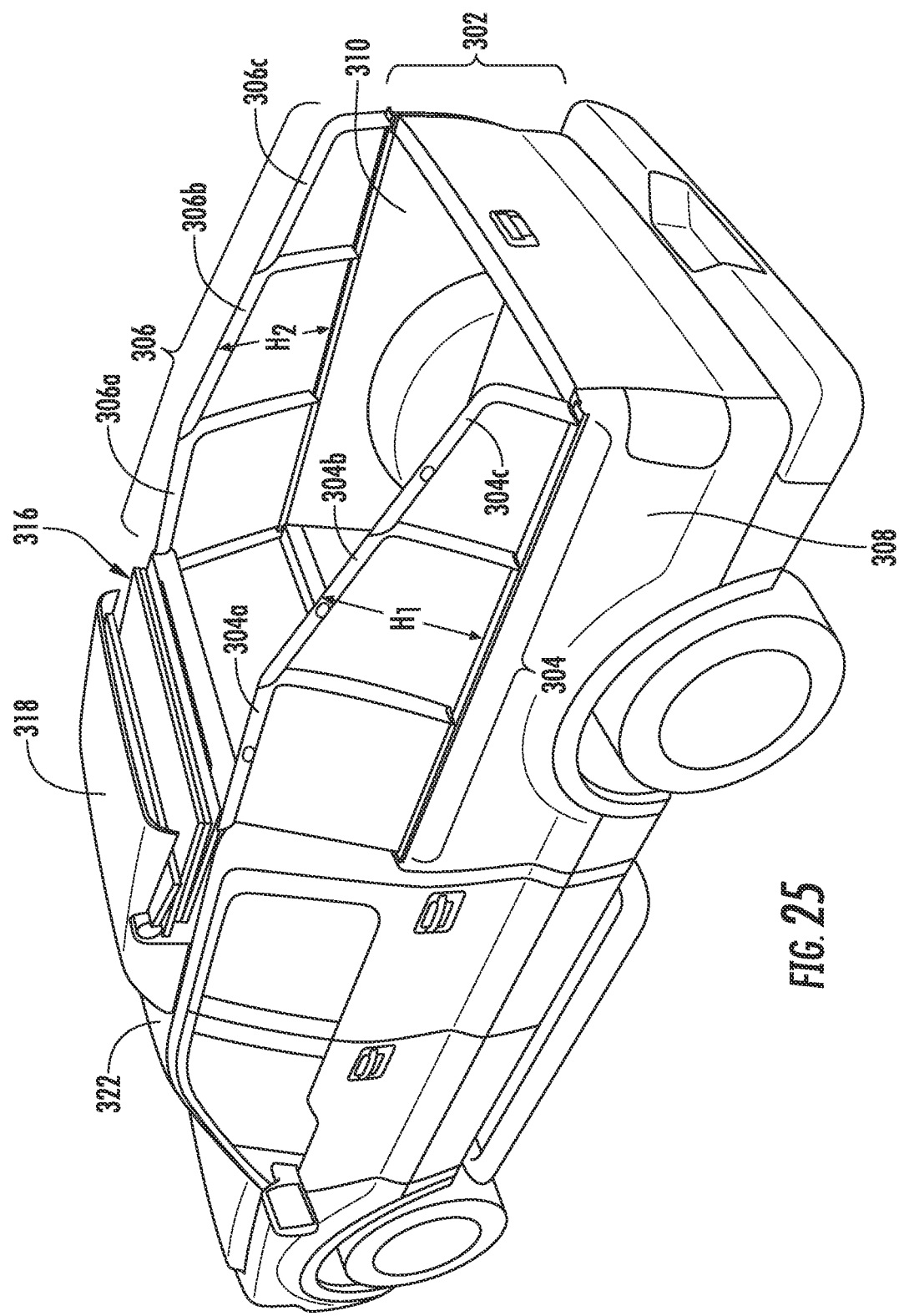
FIG. 25 illustrates the collapsible truck bed shell shown in FIG. 23 when the frames are fully extended.

FIG. 25 shows the first and second frames 304, 306 in their fully extended positions, wherein the rearward bodies 304c, 306c have been extended beyond the intermediate bodies 304b, 306b, such that very little, if any, overlap exists between the rearward bodies 304c, 306c and the corresponding intermediate bodies 304b, 306b. When the first and second frames 304, 306 are fully extended, the first and second frames 304, 306 may define a maximum length that may be substantially equal to the length of the truck bed 302.

The forward bodies 304a, 306a may be fixedly secured to the first and second side wall 308, 310, such that the forward bodies 304a, 306a may not require movement to facilitate transition between the stored and extended positions. The intermediate bodies 304b, 306b and the rearward bodies 304c, 306c may slide along the respective sliding tracks 312, 314 to transition the first and second frames 304, 306 between the stored and extended positions. In particular, the sliding tracks 312, 314 may each have two races, as described above.

Optionally, the forward bodies 304a, 306a may be slidably attached to the first and second side walls 308, 310 by providing an additional race in the first and second sliding tracks 312, 314 that receive followers that are attached to the forward bodies 304a, 306a.

The frames 304, 306 may each be fabricated from a rigid tubular material, as described in more detail above, for providing a structure on the side of the collapsible shell 300. The bodies of the frames 304, 306 may also be formed from panels.

A cover 316 may be deployed over the frames 304, 306 to provide a structure on the top of the collapsible shell 300, such that the frames 304, 306 and the cover 316 collectively define an enclosure over the truck bed 302 when the frames 304, 306 are extended out to the extended position. The cover 316 may start from a stored position, as shown in FIGS. 23-26, collapsed over the cab 18 of the truck 10 and transition to a deployed position, as shown in FIG. 28.

FIG. 26 shows fairing 318 pivoted upwardly from the roof of the cab 322 to expose the stored, collapsed cover 316, resting on the roof of the cab. In FIG. 27, the cover 316 is partially deployed, with the cover 316 having been unfolded, and extended over the forward bodies 304a, 306a and the intermediate bodies 304b, 306b. The cover 316 may include a forward panel 316a or region that extends over the forward bodies 304a, 306a, and an intermediate panel 316b or region that extends over the intermediate bodies 304b, 306b. The forward panel 316a and intermediate panel 316b may be separated by a hinge or fold-line to facilitate folding of the forward and intermediate panels 316a, 316b relative to each other.

FIG. 28 shows the cover 316 in the fully deployed position, with the cover including a rearward panel 316c or region that extends over the rearward bodies 304c, 306c. The rearward panel 316c may be separated from the intermediate panel 316b by a hinge or fold-line to facilitate folding of the intermediate and rearward panels 316b, 316c relative to each other.

The cover 316 may be sufficiently wide to engage the topsides of the frames 304, 306, while also being sufficiently long to accommodate the variable height of the frames 304, 306. The cover 316 may be secured to the frames 304, 306 with latches including but not limited to rubber latches or mechanically operated latches. The cover 316 may also be secured to the frames 304, 306 with a locking mechanism 320. A plurality of locking mechanism 320 may be disposed along the length of the frames 304, 306 so as to engage the frames 304, 306 and the cover 316 to each other. The cover 316 may be detachably connected to the frames 304, 306 to facilitate removable of the upper panel 524 when a higher clearance may be needed for storing large items in the truck bed 302. For instance, the cover 316 may be detached to allow a motorcycle placed in the truck bed 302.

One or more hydraulic pistons (not shown) or other lift assisting mechanisms may extend between the frames 304, 306 and the cover 316 to assist in lifting the cover 316 from its closed position toward its open position. The hydraulic pistons may apply a force to the cover 316 that at least partially counteracts the weight of the cover 316 to reduce the burden on the user for lifting the cover 316. Furthermore, the hydraulic pistons may be configured to maintain the cover 316 in the open position so that a user is not required to hold the cover 316 in the open position to access the truck bed enclosure. As such, the cover 316 may remain in the open position independent of any assistance by the user because of the assistance provided by the hydraulic pistons. In fact, the hydraulic pistons may urge the cover 316 toward the open position, such that when the user unlatches the cover 316 from the frames 304, 306, the hydraulic pistons may automatically raise the cover 316 to the open position. Thus, to close the cover 316, the user would pull down on the cover 316 to overcome the biasing force applied by the hydraulic pistons 538.

When the cover 316 is in the closed position, the cover 316 may engage with the frames 304, 306 so as to provide a weather resistant barrier (or rainfall resistant seal) over the trunk bed enclosure.

Figure 29:
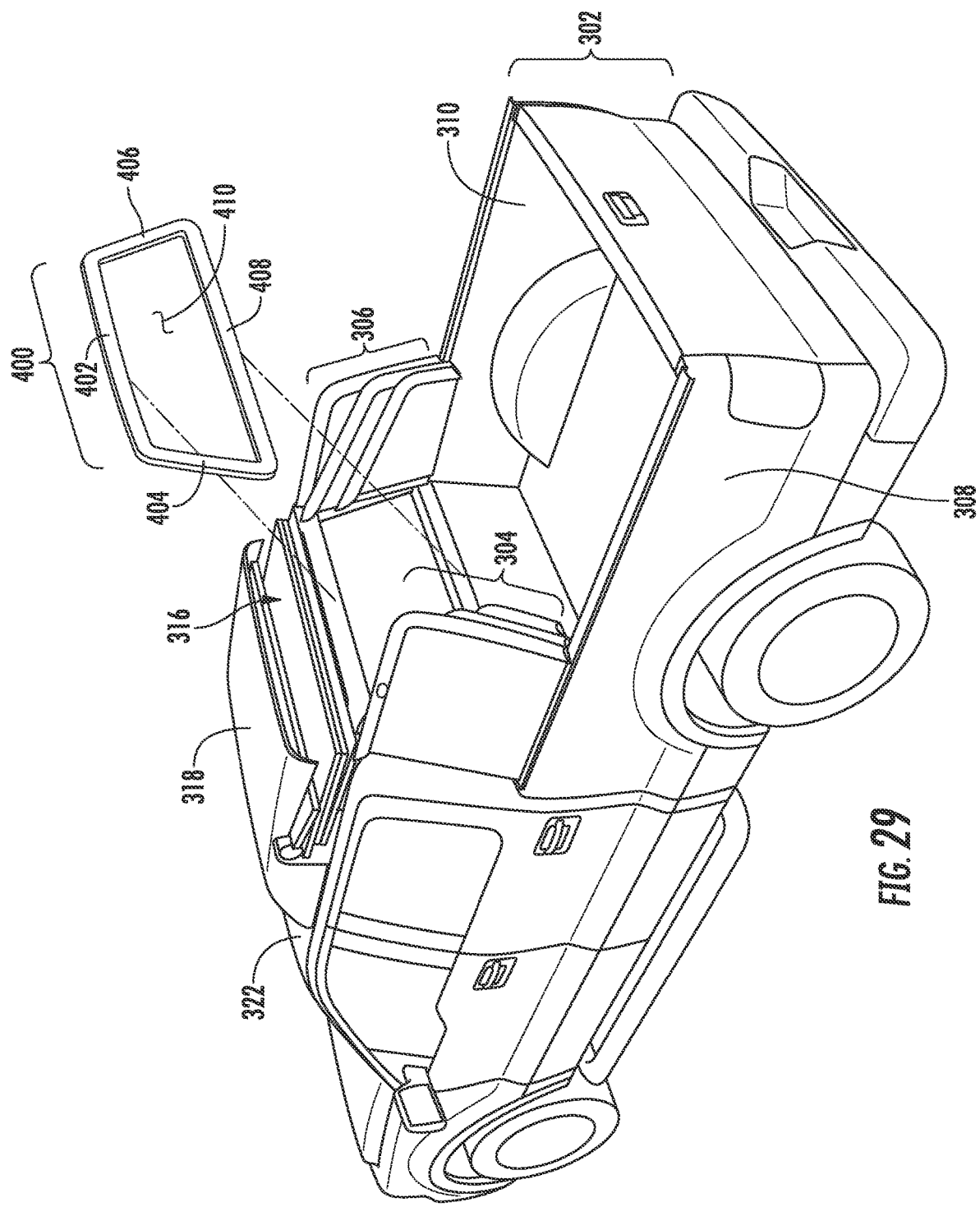
FIG. 29 is a perspective view of the truck including a weather strip positionable between the cab and the collapsible shell.
Figure 30:
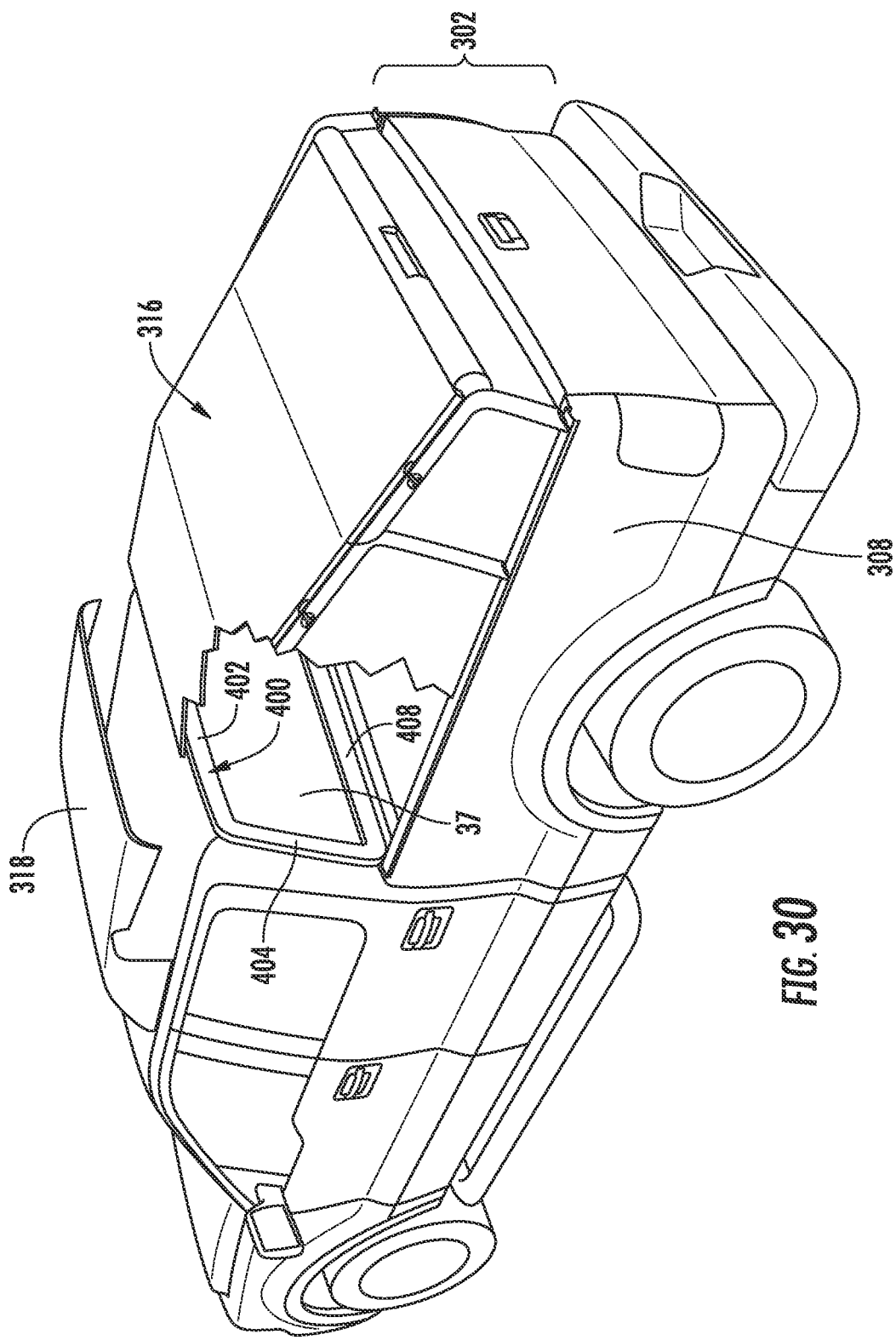
FIG. 30 is a partial cutaway view showing the weather strip installed between the cab and the collapsible shell.
Figure 31:
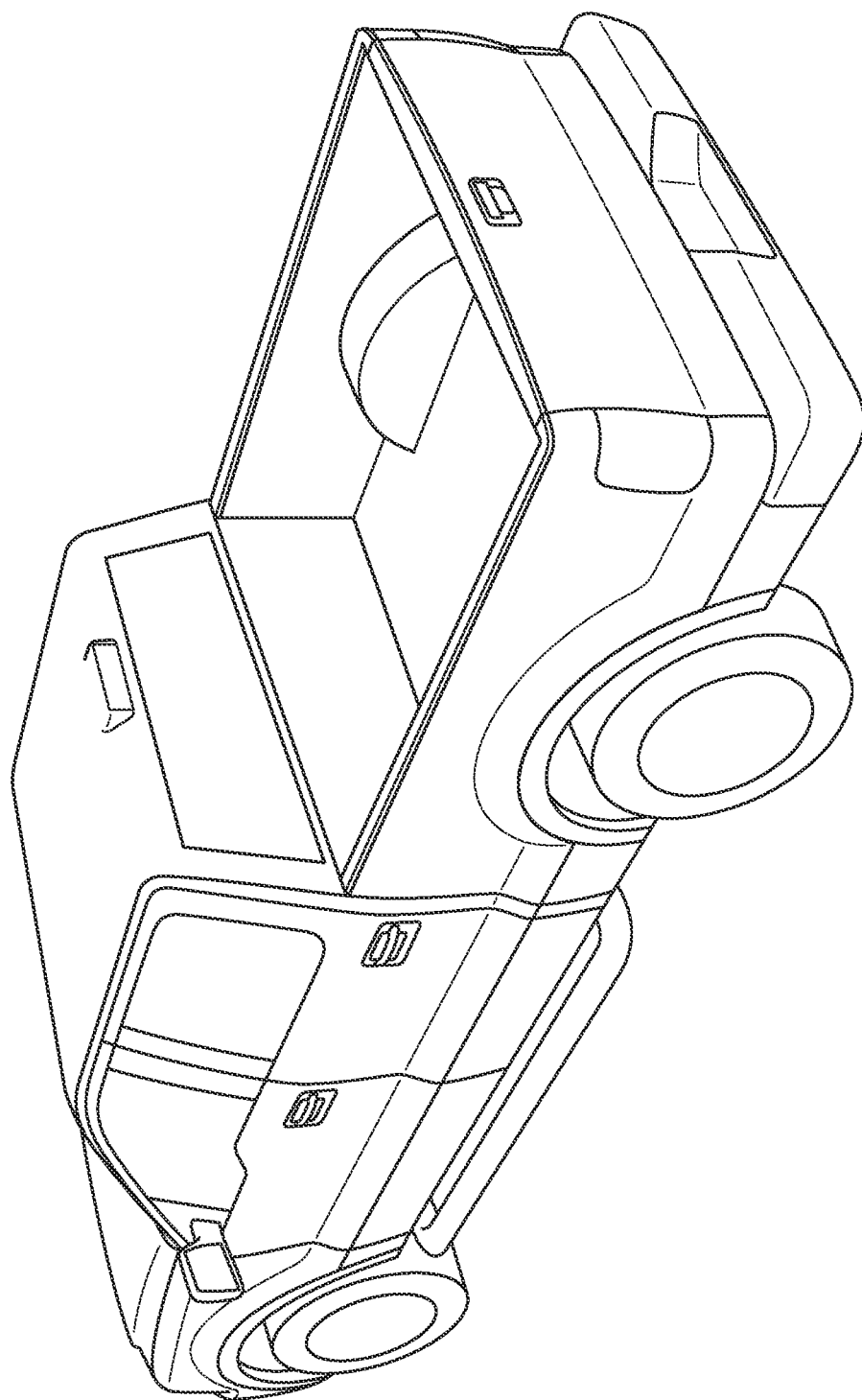
FIG. 31 is a perspective view of the truck.

Referring now to FIGS. 29 and 30, there is depicted a weather strip 400 for creating a weather-resistant barrier between the truck cab 322 and the collapsible shell 300. The weather strip 400 may occupy a gap between the truck cab 322 and the collapsible shell 300 to prevent moisture from rain, sleet, snow, or other sources (e.g., sprinklers or puddle splashes) from flowing into the truck bed enclosure. The weather strip 400 may be configured to provide the weather-resistant functionality without obscuring the driver's line-of-sight through a rear window 37 located in the rear wall 35 of the cab 322.

FIG. 29 shows the weather strip 400 removed from the cab 322 for purposes of clarity, while FIG. 30 shows the weather strip 400 attached to the cab 322. The weather strip 400 may be expandable to occupy the gap between the cab 322 and the collapsible shell 300. In this regard, the weather strip 400 may be compressible and resilient, to allow the weather strip 400 to be compressed between the cab 322 and the collapsible shell 300 during installation, and then once installed, the weather strip 400 may apply a force to the cab 322 and a portion of the collapsible shell 300 to create the weather-resistant seal therebetween. The weather strip 400 may be inflatable, or have natural resiliency to allow for such compressibility. The weather strip 400 may be a tube or gasket, and may be formed from rubber or other weather resistant, resilient materials known in the art. Attachment of the weather strip 400 to the cab 322 may be via glue or other adhesives or by simple pressure and friction. The weather strip 400 may also be attached to the cab 322 via mechanical fasteners, such as rivets, nails, or screws.

The weather strip 400 may include an upper segment 402, a pair of side segments 404, 406, and an optional lower segment 408, which collectively circumnavigate an enclosed area 410 (i.e., space or volume interior to the weather strip 400). When the weather strip 400 is attached to the cab 322, the enclosed area 410 of the weather strip 400 may overlap with the window 37 so as not to block the window 37. The configuration of the weather strip 400 may correspond to the size and contour of the truck cab 322. In this regard, one side segment 404 may extend adjacent a first side of the truck cab 322, another side segment 406 may extend adjacent a second side of the truck cab 322, while another portion of the weather strip 400 may extend adjacent the roof of the truck cab 322. The lower segment 408 may be optional, and may provide protection from water which may splash up from the road. Thus, certain implementations of the weather strip 400 may be formed without a lower segment 408.

When the weather strip 400 is installed on a truck, the weather strip 400 may create a water tight seal or at least rain resistant seal with the truck cab 322 and the truck bed cover 300 to redirect water away from the truck bed enclosure. For instance, if rain is falling on the truck, the rain drops may fall onto the upper segment 402, and may flow down along one of the side segments 404, 406, and then continue down toward the ground. Furthermore, if the truck is wet and moving along a road, water droplets on the truck may flow along the length of the truck. As the water droplets approach the end of the truck cab 322, the water droplets may flow across the weather strip 400, and then onto the truck bed cover 300, and thus, the weather strip 400 may prevent the water droplets from entering the truck bed enclosure. For example, an upper surface of the upper segment 402 may be at the same height as the upper surface of the truck bed cover. Therefore, items stored within the truck bed enclosure may remain dry.

The existence of the weather strip 400 between the cab 322 and the frames 304, 306 may eliminate the need for the collapsible shell 300 to include a front panel (not shown) to extend between the forward bodies. The absence of a forward panel may leave the window 37 unobstructed to provide the driver with a clear view-path through the window 37. However, it is understood that in other embodiments, the collapsible shell may include a front panel, particularly when a weather strip 400 is not used. In such cases, the front panel may be transparent, or include a transparent section, so as to allow a user to view through the front panel when looking through the window.

The weather strip 400 may be used with a variety of different truck bed covers. Therefore, while weather strip 400 is shown in combination with truck bed cover 300 shown in the figures, it is understood that the scope of the present disclosure is not limited thereto.

Referring now to FIGS. 31-46, various aspects of two embodiments of a device that may be mounted to a bed of any type of vehicle is disclosed and shown.

Referring now to FIGS. 31-37, a first embodiment of the device is shown.

Figure 32:
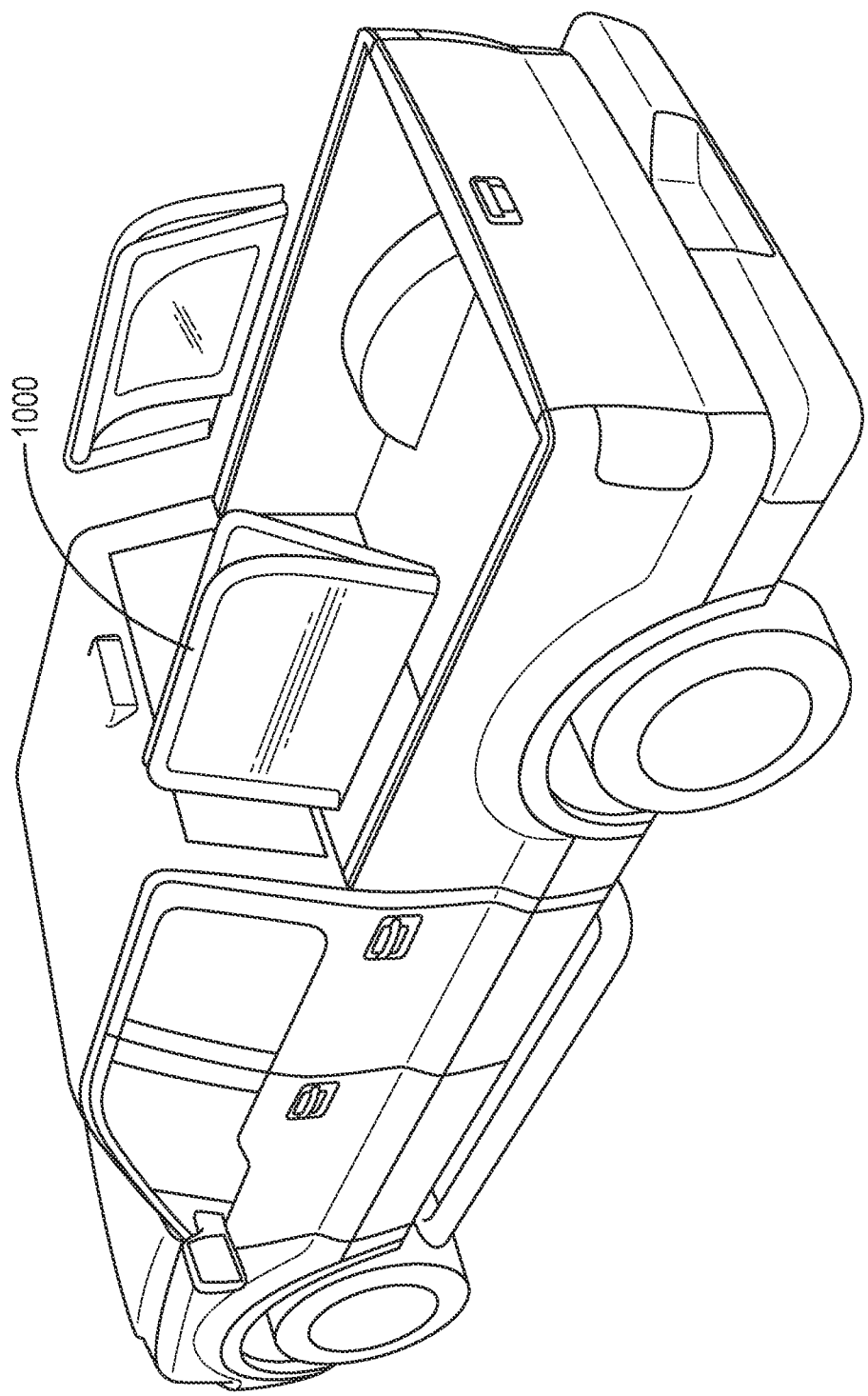
FIG. 32 illustrates telescoping side frames.
Figure 33:
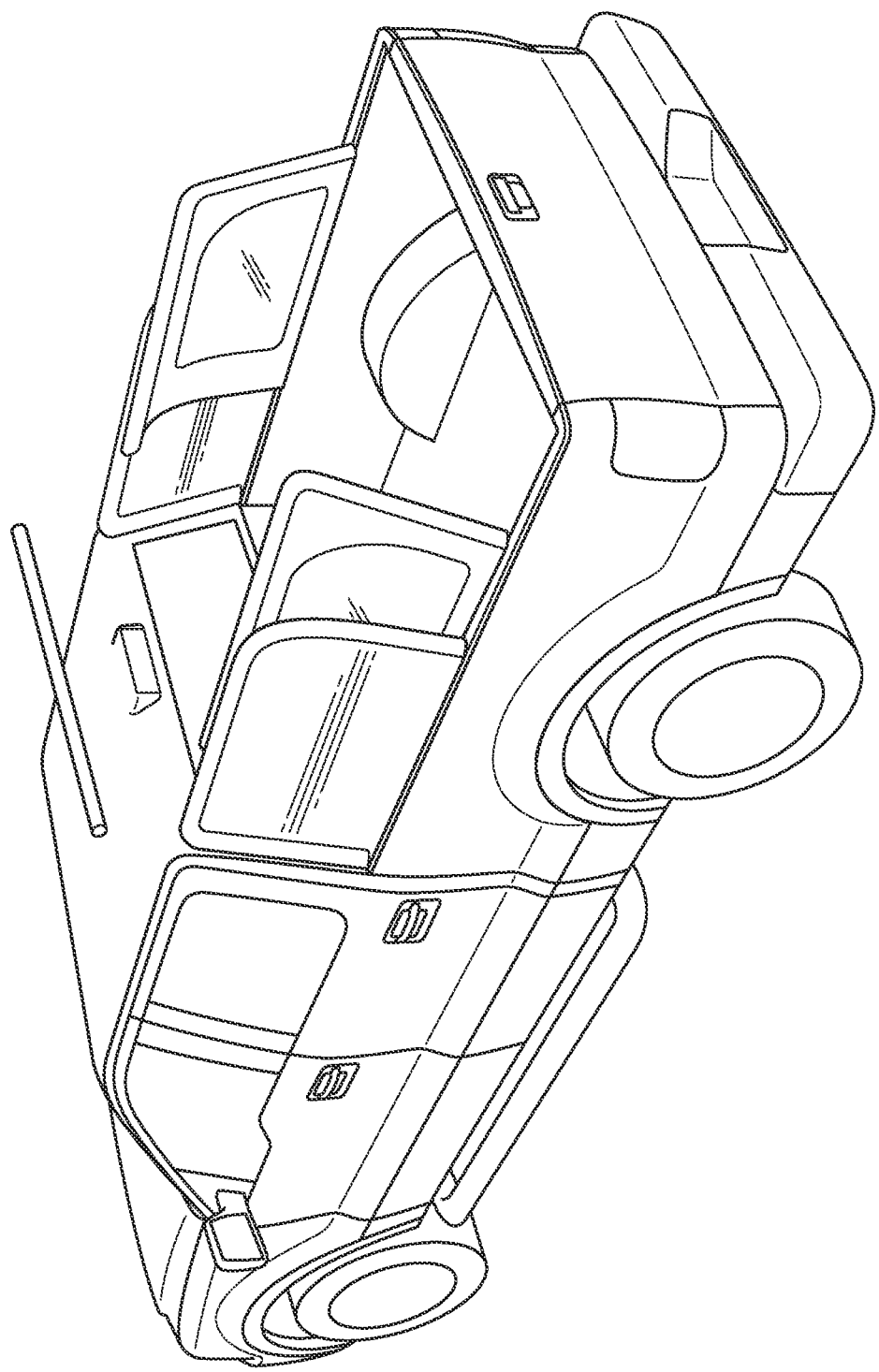
FIG. 33 illustrates the telescoping side frames being deployed.

As shown in FIG. 32, the truck bed may have a frame 1000. As shown, the frame 1000 may be a frame shown in Ser. No. 16/536,753, filed on Aug. 9, 2019. Or, the frame 1000 may be a frame shown in Ser. No. 16/583,102, filed on Sep. 25, 2019. The frame 1000 refers to those tubular parts or members that support a truck bed cover.

The entire contents of Ser. Nos. 16/536,753 and 16/583,102 are incorporated herein by reference.

Figure 34:
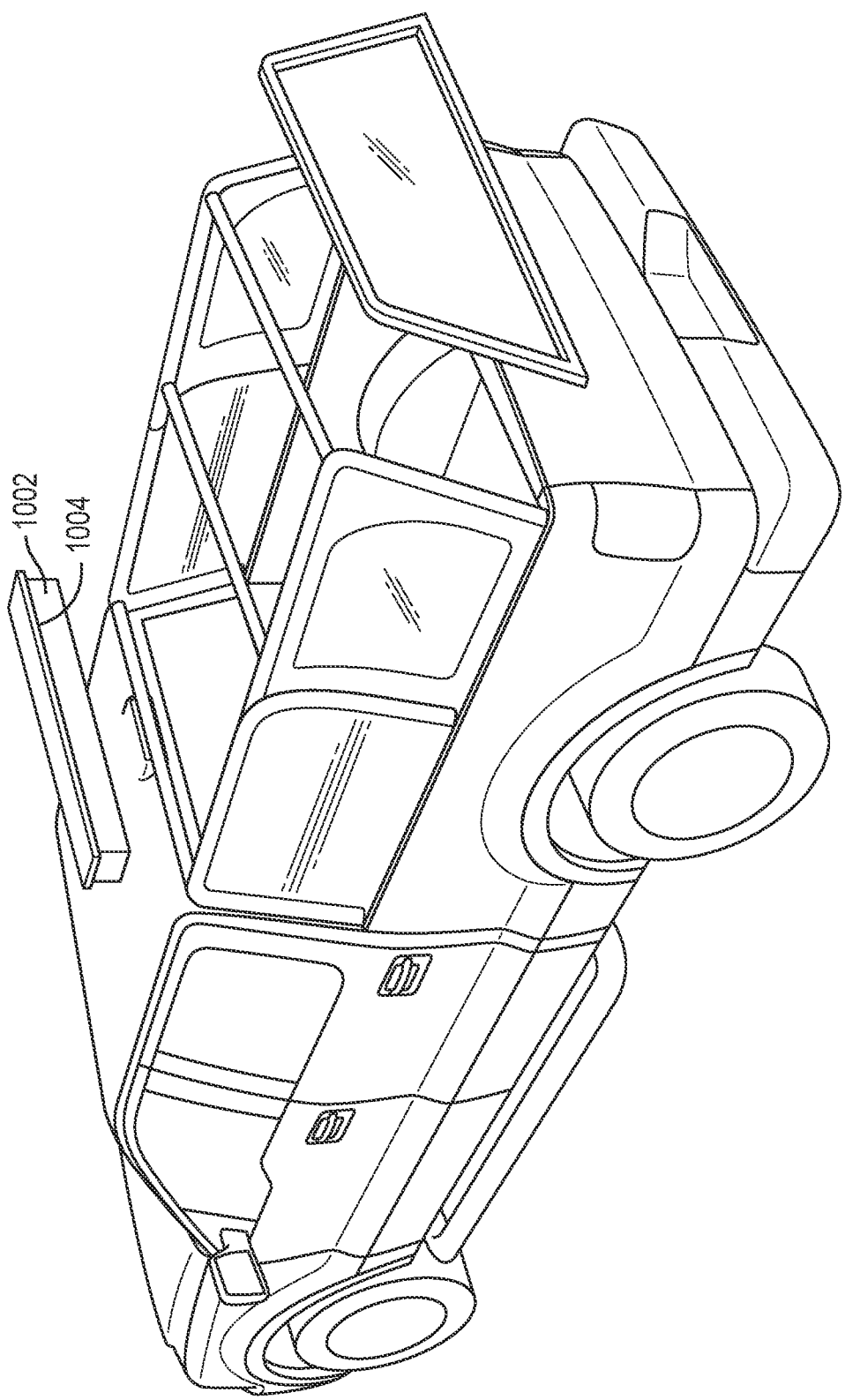
FIG. 34 illustrates a top that can be rolled up being attached to the telescoping side frames, truck bed and/or truck cab.

Referring now to FIG. 34, a roll up door may be disposed in a container 1002.

Figure 35:
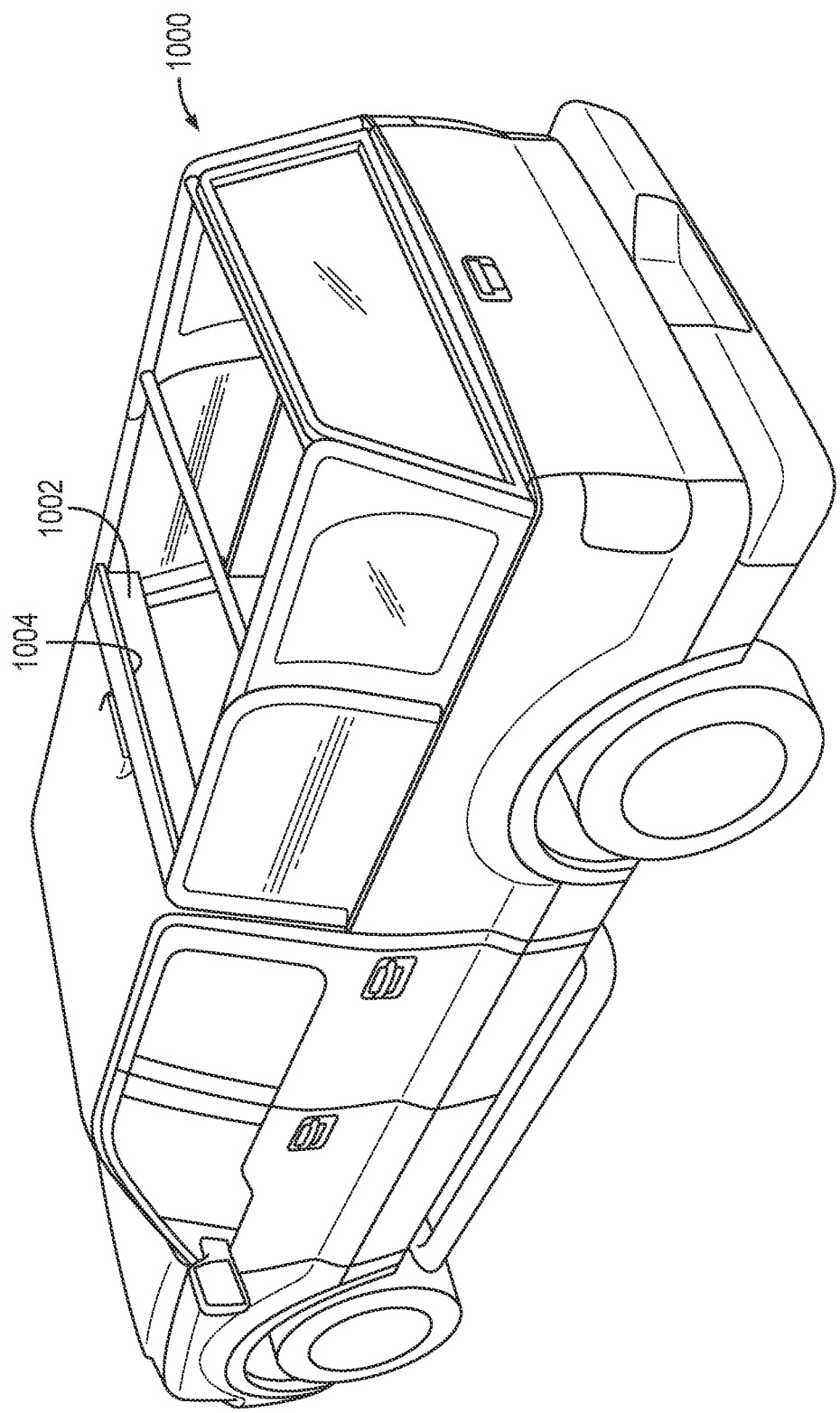
FIG. 35 illustrates the side frames in the deployed position and the top in a retracted position.

As shown in FIG. 35, an opening or slot 1004 is shown through which the roll up door 1006 (see FIG. 36) may be deployed or retracted. The roll up door 1006 may disposed in the container 1002 which may be mounted to the frame 1000. The door 1006 may be rolled up into the container 1002 or deployed by pulling the door 1006 out of the container 1002. For example, the roll up door 1006 can be pulled out of the container 1002 to be deployed.

Figure 36:
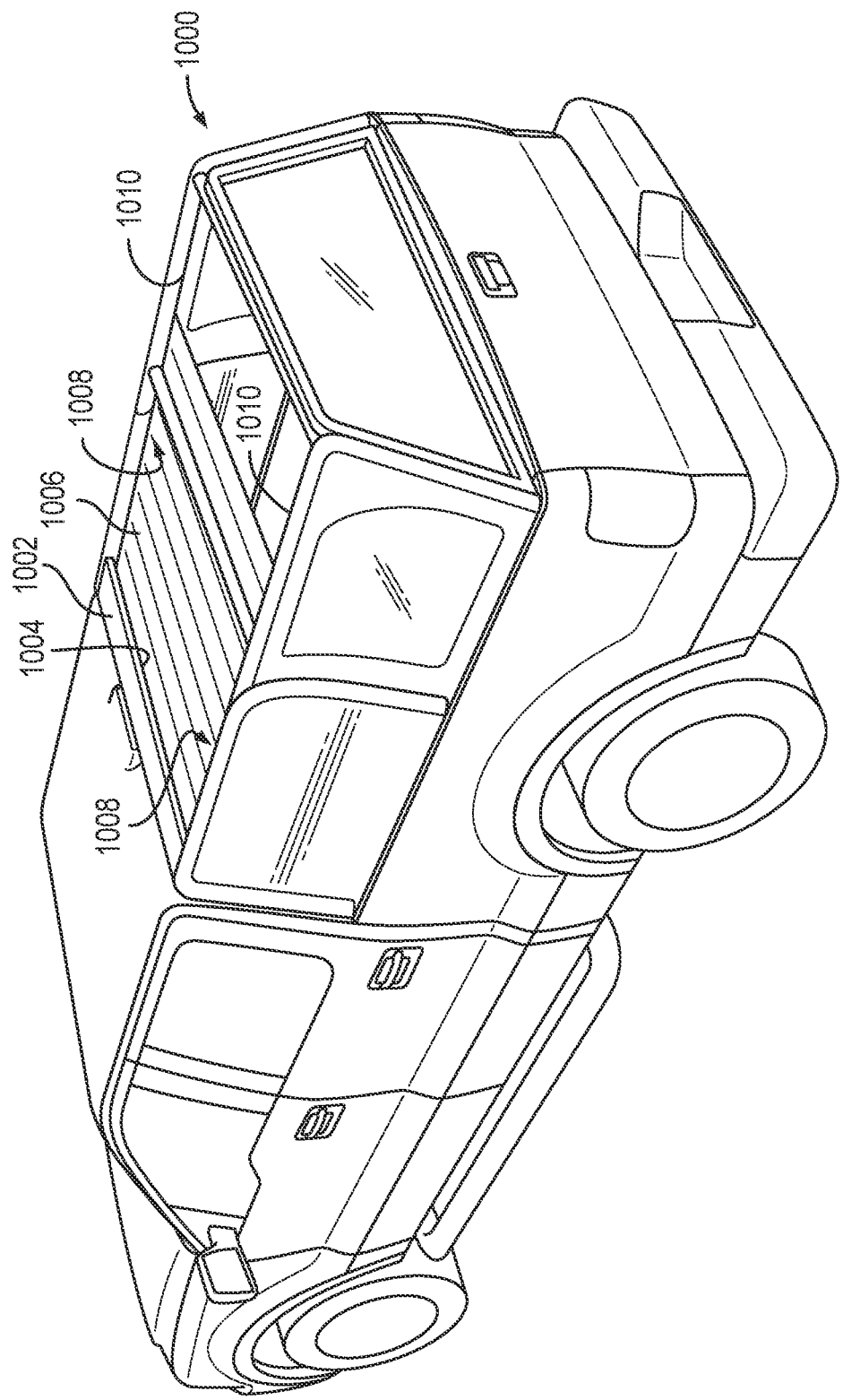
FIG. 36 illustrates the top being deployed.

Referring now to FIG. 36, the door 1006 is being pulled out of the container 1002 through the slot 1004 of the container 1002 shown in FIG. 35. The lateral side portions 1008 of the door 1006 are disposed within a tongue or guide 1010 formed in the upper portion of the frame 1000. The door 1006 can be pulled out by hand. For example, a person can pull on the proximal end of the door. Alternatively, a motor may be mounted in the container or attached to the container and be operative to force the rolled up door out of the container.

The door is shown as being the same structure and function of a roll up door of an industrial building. For example, commercial roll up doors sold under the trademark JANUS at janusintl.com.

The roll up door may roll up to the storage position or roll out to the deployed position similar to the tonneau cover sold under the trademark TruXedo Lo Pro Tonneau Cover or the BAK Revolver X2 Tonneau Cover.

Figure 37:
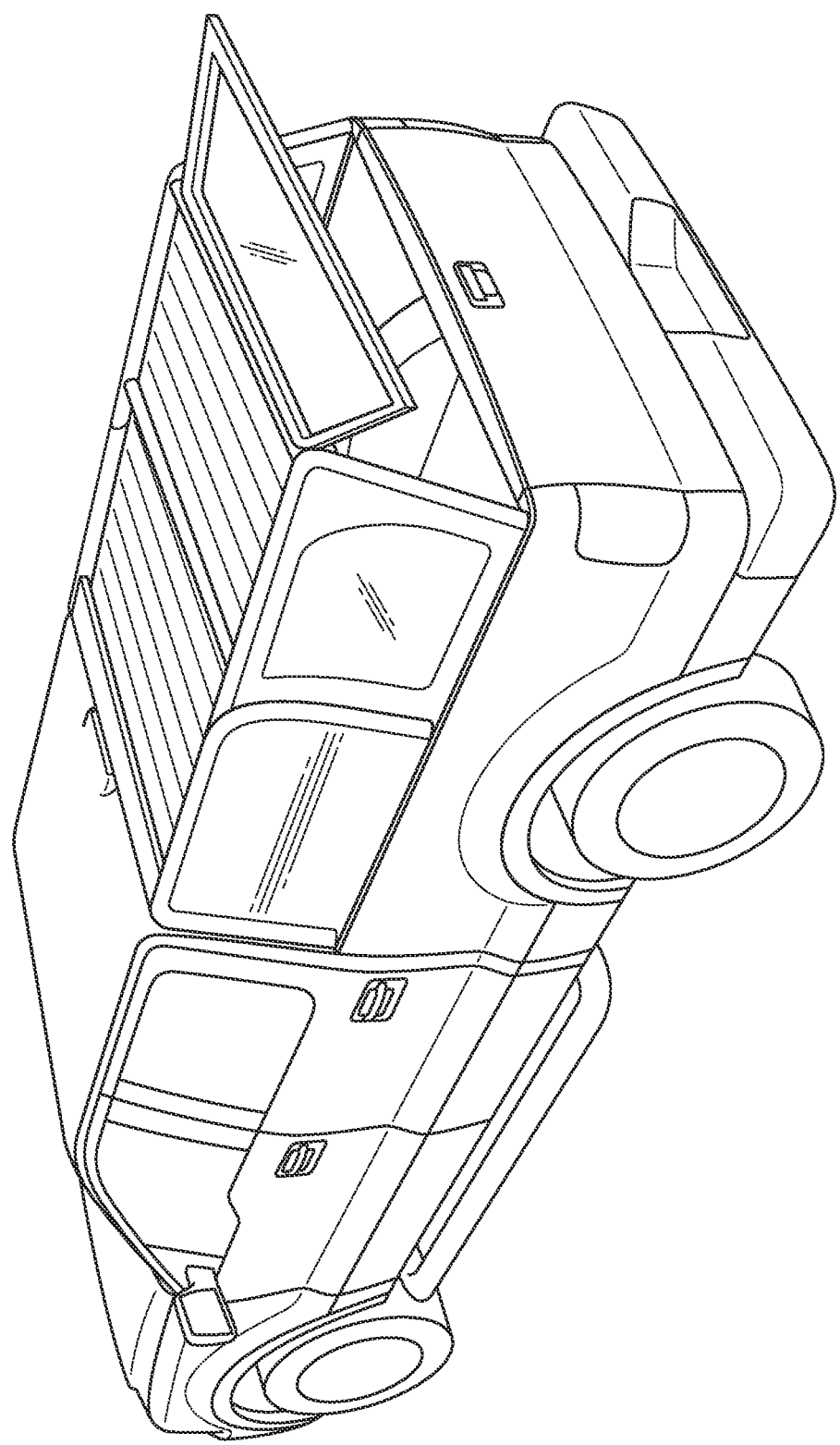
FIG. 37 illustrates the top in the fully deployed position.
Figure 38:
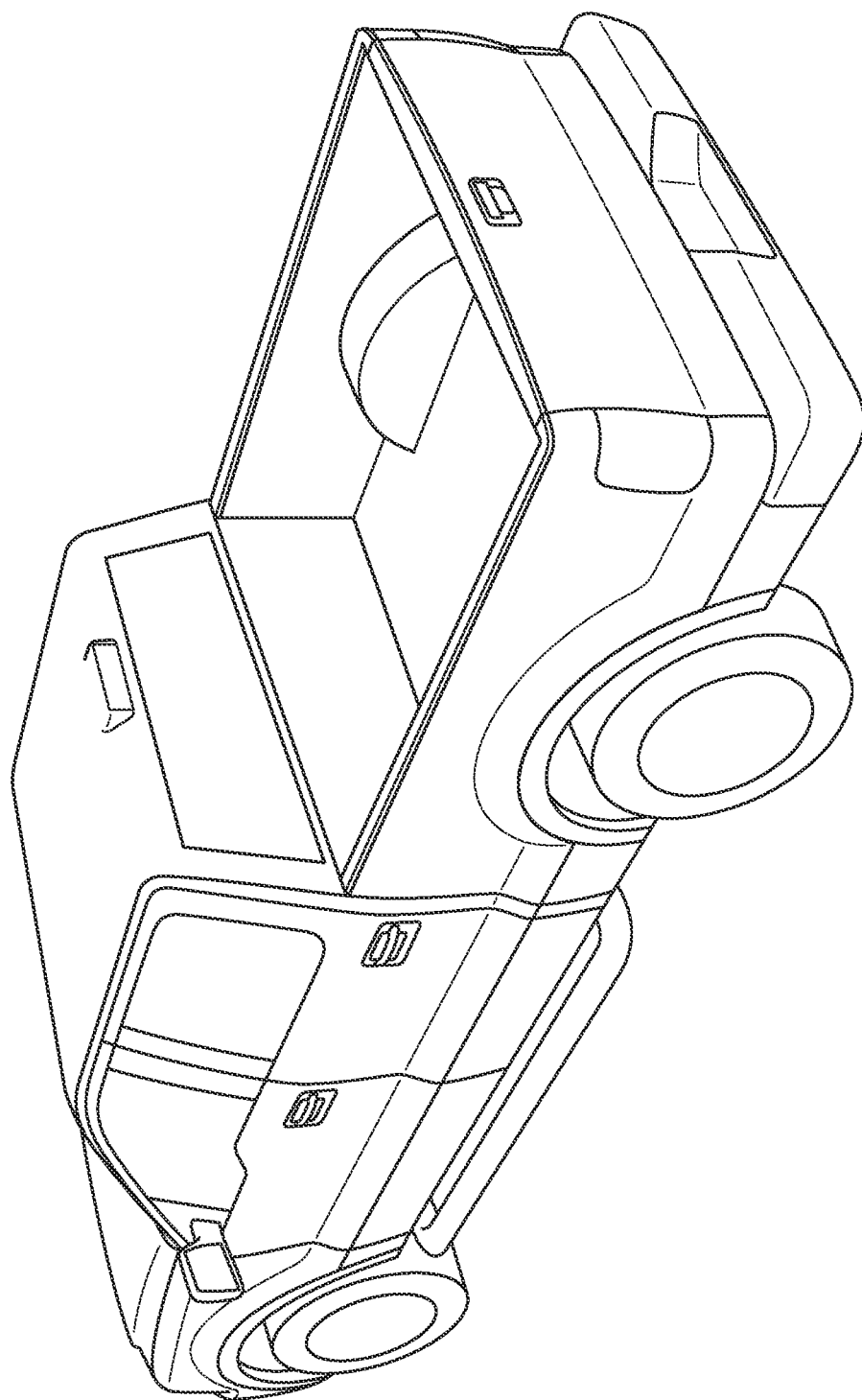
FIG. 38 is a perspective view of the truck.

Referring now to FIGS. 37, the door may be rolled out to the deployed position. The door may extend to the top rear edge portion of the frame. The door can be locked with a lock in the closed position. The back of the frame is enclosed by the door which is currently shown in the opened position.

Referring now to FIGS. 38-46, another embodiment is shown.

Figure 39:
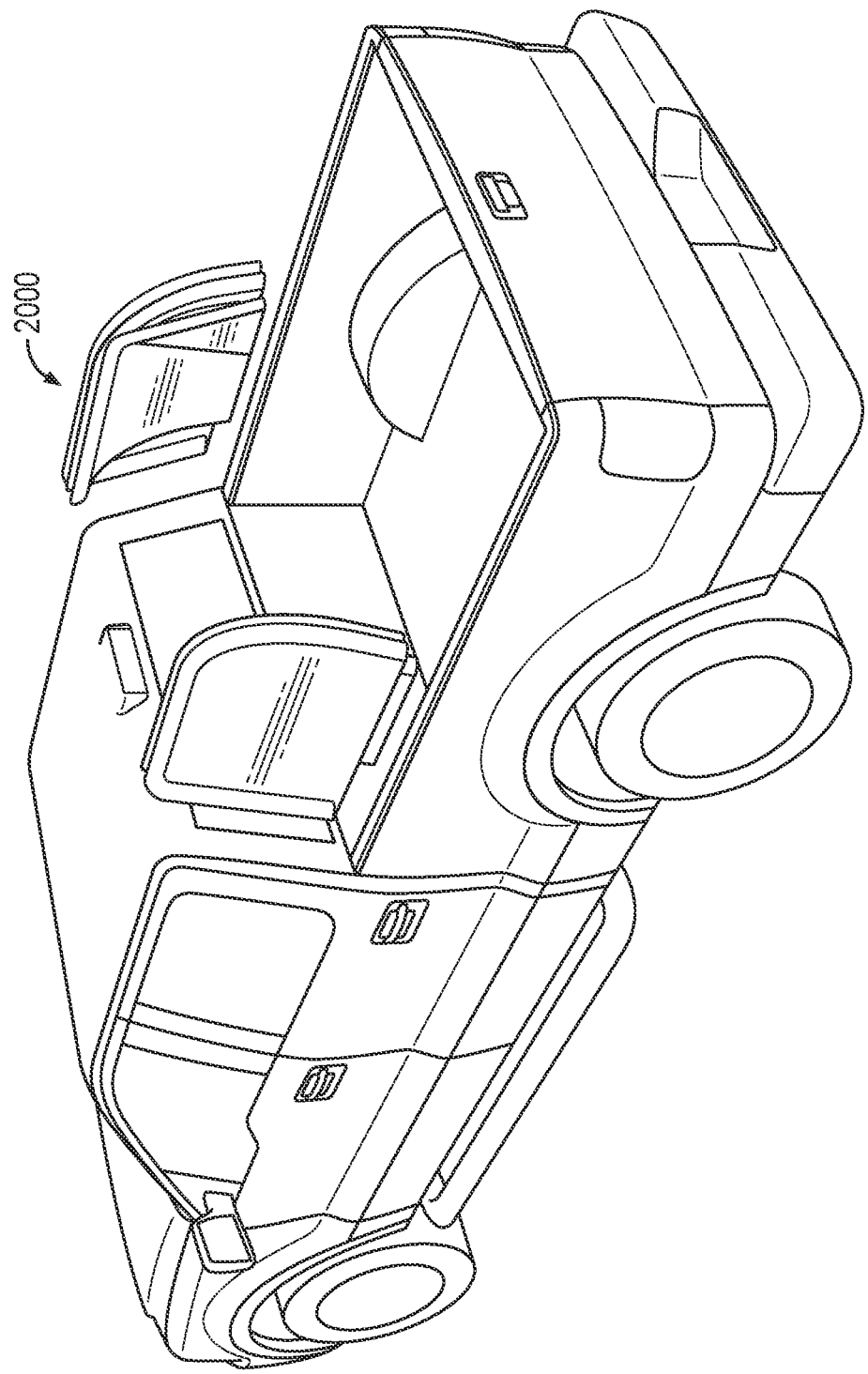
FIG. 39 illustrates telescoping side frames being attached to the truck.
Figure 40:
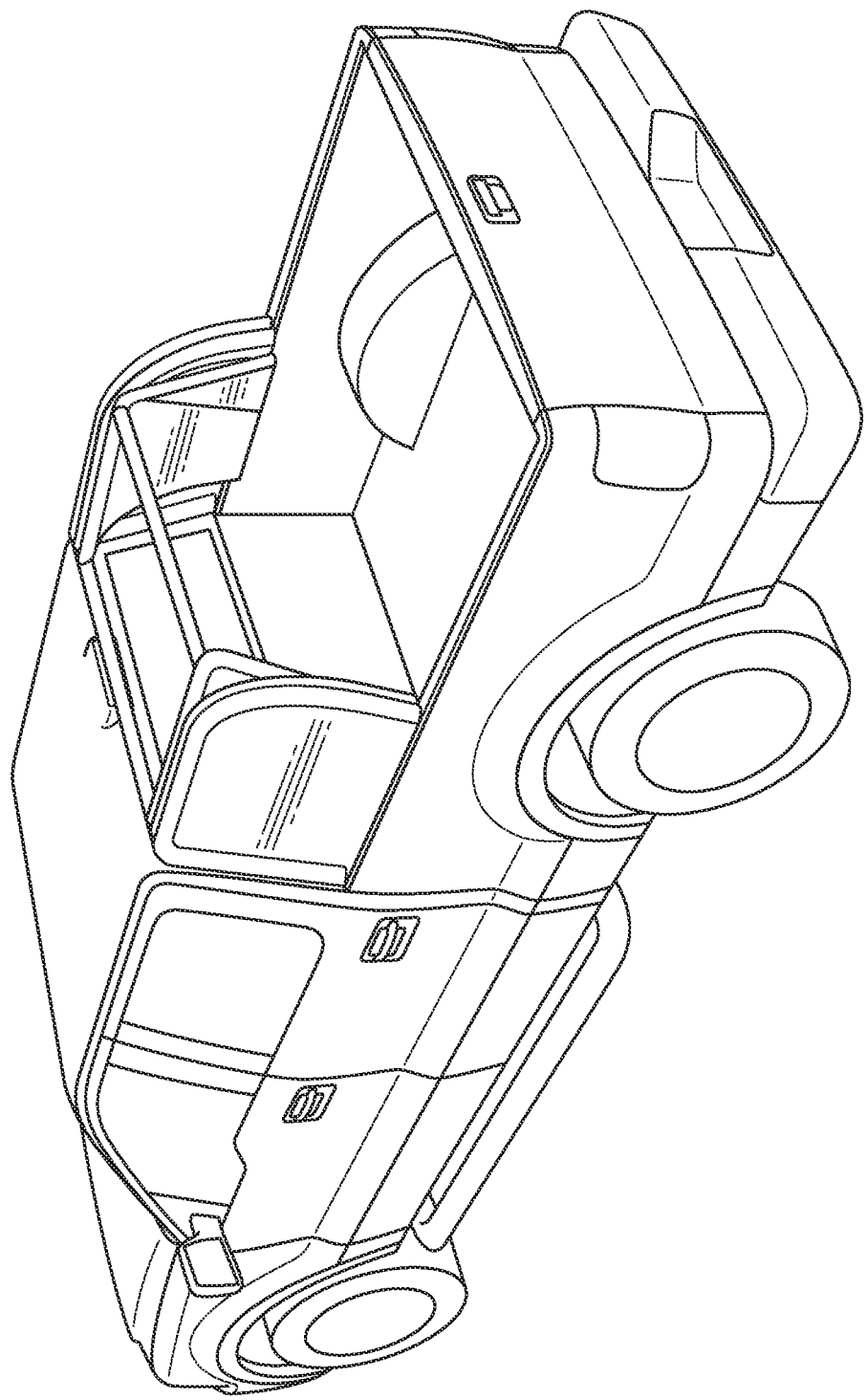
FIG. 40 illustrates the telescoping side frames attached to the truck.
Figure 41:
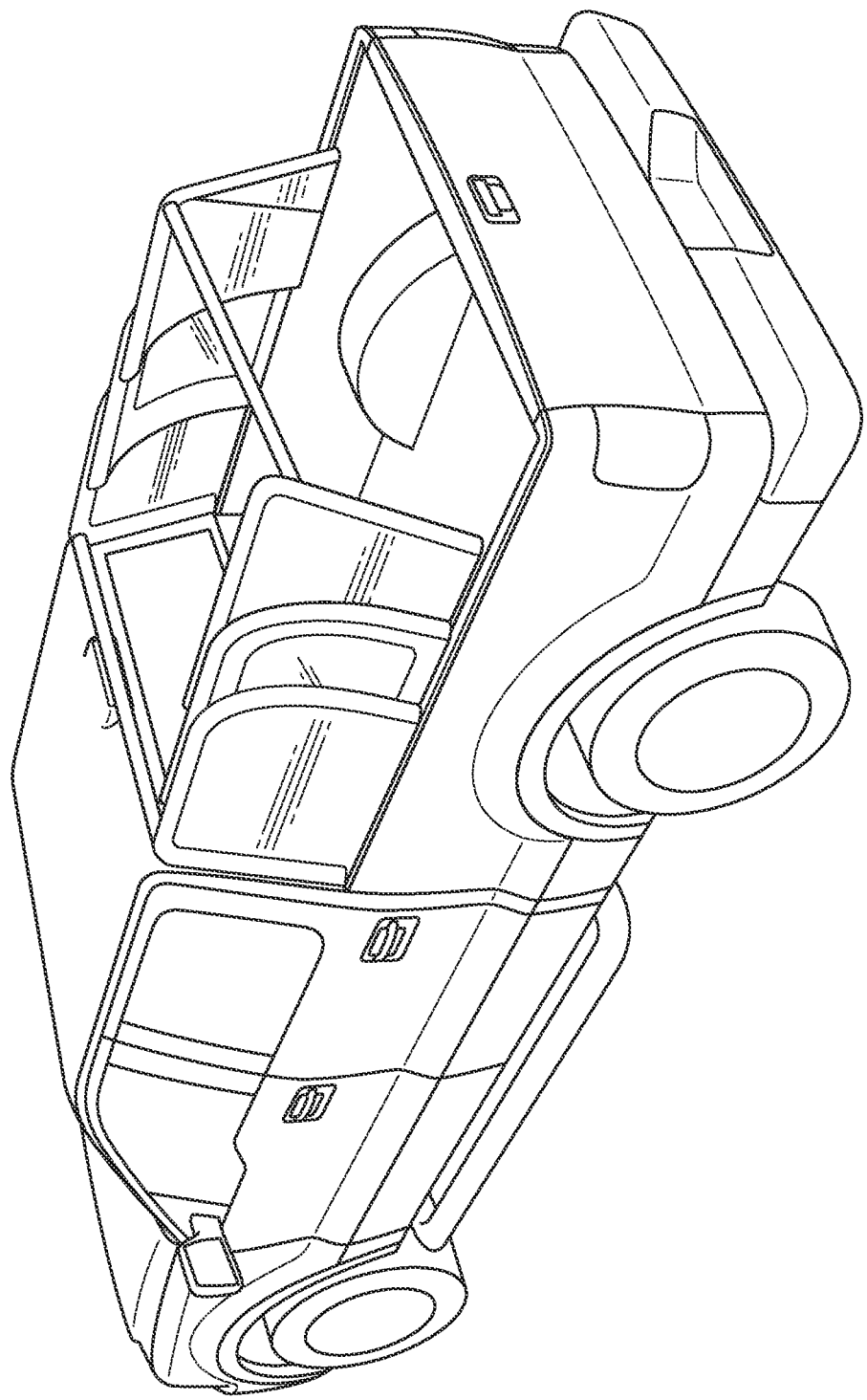
FIG. 41 illustrates the telescoping side frames being deployed.

Referring now to FIG. 39, the truck bed may have a frame 2000. As shown, the frame 2000 may be a frame shown in Ser. No. 16/536,753, filed on Aug. 9, 2019. Or, the frame 2000 may be a frame shown in Ser. No. 16/583,102, filed on Sep. 25, 2019. The frame 2000 refers to those tubular parts or members that support a truck bed cover.

The entire contents of Ser. Nos. 16/536,753 and 16/583,102 are incorporated herein by reference.

Figure 42:
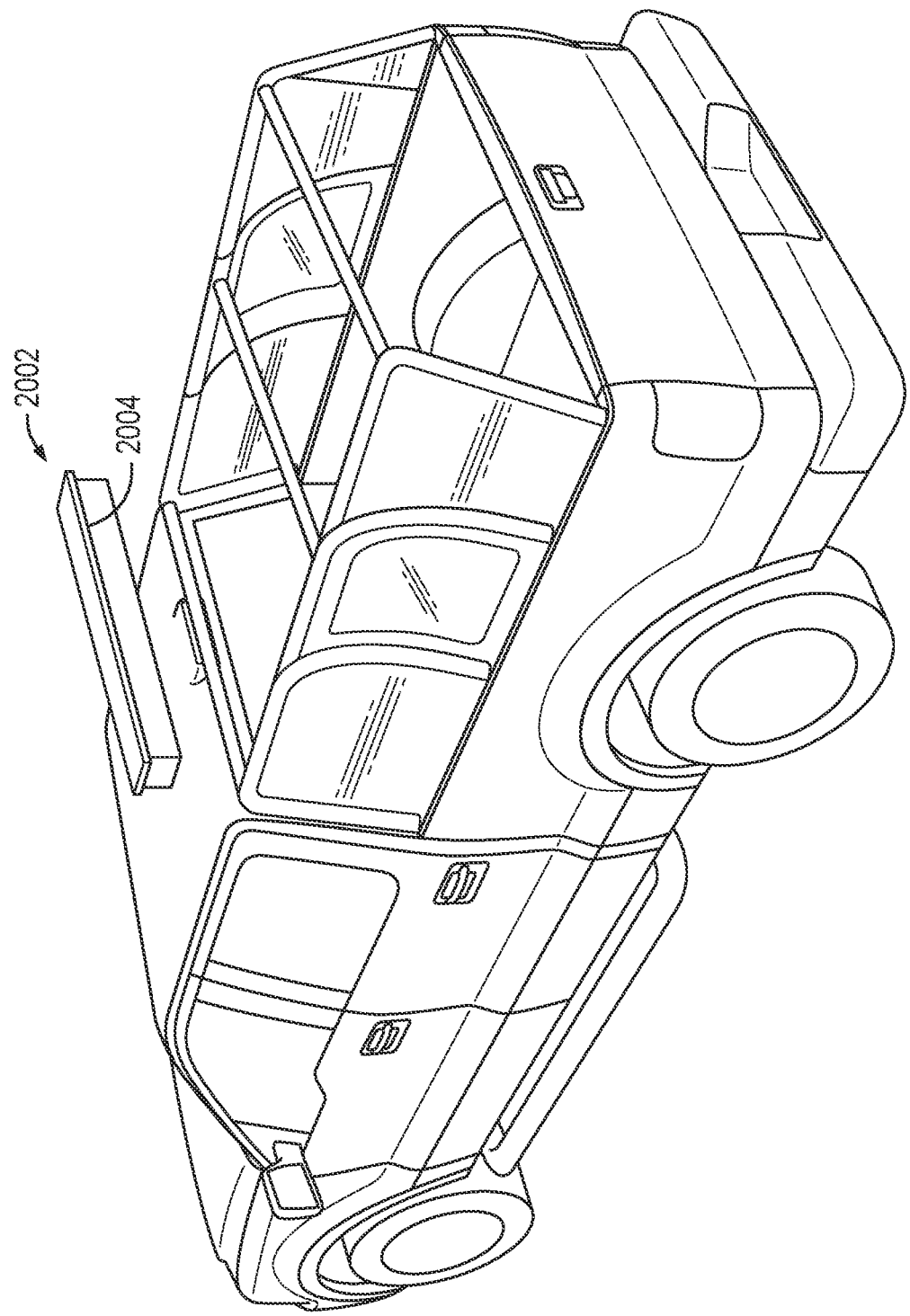
FIG. 42 illustrates a top that can be rolled up being attached to the telescoping side frames, truck bed and/or truck cab.
Figure 43:
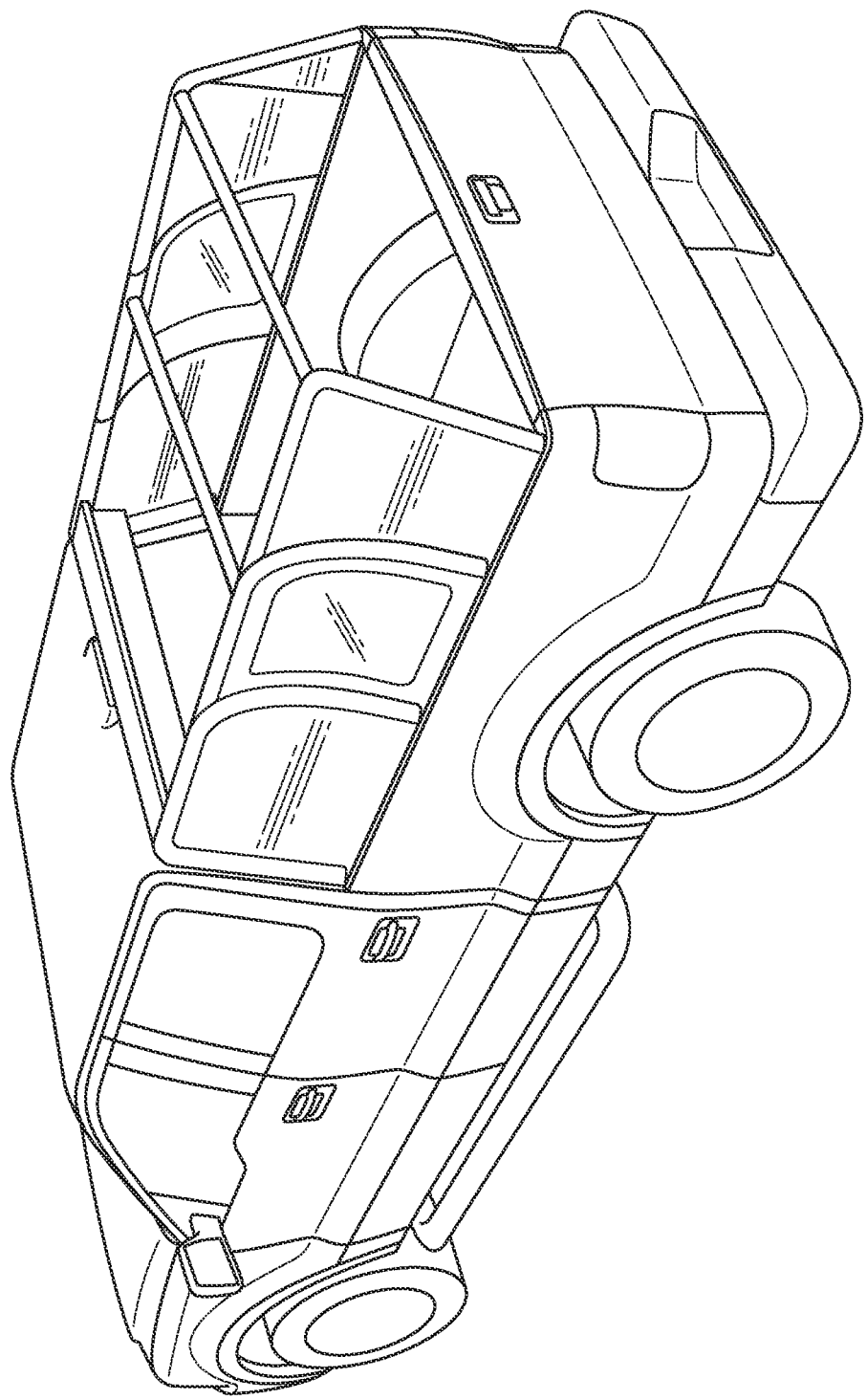
FIG. 43 illustrates the side frames in the deployed position and the top in a retracted position.

Referring now to FIG. 42, a roll up door may be disposed in a container 2002.

Figure 44:
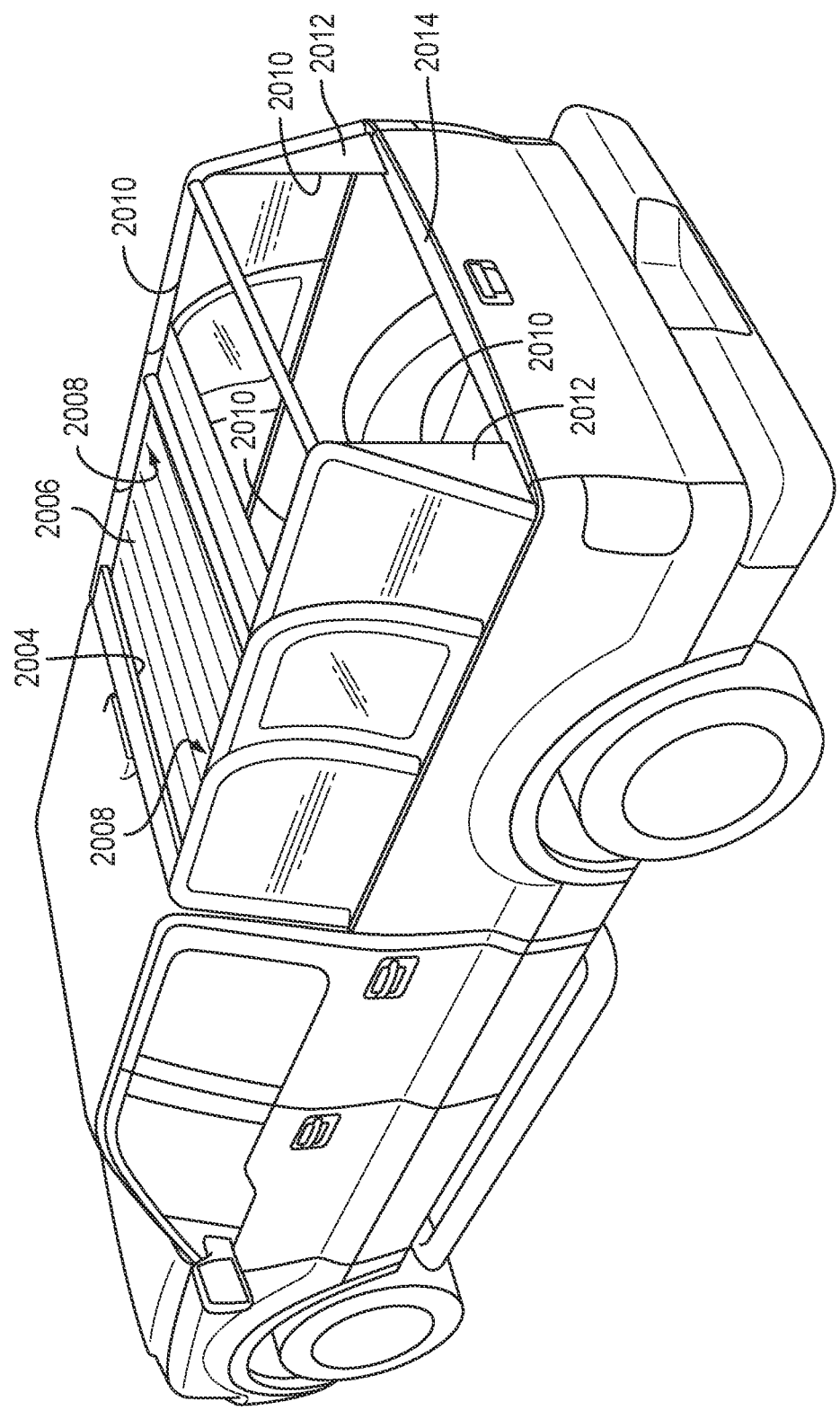
FIG. 44 illustrates the top being deployed.

Referring now to FIG. 44, the door 2006 may be pulled out of the container 2002 through the slot 2004. See FIG. 43.

The lateral side portions 2008 of the door 2006 are disposed within a tongue or guide 2010 formed in the upper portion of the frame 2000. The door 2006 can be pulled out by hand. For example, a person can pull on the proximal end of the door. Alternatively, a motor may be mounted in the container or attached to the container and be operative to force the rolled up door out of the container.

Figure 45:
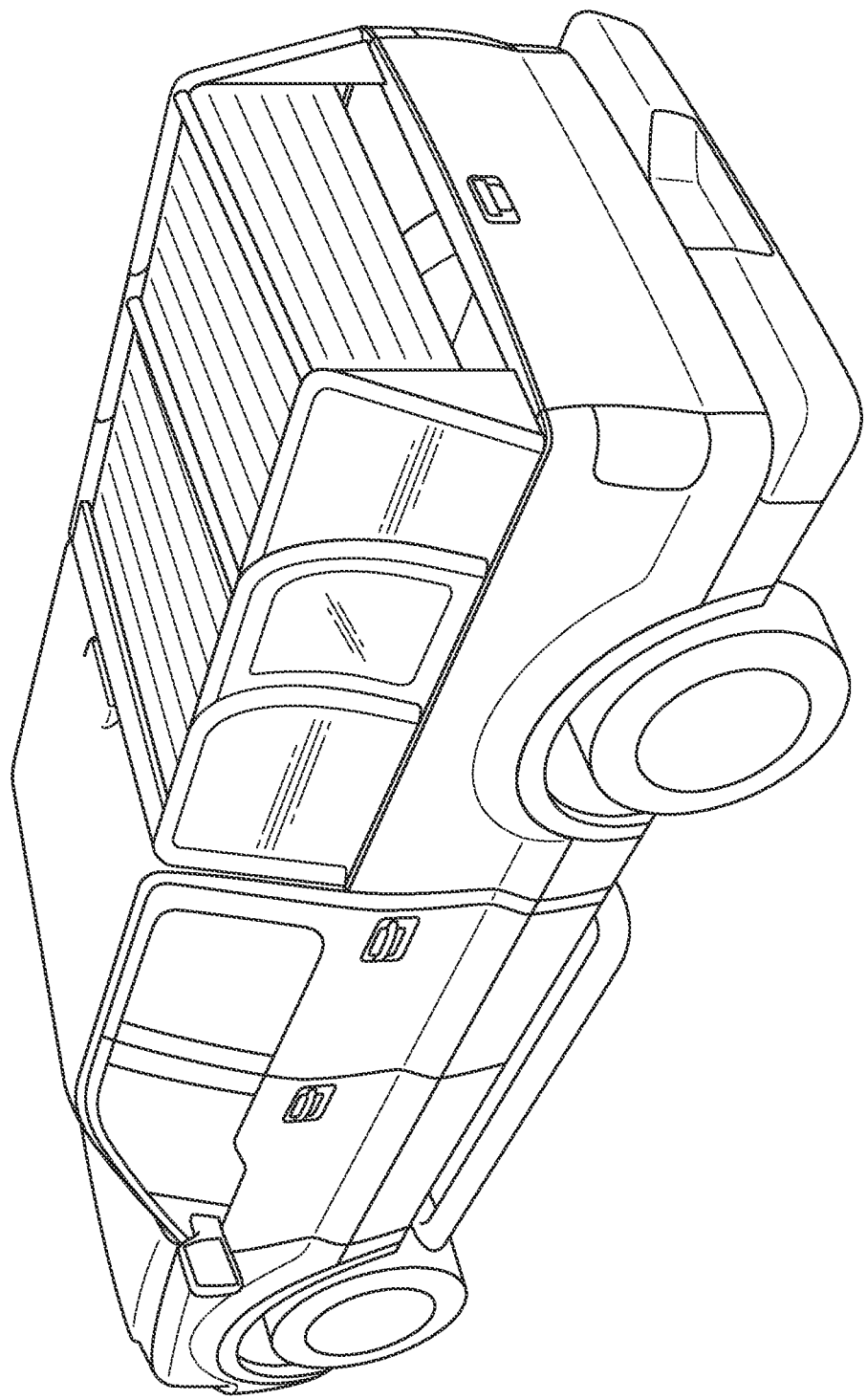
FIG. 45 illustrates the top being further transitioned to the deployed position.

Referring now to FIG. 45, the back side of the frame may have flaps in which is the guide or groove 2010. The guide or groove 2010 also receives the lateral side portions 2008 of the roll up door 2006 to guide it to the top edge 2014 of the tailgate, 2016 as shown in FIG. 46.

Figure 46:
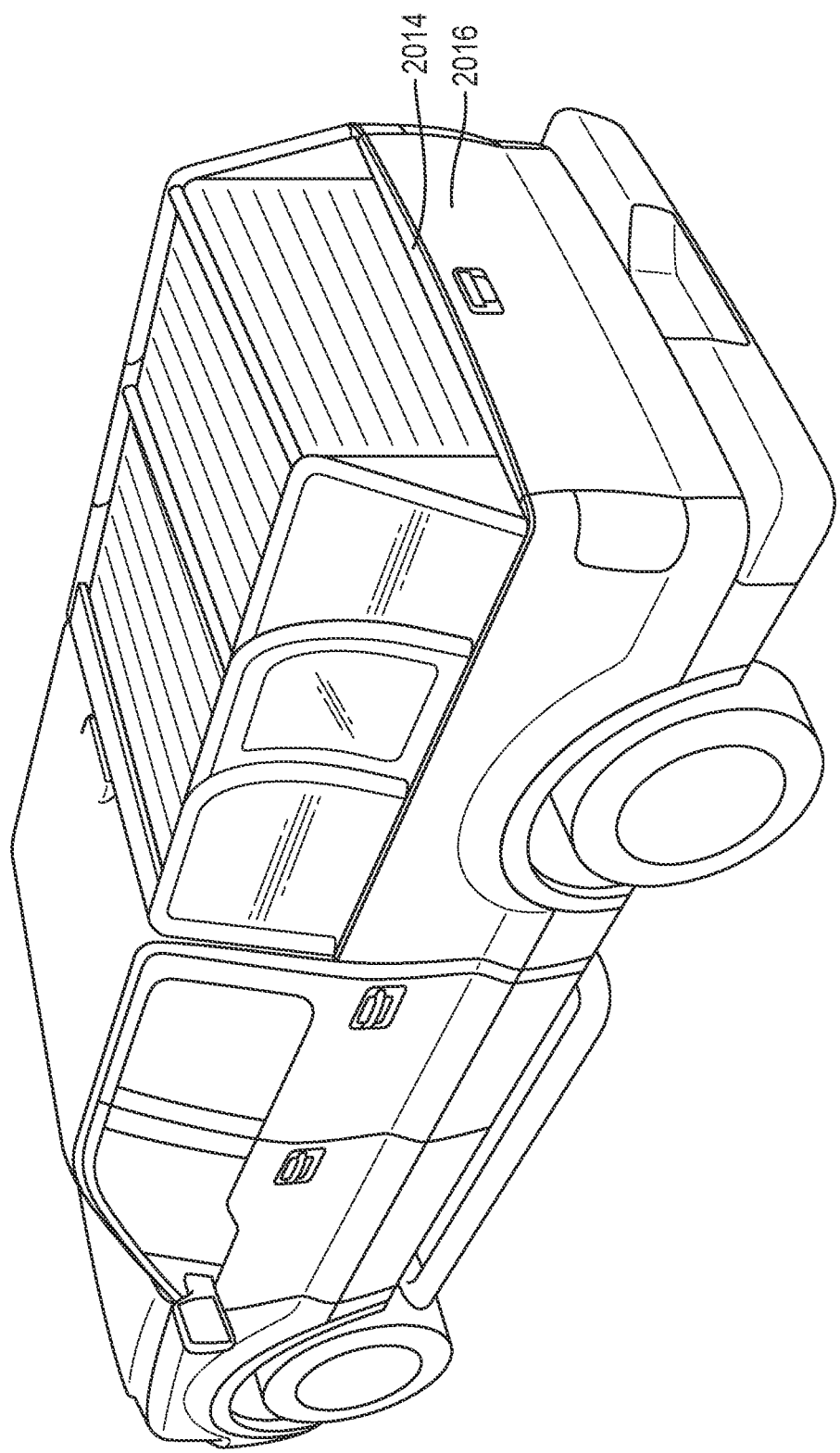
FIG. 46 illustrates the top in the fully deployed position.

Referring now to FIG. 46, the door 2006 can be rolled out to the deployed position. The door extends to the top rear edge portion of the tailgate. The back of the frame is enclosed by the roll up door which is currently shown in the closed position.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A truck with a collapsible shell, the truck comprising: the truck having a cab defining a roof and a truck bed defining first and second sides, the collapsible shell having:
   a plurality of first frames telescoping with respect to each other, the plurality of first frames being mounted to the first side, the plurality of first frames being traversable between a stored position wherein the plurality of first frames are retracted with respect to each other and a deployed position wherein the plurality of first frames are extended out with respect to each other;
   a plurality of second frames telescoping with respect to each other, the plurality of second frames being mounted to the second side, the plurality of second frames being traversable between a stored position wherein the plurality of second frames are retracted to each other and a deployed position wherein the plurality of second frames are extended out with each other;
   a cover that is traversable between a stored position and an extended position wherein in the stored position, the cover is disposed away from the truck bed and in the extended position, the cover is engaged to the plurality of first and second frames to form an enclosed space at the bed of the truck;
   wherein the cover is traversable to the stored position independent from the position of the first and second frames so that the cover is traversable to the stored position when the first and second frames are traversed to the deployed position.

2. The truck of claim 1 wherein when the cover is in the stored position and the plurality of first and second frames are in the stored position, a full length of the truck bed is usable, and when the cover is in the extended position and the plurality of first and second frames are in the extended position, the shell forms a covered interior volume over the truck bed.

3. The truck of claim 1 further comprising a plurality of panels, each panel being attachable to the first and second frame to provide a barrier.

4. The truck of claim 1 further comprising: first and second tracks mounted to the first and second sides; a plurality of first and second sliders mounted to the plurality of first and second frames, the plurality of first and second sliders slidably engaged to the first and second tracks.

5. The truck of claim 1 further comprising a shield disposed over the cover when the cover is in the stored position.

6. The truck of claim 5 wherein the shield is traversable between an open position and a use position wherein in the open position, the cover is traversable from the stored position to the extended position and in the stored position, the cover provides an aerodynamic shield for the cover when the cover is in the stored position.

7. The truck of claim 5 wherein the shield is rotatably attached to the roof of the cab.

8. The truck of claim 1 wherein the plurality of first and second frames are panels.

9. The truck of claim 8 further comprising a plurality of panels, each panel being attachable to the first and second frame to provide a barrier.

10. The truck of claim 8 further comprising:
first and second tracks mountable to the first and second sides;
a plurality of first and second sliders mounted to the plurality of first and second frames, the plurality of first and second sliders being slidably engaged to the first and second tracks during use.

11. The truck of claim 8 further comprising a shield attachable to the cab and disposable over the cover when the cover is in the stored position.

12. The truck of claim 11 wherein the shield is traversable between an open position and a use position during use wherein in the open position during use, the cover is traversable from the stored position to the extended position and in the stored position during use, the cover provides an aerodynamic shield for the cover when the cover is in the stored position.

13. The truck of claim 11 wherein the shield is rotatably attached to the roof of the cab during use of the collapsible shell.

14. A collapsible shell attachable to a truck, the collapsible shell comprising:
a plurality of first frames telescoping with respect to each other, the plurality of first frames being mountable to a first side of a bed of the truck, the plurality of first frames being traversable between a stored position wherein the plurality of first frames are retracted with respect to each other and a deployed position wherein the plurality of second frames are extended out with respect to each other;
a plurality of second frames telescoping with respect to each other, the plurality of second frames being mountable to a second side of the bed of the truck, the plurality of second frames being traversable between a stored position wherein the plurality of second frames are retracted with respect to each other and a deployed position wherein the plurality of second frames are extended out with respect to each other;
a cover that is traversable between a stored position and an extended position wherein in the stored position and during use, the cover is disposed away from the truck bed and in the extended position, the cover is engagable to the plurality of first and second frames to form an enclosed space at the bed of the truck;
wherein the cover is traversable to the stored position independent from the position of the first and second frames so that the cover is traversable to the stored position when the first and second frames are traversed to the deployed position.

15. The collapsible shell of claim 14 wherein when the cover is in the stored position and the plurality of first and second frames are in the stored position during use, a full length of the truck bed is accessible, and when the cover is in the extended position and the plurality of first and second frames are in the extended position during use, the shell forms a covered interior volume over the truck bed.

16. A truck comprising:
a cab having a roof;
a truck bed coupled to the cab, the truck bed having first and second sides; and
a collapsible shell having:
a plurality of first frames moveable with respect to each other, the plurality of first frames being mounted to the first side, the plurality of first frames being traversable between a stored position, wherein the plurality of first frames are retracted with respect to each other, and a deployed position wherein the plurality of first frames are extended out with respect to each other;
a plurality of second frames moveable with respect to each other, the plurality of second frames being mounted to the second side, the plurality of second frames being traversable separately from the plurality of first frames between a stored position, wherein the plurality of second frames are retracted to each other, and a deployed position wherein the plurality of second frames are extended out with each other; and
a cover traversable between a stored position and an extended position, the cover engaged to the plurality of first and second frames when the cover is in the extended position:
wherein the cover is traversable to the stored position independent from the position of the first and second frames so that the cover is traversable to the stored position when the first and second frames are traversed to the deployed position.

17. The truck of claim 16 wherein when the cover is in the stored position and the plurality of first and second frames are in the stored position, a full length of the truck bed is usable, and when the cover is in the extended position and the plurality of first and second frames are in the extended position, the collapsible shell forms a covered interior volume over the truck bed.

18. The truck of claim 16 wherein each of the plurality of first frames extending from the first side to define a first frame height, the first frame height of the plurality of first frames being non-uniform, and each of the plurality of second frames extending from the second side to define a second frame height, the second frame height of the plurality of second frames being non-uniform.

19. The truck of claim 16 wherein the cover extends between the first and second frames.

* * * * *